US011915368B2

(12) United States Patent
Mundy et al.

(10) Patent No.: US 11,915,368 B2
(45) Date of Patent: *Feb. 27, 2024

(54) SYSTEMS AND METHODS FOR MODELING STRUCTURES USING POINT CLOUDS DERIVED FROM STEREOSCOPIC IMAGE PAIRS

(71) Applicant: Insurance Services Office, Inc., Jersey City, NJ (US)

(72) Inventors: Joseph L. Mundy, Barrington, RI (US); Bryce Zachary Porter, Lehi, UT (US); Ryan Mark Justus, Lehi, UT (US); Francisco Rivas, Madrid (ES)

(73) Assignee: Insurance Services Office, Inc., Jersey City, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/403,792

(22) Filed: Aug. 16, 2021

(65) Prior Publication Data
US 2021/0407188 A1 Dec. 30, 2021

Related U.S. Application Data

(63) Continuation of application No. 16/703,644, filed on Dec. 4, 2019, now Pat. No. 11,094,113.

(51) Int. Cl.
*G06T 17/05* (2011.01)
*G06F 16/587* (2019.01)
(Continued)

(52) U.S. Cl.
CPC ............ *G06T 17/05* (2013.01); *G06F 16/587* (2019.01); *G06T 7/593* (2017.01); *G06T 15/04* (2013.01);
(Continued)

(58) Field of Classification Search
CPC ......... G06T 17/05; G06T 7/593; G06T 15/04; G06T 15/06; G06T 17/20; G06T 2200/24;
(Continued)

(56) References Cited

U.S. PATENT DOCUMENTS 3,908,281 A 9/1975 Fox
4,845,643 A 7/1989 Clapp
(Continued)

FOREIGN PATENT DOCUMENTS

AU 2008/230031 B8 7/2010
CA 2191954 A1 12/1995
(Continued)

OTHER PUBLICATIONS

Weeks, et al., "A Real Time, Multichannel System with Parallel Digital Signal Processors", IEEE, 1990 (4 pages).
(Continued)

*Primary Examiner* — Abderrahim Merouan
(74) *Attorney, Agent, or Firm* — McCarter & English, LLP

(57) ABSTRACT

A system for modeling a roof structure comprising an aerial imagery database and a processor in communication with the aerial imagery database. The aerial imagery database stores a plurality of stereoscopic image pairs and the processor selects at least one stereoscopic image pair among the plurality of stereoscopic image pairs and related metadata from the aerial imagery database based on a geospatial region of interest. The processor identifies a target image and a reference image from the at least one stereoscopic pair and calculates a disparity value for each pixel of the identified target image to generate a disparity map. The processor generates a three dimensional point cloud based on the disparity map, the identified target image and the identified reference image. The processor optionally generates a tex-
(Continued)

ture map indicative of a three-dimensional representation of the roof structure based on the generated three dimensional point cloud.

31 Claims, 30 Drawing Sheets

(51) Int. Cl.
  *G06T 7/593* (2017.01)
  *G06T 15/04* (2011.01)
  *G06T 15/06* (2011.01)
  *G06T 17/20* (2006.01)
(52) U.S. Cl.
  CPC ............ *G06T 15/06* (2013.01); *G06T 17/20* (2013.01); *G06T 2200/24* (2013.01); *G06T 2207/10012* (2013.01); *G06T 2207/10028* (2013.01); *G06T 2207/20221* (2013.01); *G06T 2210/21* (2013.01); *G06T 2210/56* (2013.01)
(58) Field of Classification Search
  CPC . G06T 2207/10012; G06T 2207/10028; G06T 2207/20221; G06T 2210/21; G06T 2210/56; G06F 16/587
  See application file for complete search history.

(56) References Cited

U.S. PATENT DOCUMENTS

| | | |
|---|---|---|
| 5,247,356 A | 9/1993 | Ciampa |
| 5,259,037 A | 11/1993 | Plunk |
| 5,276,866 A | 1/1994 | Paolini |
| 5,422,989 A | 6/1995 | Bell et al. |
| 5,592,375 A | 1/1997 | Salmon et al. |
| 5,633,995 A | 5/1997 | McClain |
| 5,666,441 A | 9/1997 | Rao et al. |
| 5,727,138 A | 3/1998 | Harada |
| 5,983,010 A | 11/1999 | Murdock et al. |
| 6,037,945 A | 3/2000 | Loveland |
| 6,046,745 A | 4/2000 | Moriya et al. |
| 6,134,338 A | 10/2000 | Solberg et al. |
| 6,198,431 B1 | 3/2001 | Gibson |
| 6,323,885 B1 | 11/2001 | Wiese |
| 6,333,749 B1 | 12/2001 | Reinhardt et al. |
| 6,342,884 B1 | 1/2002 | Kamen et al. |
| 6,356,280 B1 | 3/2002 | Kamen et al. |
| 6,385,541 B1 | 5/2002 | Blumberg et al. |
| 6,396,491 B2 | 5/2002 | Watanabe et al. |
| 6,434,277 B1 | 8/2002 | Yamada et al. |
| 6,446,053 B1 | 9/2002 | Elliott |
| 6,448,964 B1 | 9/2002 | Isaacs et al. |
| 6,456,287 B1 | 9/2002 | Kamen et al. |
| 6,496,184 B1 | 12/2002 | Freeman et al. |
| 6,525,728 B2 | 2/2003 | Kamen et al. |
| 6,556,195 B1 | 4/2003 | Totsuka et al. |
| 6,581,045 B1 | 6/2003 | Watson |
| 6,636,803 B1 | 10/2003 | Hartz, Jr. et al. |
| 6,810,383 B1 | 10/2004 | Loveland |
| 6,816,819 B1 | 11/2004 | Loveland |
| 6,826,539 B2 | 11/2004 | Loveland |
| 6,829,584 B2 | 12/2004 | Loveland |
| 6,836,270 B2 | 12/2004 | Du |
| 6,912,293 B1 | 6/2005 | Korobkin |
| 6,980,690 B1 | 12/2005 | Taylor et al. |
| 6,982,712 B2 | 1/2006 | Ohto |
| 7,003,400 B2 | 2/2006 | Bryant |
| 7,006,977 B1 | 2/2006 | Attra et al. |
| 7,098,909 B2 | 8/2006 | Hayano et al. |
| 7,133,551 B2 | 11/2006 | Chen et al. |
| 7,149,346 B2 | 12/2006 | Oniyama |
| 7,164,883 B2 | 1/2007 | Rappaport et al. |
| 7,187,452 B2 | 3/2007 | Jupp et al. |
| 7,246,044 B2 | 7/2007 | Imamura et al. |
| 7,305,983 B1 | 12/2007 | Meder et al. |
| 7,324,666 B2 | 1/2008 | Zoken et al. |
| 7,343,268 B2 | 3/2008 | Kishikawa |
| 7,376,284 B2 | 5/2008 | Tao et al. |
| 7,386,164 B2 | 6/2008 | Shragai et al. |
| 7,421,125 B1 | 9/2008 | Rees |
| 7,424,133 B2 | 9/2008 | Schultz et al. |
| 7,444,013 B2 | 10/2008 | Chen |
| 7,487,114 B2 | 2/2009 | Florance et al. |
| 7,508,977 B2 | 3/2009 | Lyons et al. |
| 7,509,241 B2 | 3/2009 | Guo et al. |
| 7,515,153 B2 | 4/2009 | Jin et al. |
| 7,519,206 B2 | 4/2009 | Mulet-Parada et al. |
| 7,720,276 B1 | 5/2010 | Korobkin |
| 7,728,833 B2 | 6/2010 | Verma et al. |
| 7,752,018 B2 | 7/2010 | Rahmes et al. |
| 7,787,659 B2 | 8/2010 | Schultz et al. |
| 7,804,996 B2 | 9/2010 | Ohtomo et al. |
| 7,869,981 B2 | 1/2011 | Pendyala et al. |
| 7,873,238 B2 | 1/2011 | Schultz et al. |
| 7,920,963 B2 | 4/2011 | Jouline et al. |
| 7,961,982 B2 | 6/2011 | Sibiryakov et al. |
| 7,991,226 B2 | 8/2011 | Schultz et al. |
| 7,995,799 B2 | 8/2011 | Schultz et al. |
| 7,995,862 B2 | 8/2011 | Tao et al. |
| 8,040,343 B2 | 10/2011 | Kikuchi et al. |
| 8,059,888 B2 | 11/2011 | Chen et al. |
| 8,068,643 B2 | 11/2011 | Schultz et al. |
| 8,078,396 B2 | 12/2011 | Meadow et al. |
| 8,078,436 B2 | 12/2011 | Pershing et al. |
| 8,081,841 B2 | 12/2011 | Schultz et al. |
| 8,099,264 B2 | 1/2012 | Kelley et al. |
| 8,131,514 B2 | 3/2012 | Royan et al. |
| 8,145,578 B2 | 3/2012 | Pershing et al. |
| 8,154,633 B2 | 4/2012 | Gloudemans et al. |
| 8,170,840 B2 | 5/2012 | Pershing |
| 8,204,341 B2 | 6/2012 | Schultz et al. |
| 8,207,964 B1 | 6/2012 | Meadow et al. |
| 8,209,152 B2 | 6/2012 | Pershing |
| 8,233,666 B2 | 7/2012 | Schultz et al. |
| 8,275,194 B2 | 9/2012 | Zebedin |
| 8,331,654 B2 | 12/2012 | Abraham et al. |
| 8,385,672 B2 | 2/2013 | Giuffrida et al. |
| 8,390,617 B1 | 3/2013 | Reinhardt |
| 8,401,222 B2 | 3/2013 | Thornberry et al. |
| 8,452,125 B2 | 5/2013 | Schultz et al. |
| 8,477,190 B2 | 7/2013 | Giuffrida et al. |
| 8,515,125 B2 | 8/2013 | Thornberry et al. |
| 8,515,198 B2 | 8/2013 | Giuffrida et al. |
| 8,520,079 B2 | 8/2013 | Schultz et al. |
| 8,531,472 B2 | 9/2013 | Freund et al. |
| 8,542,880 B2 | 9/2013 | Thornberry et al. |
| 8,588,547 B2 | 11/2013 | Giuffrida et al. |
| 8,593,518 B2 | 11/2013 | Schultz et al. |
| 8,630,510 B2 | 1/2014 | Giuffrida et al. |
| 8,634,594 B2 | 1/2014 | Schultz et al. |
| 8,634,597 B2 | 1/2014 | Ivanov et al. |
| 8,643,720 B2 | 2/2014 | Schultz et al. |
| 8,648,872 B2 | 2/2014 | Freund et al. |
| 8,649,596 B2 | 2/2014 | Schultz et al. |
| 8,660,382 B2 | 2/2014 | Schultz et al. |
| 8,670,961 B2 | 3/2014 | Pershing et al. |
| 8,731,234 B1 | 5/2014 | Ciarcia et al. |
| 8,774,525 B2 | 7/2014 | Pershing |
| 8,818,076 B2 | 8/2014 | Shenkar et al. |
| 8,818,770 B2 | 8/2014 | Pershing |
| 8,823,732 B2 | 9/2014 | Adams et al. |
| 8,825,454 B2 | 9/2014 | Pershing |
| 8,855,442 B2 | 10/2014 | Owechko |
| 8,897,539 B2 | 11/2014 | Stone et al. |
| 8,938,090 B2 | 1/2015 | Thornberry et al. |
| 8,970,615 B2 | 3/2015 | Freund et al. |
| 8,971,624 B2 | 3/2015 | Schultz et al. |
| 8,977,520 B2 | 3/2015 | Stephens et al. |
| 8,995,757 B1 | 3/2015 | Ciarcia et al. |
| 9,014,415 B2 | 4/2015 | Chen et al. |
| 9,036,861 B2 | 5/2015 | Chen et al. |
| 9,047,688 B2 | 6/2015 | Lynch |
| 9,070,018 B1 | 6/2015 | Ciarcia et al. |

(56) References Cited

U.S. PATENT DOCUMENTS

| | | |
|---|---|---|
| 9,129,376 B2 | 9/2015 | Pershing |
| 9,135,737 B2 | 9/2015 | Pershing |
| 9,141,880 B2 | 9/2015 | Ciarcia |
| 9,147,276 B2 | 9/2015 | Giuffrida et al. |
| 9,147,287 B2 | 9/2015 | Ciarcia |
| 9,159,164 B2 | 10/2015 | Ciarcia |
| 9,182,657 B2 | 11/2015 | Schultz et al. |
| 9,183,538 B2 | 11/2015 | Thornberry et al. |
| 9,460,517 B2 | 10/2016 | Fathi et al. |
| 9,501,700 B2 | 11/2016 | Loveland et al. |
| 9,679,227 B2 * | 6/2017 | Taylor .................... G06V 10/25 |
| 9,886,774 B2 | 2/2018 | Fathi et al. |
| 9,904,867 B2 | 2/2018 | Fathi et al. |
| 9,911,228 B2 | 3/2018 | Pershing et al. |
| 10,032,310 B2 | 7/2018 | Fathi et al. |
| 10,140,756 B2 | 11/2018 | Van Der Zwan et al. |
| 10,503,842 B2 | 12/2019 | Loveland et al. |
| 10,540,577 B2 * | 1/2020 | Taylor .................... G06T 7/593 |
| 10,592,765 B2 | 3/2020 | Fathi et al. |
| 10,896,353 B2 | 1/2021 | Taylor et al. |
| 11,094,113 B2 * | 8/2021 | Mundy .................... G06T 7/593 |
| 11,144,795 B2 | 10/2021 | Taylor et al. |
| 11,210,433 B2 | 12/2021 | Loveland et al. |
| 2001/0027404 A1 | 10/2001 | Loveland |
| 2002/0061132 A1 | 5/2002 | Furukawa |
| 2002/0076098 A1 | 6/2002 | Love |
| 2002/0154174 A1 | 10/2002 | Redlich et al. |
| 2002/0167515 A1 | 11/2002 | Kamen et al. |
| 2003/0014224 A1 | 1/2003 | Guo et al. |
| 2003/0023412 A1 | 1/2003 | Rappaport et al. |
| 2003/0028393 A1 | 2/2003 | Coulston et al. |
| 2003/0088362 A1 | 5/2003 | Melero et al. |
| 2003/0115163 A1 | 6/2003 | Moore et al. |
| 2003/0147553 A1 | 8/2003 | Chen et al. |
| 2003/0171957 A1 | 9/2003 | Watrous |
| 2003/0233310 A1 | 12/2003 | Stavrovski |
| 2004/0047498 A1 | 3/2004 | Mulet-Parada et al. |
| 2004/0105573 A1 | 6/2004 | Neumann et al. |
| 2004/0220906 A1 | 11/2004 | Gargi et al. |
| 2004/0263514 A1 | 12/2004 | Jin et al. |
| 2004/0264763 A1 * | 12/2004 | Mas .................... G06V 10/147 382/154 |
| 2005/0012742 A1 | 1/2005 | Royan |
| 2005/0102394 A1 | 5/2005 | Loveland |
| 2005/0203768 A1 | 9/2005 | Florance et al. |
| 2005/0288959 A1 | 12/2005 | Eraker et al. |
| 2006/0056732 A1 | 3/2006 | Holmes |
| 2006/0061566 A1 * | 3/2006 | Verma .................... G06T 17/20 345/582 |
| 2006/0136126 A1 | 6/2006 | Coombes et al. |
| 2006/0137736 A1 | 6/2006 | Nishitani et al. |
| 2006/0188143 A1 | 8/2006 | Strassenburg-Kleciak |
| 2006/0200311 A1 | 9/2006 | Arutunian et al. |
| 2006/0232605 A1 | 10/2006 | Imamura |
| 2006/0239537 A1 * | 10/2006 | Shragai .................... G06V 20/13 348/42 |
| 2006/0262112 A1 | 11/2006 | Shimada |
| 2006/0265287 A1 | 11/2006 | Kubo |
| 2007/0036467 A1 | 2/2007 | Coleman et al. |
| 2007/0067191 A1 | 3/2007 | Loveland |
| 2007/0115284 A1 | 5/2007 | Kim et al. |
| 2007/0150366 A1 | 6/2007 | Yahiro et al. |
| 2007/0220174 A1 | 9/2007 | Abhyanker |
| 2008/0021683 A1 | 1/2008 | Rahmes et al. |
| 2008/0068379 A1 | 3/2008 | Larsen et al. |
| 2008/0071604 A1 | 3/2008 | Scanlan |
| 2008/0089610 A1 | 4/2008 | Tao et al. |
| 2008/0103991 A1 | 5/2008 | Moore et al. |
| 2008/0105045 A1 | 5/2008 | Woro |
| 2008/0162380 A1 | 7/2008 | Suga et al. |
| 2008/0204570 A1 | 8/2008 | Schultz et al. |
| 2008/0221843 A1 | 9/2008 | Shenkar et al. |
| 2008/0231700 A1 | 9/2008 | Schultz et al. |
| 2008/0262789 A1 | 10/2008 | Pershing et al. |
| 2008/0273753 A1 | 11/2008 | Giuffrida et al. |
| 2008/0279447 A1 | 11/2008 | Friedlander et al. |
| 2008/0298638 A1 | 12/2008 | Miyazaki |
| 2008/0310756 A1 | 12/2008 | Tao et al. |
| 2009/0089018 A1 | 4/2009 | Kelley et al. |
| 2009/0110327 A1 | 4/2009 | Chen et al. |
| 2009/0132210 A1 | 5/2009 | Royan et al. |
| 2009/0132436 A1 | 5/2009 | Pershing et al. |
| 2009/0141020 A1 | 6/2009 | Freund et al. |
| 2009/0216501 A1 | 8/2009 | Yeow et al. |
| 2009/0234692 A1 | 9/2009 | Powell et al. |
| 2009/0271154 A1 | 10/2009 | Coad et al. |
| 2009/0304227 A1 | 12/2009 | Kennedy et al. |
| 2009/0310867 A1 | 12/2009 | Matei et al. |
| 2010/0034483 A1 | 2/2010 | Giuffrida et al. |
| 2010/0060631 A1 | 3/2010 | Sugihara |
| 2010/0110074 A1 | 5/2010 | Pershing |
| 2010/0114537 A1 | 5/2010 | Pershing |
| 2010/0164953 A1 | 7/2010 | Wouhaybi et al. |
| 2010/0179787 A2 | 7/2010 | Pershing et al. |
| 2010/0182316 A1 | 7/2010 | Akbari et al. |
| 2010/0201682 A1 | 8/2010 | Quan et al. |
| 2010/0217724 A1 | 8/2010 | Wayne et al. |
| 2010/0241406 A1 | 9/2010 | Rahmes et al. |
| 2010/0275018 A1 | 10/2010 | Pedersen |
| 2010/0296693 A1 | 11/2010 | Thornberry et al. |
| 2010/0303340 A1 * | 12/2010 | Abraham ................ G06T 7/593 382/154 |
| 2011/0047048 A1 | 2/2011 | Yahiro et al. |
| 2011/0096083 A1 | 4/2011 | Schultz |
| 2011/0157213 A1 | 6/2011 | Takeyama et al. |
| 2011/0164029 A1 | 7/2011 | King et al. |
| 2011/0187713 A1 | 8/2011 | Pershing et al. |
| 2011/0205245 A1 | 8/2011 | Kennedy et al. |
| 2011/0222757 A1 | 9/2011 | Yeatman, Jr. et al. |
| 2012/0007982 A1 | 1/2012 | Giuffrida et al. |
| 2012/0026322 A1 | 2/2012 | Malka et al. |
| 2012/0101783 A1 | 4/2012 | Stephens et al. |
| 2012/0154446 A1 | 6/2012 | Adams et al. |
| 2012/0170797 A1 | 7/2012 | Pershing et al. |
| 2012/0179431 A1 | 7/2012 | Labrie et al. |
| 2012/0183217 A1 | 7/2012 | Schultz et al. |
| 2012/0191424 A1 | 7/2012 | Pershing |
| 2012/0209782 A1 | 8/2012 | Pershing et al. |
| 2012/0223965 A1 | 9/2012 | Pershing |
| 2012/0253725 A1 | 10/2012 | Malka et al. |
| 2012/0253751 A1 | 10/2012 | Malka et al. |
| 2012/0288158 A1 | 11/2012 | Schultz et al. |
| 2013/0113831 A1 | 5/2013 | Giuffrida et al. |
| 2013/0135471 A1 | 5/2013 | Giuffrida et al. |
| 2013/0138401 A1 | 5/2013 | Thornberry et al. |
| 2013/0170694 A1 | 7/2013 | Thornberry et al. |
| 2013/0202157 A1 | 8/2013 | Pershing |
| 2013/0204575 A1 | 8/2013 | Pershing |
| 2013/0208116 A1 | 8/2013 | Schultz et al. |
| 2013/0208996 A1 | 8/2013 | Schultz et al. |
| 2013/0211790 A1 * | 8/2013 | Loveland ................ G06T 17/00 703/1 |
| 2013/0212536 A1 | 8/2013 | Thornberry et al. |
| 2013/0226515 A1 | 8/2013 | Pershing et al. |
| 2014/0064554 A1 | 3/2014 | Coulter et al. |
| 2015/0347872 A1 * | 12/2015 | Taylor .................... G01C 11/06 382/224 |
| 2015/0370929 A1 | 12/2015 | Pershing |
| 2016/0129906 A1 * | 5/2016 | Chen .................... B60W 30/09 348/148 |
| 2016/0239976 A1 | 8/2016 | Fathi et al. |
| 2016/0260245 A1 * | 9/2016 | DeCell .................... G06T 15/06 |
| 2016/0284090 A1 * | 9/2016 | Huang .................... G06T 7/593 |
| 2016/0343140 A1 | 11/2016 | Ciprari et al. |
| 2017/0154131 A1 | 6/2017 | Loveland et al. |
| 2017/0272727 A1 * | 9/2017 | Jiang .................... G06T 7/97 |
| 2017/0277980 A1 * | 9/2017 | Taylor .................... G06V 10/25 |
| 2017/0353708 A1 * | 12/2017 | Petrichkovich ........... G06T 7/97 |
| 2018/0322698 A1 | 11/2018 | Fathi et al. |
| 2019/0095694 A1 * | 3/2019 | Waizenegger ............ G06T 7/55 |
| 2019/0206044 A1 | 7/2019 | Marra et al. |
| 2019/0220711 A1 * | 7/2019 | Taylor .................... G01C 11/06 |
| 2019/0236839 A1 | 8/2019 | Fathi et al. |
| 2020/0082168 A1 | 3/2020 | Fathi et al. |

(56) References Cited

U.S. PATENT DOCUMENTS

| | | | |
|---|---|---|---|
| 2020/0110847 | A1 | 4/2020 | Loveland et al. |
| 2020/0202183 | A1* | 6/2020 | Taylor .................... G01C 11/06 |
| 2021/0174580 | A1 | 6/2021 | Mundy et al. |
| 2022/0027622 | A1 | 1/2022 | Taylor et al. |
| 2022/0114300 | A1 | 4/2022 | Loveland et al. |

FOREIGN PATENT DOCUMENTS

| | | | |
|---|---|---|---|
| CA | 2703423 | A1 | 11/2010 |
| DE | 4419359 | A1 | 12/1995 |
| DE | 19719620 | A1 | 11/1998 |
| DE | 19857667 | A1 | 8/2000 |
| EP | 1010966 | A1 | 6/2000 |
| WO | 00/029806 | A2 | 5/2000 |
| WO | 2004/044692 | A2 | 5/2004 |
| WO | 2005/124276 | A2 | 12/2005 |
| WO | 2006/040775 | A2 | 4/2006 |
| WO | 2006/090132 | A2 | 8/2006 |
| WO | 2009/049151 | A1 | 4/2009 |
| WO | 2009/073726 | A1 | 6/2009 |
| WO | 2010/017255 | A2 | 2/2010 |
| WO | 2011/056402 | A2 | 5/2011 |
| WO | 2011/094760 | A2 | 8/2011 |
| WO | 2012/050648 | A2 | 4/2012 |
| WO | 2012/054239 | A2 | 4/2012 |
| WO | 2012/083135 | A1 | 6/2012 |
| WO | 2013/116164 | A1 | 8/2013 |
| WO | 2013/116165 | A1 | 8/2013 |
| WO | 2013/116793 | A2 | 8/2013 |
| WO | 2013/116794 | A2 | 8/2013 |
| WO | 2014/149509 | A2 | 9/2014 |
| WO | 2014/151122 | A1 | 9/2014 |
| WO | 2015/081026 | A1 | 6/2015 |

OTHER PUBLICATIONS

Werner, et al., "New Techniques for Automated Architectural Reconstruction from Photographs," Department of Engineering Science, University of Oxford, 2002 (15 pages).
Wolf, Elements of Photogrammetry—Chapter 14: Aerotriangulation, 1974 (3 pages).
Wood, et al., "Surface Light Fields for 3D Photography", SIGGRAPH 2000 (10 pages).
Written Opinion dated Apr. 26, 2013, issued in connection with International Application No. PCT/US2013/26385 (4 pages).
Written Opinion of the International Searching Authority dated Jan. 29, 2021, issued in connection with International Application No. PCT/US2020/063004 (7 pages).
Written Opinion of the International Searching Authority dated Nov. 17, 2014, issued in connection with International Application No. PCT/US14/49605 (4 pages).
Wu, et al., "Multicore Bundle Adjustment", 2011 (8 pages).
Wu, et al., "Schematic Surface Reconstruction", 2012 (8 pages).
www.archive.org, "Main Features: Photomodeler is Fully Loaded and Ready to Perform", retrieved from http://www.photomodeler.com/pmpro08.html on Oct. 21, 2013 (4 pages).
Xactware Solutions, Inc., "Xactimate Sketch—Import Underlay Image," 2008 (4 pages).
Xactware, "Roof and Property Insight", 2015 (10 pages).
Xiao, et al., "Geo-spatial Aerial Video Processing for Scene Understanding and Object Tracking," IEEE, 2008 (8 pages).
Ye, et al., "Automated Reconstruction of Urban House Roofs from Aerial Imagery", IEEE 2001 (3 pages).
YouTube, "Pictometry Online Demo", retrieved Feb. 6, 2009 (1 page).
Zhang, et al., "Rapid Shape Acquisition Using Color Structured Light and Multi-pass Dynamic Programming", 2002 (13 pages).
Zhang, et al., "Shape and Motion Under Varying Illumination: Unifying Structure from Motion, Photometric Stereo, and Multiview Stereo", 2003. (8 pages).

Zhang, et al., "Spacetime Stereo: Shape Recovery for Dynamic Scenes", 2003 (8 pages).
Zheng, et al. "Parallax Photography: Creating 3D Cinematic Effects from Stills", 2009 (8 pages).
Zheng, et al., "A Consistent Segmentation Approach to Image-based Rendering", Technical Report CSE-Sep. 3, 02, 2002 (8 pages).
Ziegler, et al., "3D Reconstruction Using Labeled Image Regions", 2003 (12 pages).
Zongker, et al., "Environment Matting and Compositing", 1999 (10 pages).
"3D Reconstruction", retrieved Oct. 25, 2013 (5 pages).
"8 Epipolar Geometry and the Fundamental Matrix", retrieved Oct. 25, 2013 (25 pages).
"Pictometry Aerial Images and Electronic Field Study Software", 2008 (2 pages).
"Sorcerer: Nobody builds roofs like this builds roofs", retrieved from URL=http://web.archive.org/web/2006021409237/http://www.applicad.com/au/product-features . . . on Mar. 29, 2012 (2 pages).
"Transcription of points of potential interest in the attached Youtube video titled: Pictometry Online Demo", retrieved on Feb. 10, 2010 (1 page).
"Xactimate 27—Aerial Sketch," Internet printout from http://www.xactware.com/solutions/claims-estimating/27-3/aerial-sketch, 2012 (3 pages).
A History of Roof Modelling Using Aerial Imagery, Sep. 1983 (4 pages).
Able Software Corp., "R2V User's Manual, Advanced Raster to Vector Conversion Software". Publicly available Sep. 16, 2000 (167 pages).
AeroDach Web Site http://www.aerodach.de from Jun. 13, 2004 (retrieved Sep. 20, 2012) and translations to English (21 pages).
Aerodach, "Protokoll zur Dachauswertung", Oct. 19, 2010 (12 pages).
Aerowest GmbH Logo, "Aerodach Online Roof Analysis: Standard Delivery Format and 3D Dataset", 2002 (6 pages).
Aerowest GmbH, "AeroDach-das patentierte Dachaufmass", retrieved from URL=http://web.archive.org/web/20060101021543/http://www.aerowest.de/aerodach.html, 2006 (2 pages).
Aerowest GmbH, "Aerowest Pricelist of Geodata", AeroDach Online, Aeroview, Oct. 21, 2005 (2 pages).
Aerowest GmbH, "Geodata Service; AeroDach-Patented Roof Dimensions", 2006 (2 pages).
Aerowest GmbH, "Preisliste Geodaten Aerowest", Oct. 21, 2005 (1 page).
Aerowest GMBH, AeroDach Online Dachauswertung: Standardlieferformat und 3D-Datensatz, 2002 (6 pages).
Aerowest GmbH, AeroDach Online, Geodatenservice, 2005 (18 pages).
Aerowest Web Site http://aerowest.de/ from Feb. 6, 2006 (retrieved Sep. 20, 2012) and translated to English (61 pages).
Agarwal, et al., "Building Rome in a Day", Communications of the ACM, vol. 54, No. 10, Oct. 2011 (8 pages).
Agarwal, et al., "Reconstructing Rome", IEEE Computer Society, 2010 (8 pages).
Agarwala, et al., "Interactive Digital Photomontage", SIGGRAPH 2004 (9 pages).
Agarwala, et al., "Panoramic Video Textures", ACM Siggraph 2005 (7 pages).
Ahonen, et al., "Rotation Invariant Image Description with Local Binary Pattern Histogram Fourier Features" in Text: Image Analysis, SCIA 2009 Proceedings, Lecture Notes in Computer Science 5575, 2009; pp. 61-70 (10 pages).
Ameri, et al., "Automatic 3D Building Reconstruction Using Plane-Roof Structures", Institute for Photogrammetry, University of Stuttgart, 2000 (12 pages).
American Congress on Surveying and Mapping, "Definitions and Surveying and Associated Terms", 1989 (2 pages).
American Society of Civil Engineering, "Glossary of the Mapping Sciences" ASCE Publications, 1994 (3 pages).
Appli-cad Australia, "Linear Nesting Reports," AppliCad Australia, UK Sample Reports, Jul. 18, 2000 (9 pages).
Appli-cad Australia, "Roof Magician: Especially Suited to Shingle, Shake and Tile Roofing," Sample Reports, Jun. 24, 2004 (13 pages).

(56) References Cited

OTHER PUBLICATIONS

Appli-cad Australia, "Roof Wizard: Advanced Software for Roof Modeling and Estimating," Sep. 25, 2004 (10 pages).
Appli-cad Australia, "Roof Wizard: Especially Suited to Metal Roofing", Mar. 9, 2005 (7 pages).
Appli-cad Australia, "Roof Wizard: Especially Suited to Metal Roofing," Jul. 13, 2004 (24 pages).
Appli-cad Australia, "Roof Wizard: Especially Suited to Metal Roofing," Sep. 14, 2006 (7 pages).
Appli-cad Australia, "Roof Wizard: Especially Suited to Metal Roofing," Sep. 17, 2002 (12 pages).
Appli-cad Australia, "Sorcerer: Advanced Software for Roof Modeling and Estimating," Reference Guide V. 3, Sep. 8, 1999 (142 pages).
Appli-cad Australia, "Sorcerer: The Complete Solution for Professional Roof Estimating," Demonstration Kit, Mar. 9, 2005 (15 pages).
Applicad Roofing, sample report, Jul. 30, 2007 (1 page).
Applicad Roofing, sample report, Mar. 2, 2005 (28 pages).
AppliCad USA, "Linear Nesting Reports," AppliCad Sample Reports, Nov. 25, 1999 (10 pages).
Applicad webpage 2005 snip different color lines (1 page).
Applicad, "Example Output and Brochures," retrieved from URL= http://www.applicad.com/auiproduct-reports.html, Apr. 16, 2012 (2 pages).
Applicad, "Product Bulletin—Nov. 2002: Key Features of Our Roofing Software," Nov. 2002 (46 pages).
AppliCad, "Product Overview—Sorcerer: Advanced Software for Roofing Modeling, Estimating, Presentation and Installation," Issue 5, Mar. 2, 2001 (13 pages).
AppliCad, "Roofing Software: Product Bulletin Section 1—Modeling the Roof," Dec. 20, 2005 (3 pages).
AppliCad, "Roofing Software: Product Bulletin Section 1—Modeling the Roof," Jan. 7, 2002 (3 pages).
AppliCad, "Roofing Software: Product Bulletin Section 2—Modifying the Model," Dec. 20, 2005 (2 pages).
AppliCad, "RoofScape: Advanced Software for Roof Modelling and Estimating," Learning Guide (English Units) Revision 1.1, Aug. 23, 2007 (48 pages).
AppliCad, "Tips and Tricks: Items drawn from AppliCad's Customer Service file", Jul. 27, 2007 (11 pages).
Autodesk, "Autodesk ImageModeler—Features", http://usa.autodesk.com/adsk/servlet/index?siteID=123112&id=115639 . . . , 2008 (1 page).
Automatic House Reconstruction, retrieved on Sep. 29, 2008, from http://www.vision.ee.ethz.ch/projects/Amobe_I/recons.html (6 pages).
Avrahami, et al., "Extraction of 3D Spatial Polygons Based on the Overlapping Criterion for Roof Extraction from Aerial Images", International Archives of Photogrammetry, Remote Sensing & Spatial Information Sciences, Aug. 29-30, 2005 (6 pages).
Office Action dated Sep. 8, 2022, issued in connection with U.S. Appl. No. 17/560,718 (10 pages).
Communication Pursuant to Article 94(3) EPC dated Nov. 15, 2022, issued by the European Patent Office in connection with European Patent Application No. 19171426.0 (11 pages).
Office Action dated May 9, 2022, issued by the Canadian Intellectual Property Office in connection with Canadian Patent Application No. 2,864,831 (3 pages).
Office Action dated Mar. 6, 2023, issued in connection with U.S. Appl. No. 17/499,308 (11 pages).
Office Action dated Feb. 15, 2023, issued by the Canadian Intellectual Property Office in connection with Canadian Patent Application No. 2,864,831 (3 pages).
Examination Report No. 2 dated Mar. 23, 2023, issued by the Australian Patent Office in connection with Australian Patent Application No. 2021201579 (3 pages).
Notice of Allowance dated Mar. 22, 2023, issued in connection with U.S. Appl. No. 17/560,718 (9 pages).
Office Action dated Mar. 15, 2023, issued by the Columbian Patent Office , along with an English translation, in connection with Columbian Patent Application No. NC2022/0008984 (61 pages).
Mikhail, et al., "Introduction to Modern Photogrammetry", John Wiley&Sons, Inc., New York, 2001 (487 pages).
Mikuni, "Chapter 7: Digital Orthophotos: Production, Mosaicking, and Hardcopy". Digital Photogrammetry: An Addendum to the Manual of Photogrammetry, 1996 (11 pages).
Miller, "Pictometry in Arlington Virginia:Software gives small Arlington the big picture", Dec. 2001 (2 pages).
Miller, et al., "Miller's Guide to Framing and Roofing", McGraw Hill, New York, 2005 (9 pages).
Minialoff, "Introduction to Computer Aided Design", Apr. 2000 (4 pages).
Moons, et al., "Automatic Modelling and 3D Reconstruction of Urban House Roofs from High Resolution Aerial Imagery", 2006 (16 pages).
Mortensen, et al., "Intelligent Scissors for Image Composition", Brigham Young University, 1995 (8 pages).
Moscatelli, et al., "Advanced Topics in Artificial Intelligence" Lecture Notes in Computer Science vol. 617, 1992, pp. 161-197 (37 pages).
Mostafa, et al., "A Multi-Sensor System for Airborne Image Capture and Georeferencing," Photogrammetric Engineering & Remote Sensing, vol. 66, No. 12, Dec. 2000 (7 pages).
Nizar, et al., "Reconstruction of Buildings from Airborne Laser Scanning Data", 2006 (10 pages).
Nobel, et al., "Histogram Classification Using Vector Quantization" Proc. IEEE Int. Symp. Information Theory; 1994; p. 391 (1 page).
Noronha, et al., "Detection and Modeling of Buildings from Multiple Aerial Images". IEEE Transactions on Pattern Analysis and Machine Intelligence, vol. 23, No. 5, May 2001 (32 pages).
Office Action dated Feb. 27, 2020, issued by the Canadian Intellectual Property Office in connection with Canadian Patent Application No. 2,864,831 (3 pages).
Ortner, et al., "Building Extraction from Digital Elevation Model", INRIA, Jul. 2002 (51 pages).
Perlant, et al., "Scene Registration in Aerial Image Analysis". Digital Mapping Laboratory, School of Computer Science. Carnegie Mellon University, Pittsburg PA, 1990 (13 pages).
Photogrammetric Engineering and Remote Sensing, "PE&RS, Journal of the American Society for Photogrammetry and Remote Sensing", vol. 68, No. 9, Sep. 2002 (2 pages).
PhotoModeler Pro 4.0—The New Release, "The Premier Software for Measuring and Modeling the Real-World is even better!," 1995-2000 (35 pages).
Photomodeler.com, "PhotoModeler Pro 5: Measuring and Modeling the Real World", 2003 (2 pages).
Pictometry Intelligent Images, EFS Version 2.7 Release Notes, 2007 (30 pages).
Pictometry International Corp., "Electronic Field Study User Guide". Version 2.7, Jul. 2007 (536 pages).
Pictometry Online, "Government", Oct. 7, 2008 (3 pages).
Pictometry search results, researched on Sep. 23, 2013 (21 pages).
Pictometry Visual Intellicence, "Pictometry—In the News, Pictometry Announces Software and Web-based Solution for Engineers, Architects, and Planners", 2009 (3 pages).
Pictometry Visual Intelligence, "Frequently Asked Questions", 2005 (6 pages).
Pictometry Visual Intelligence, http://web.archive.org/web/20020725232638/http://www.pictometry.com, 1995-2002 (2 pages).
Porway, et al., "A Hierarchical and Contextual Model for Aerial Image Parsing," 2008 (53 pages).
Poullis, et al., "Photogrammetric Modeling and Image-based Rendering for Rapid Virtual Environment Creation", 1998 (7 pages).
PrecigeoRoof, "Why precigeoRoof", Jan. 7, 2007 (2 pages).
Preciozzi, "Dense Urban Elevation Models From Stereo Images by an Affine Region Merging Approach," Master's Thesis, Universidad de la Republica, Montevideo, Sep. 18, 2006 (93 pages).
Reddy, et al., "Frequency-Space Decomposition and Acquisition of Light Transport Under Spatially Varying Illumination", EECV 2012 (14 pages).

(56) References Cited

OTHER PUBLICATIONS

RoofCAD, "Satellite Takeoff Tutorial—Pitched Roof", 2012 (25 pages).
RoofCAD, "User Guide", True North Estimating Systems, Ltd., 2003 (320 pages).
Rottensteiner, et al., "Automatic Generation of Building Models from Lidar Data and the Integration of Aerial Images," ISPRS, vol. XXXIV, 2003 (7 pages).
Rupnik, et al., "Oblique Multi-Camera Systems—Orientation and Dense Matching Issues", The International Archives of teh Photogrammetry, Remote Sensing and Spatial Information Sciences, vol. XL-3W1, 2014 (8 pages).
San, et al., "Building Extraction from High Resolution Satellite Images Using Hough Transform," International Archives of the Photogrammetry, Remote Sensing and Spatial Information Science, vol. XXXVIII, 2010 (6 pages).
Scholze, et al., "A Probabilistic Approach to Building Roof Reconstruction Using Semantic Labelling", 2002 (8 pages).
Seitz, et al., "A Comparison and Evaluation of Multi-View Stereo Reconstruction Algorithms", CVPR 2006 (8 pages).
Shafer, et al., "Recursive Region Segmentation by Analysis of Histograms" Proc. IEEE Int. Conf. Acoustics, Speech, Signal Processing, 1982, pp. 1166-1171 (6 pages).
Shan, et al., "Refractive Height Fields from Single and Multiple Images", 2012 (8 pages).
Stilla, et al., "Reconstruction of Building Models from Maps and Laser Altimeter Data" Agouris and Stefanidis (Eds.): ISD'99, LNCS1737, pp. 34-46, 1999 (13 pages).
Syed, et al., "Semi-Automatic 3D Building Model Generation From Lidar and High Resolution Imagery," Proceedings of SSC Spatial Intelligence, Sep. 2005 (8 pages).
Taillandier, et al., "Automatic Building Reconstruction from Aerial Images: A Generic Bayesian Framework", 2004 (6 pages).
Ulm, et al., "3D City Modelling with Cybercity-Modeler", 1st EARSel workshop of the SIG Urban Remote Sensing, Mar. 2-3, 2006 (9 pages).
University of Washington, "College of Arts & Sciences Mathematics: Detailed course offerings . . . ", retrieved from http://www.washington.edu/students/crscat/math.html on Oct. 25, 2013 (16 pages).
Verma, "3D Building Detection and Modeling from Aerial LIDAR Data," IEEE, 2006 (8 pages).
Vosselman, "Fusion of Laser Scanning Data, Maps, and Aerial Photographs for Building Reconstruction", 2002 (4 pages).
Vosselman, et al. "Map Based Building Reconstruction from Laser Data and Images", 2001 (9 pages).
Vosselman, et al., "Mapping by Dragging and Fitting of Wire-Frame Models", Photogrammetric Engineering and Remote Sensing, Jul. 1999 (8 pages).
Wang, et al., "Pictometry's Proprietary Airborne Digital Imaging System and It's Application In 3D City Modelling", 2008 (6 pages).
Wattenberg, et al., "Area, Volume and Torque in Three Dimensions", retrieved from http://www.math.montana.edu/frankw/ccp/multiworld/twothree/atv/learn.htm on Sep. 24, 2013 (14 pages).
Azuma, et al., "View-dependent Refinement of Multiresolution Meshes with Subdivision Connectivity", Feb. 2003 (9 pages).
Baillard, et al., "3-D Reconstruction of Urban Scenes from Aerial Stereo Imagery: A Focusing Strategy," Computer Vision and Image Understanding, vol. 76, No. 3 pp. 244-258, Dec. 1999 (15 pages).
Baillard, et al., "Automatic Reconstruction of Piecewise Planar Models from Multiple Views", 1999 (7 pages).
Bazaraa, et al., "Nonlinear Programming Theory and Algorithms", Second Edition, John Wiley & Sons, Inc., New York, 1993 (646 pages).
Behley, et al., "Generation of 3D City Models using Domain-Specific Information Fusion", Institute of Computer Science III, 2009 (10 pages).
Bernhardsen, "Geographic Information Systems, An Introduction," 2nd Ed., 1999 (4 pages).
Bertan, et al., "Automatic 3D Roof Reconstruction Using Digital Cadastral Map, Architectural Knowledge and an Aerial Image," 2006 (4 pages).
Bhanu, et al. "Adaptive Integrated Image Segmentation and Object Recognition; IEEE Trans. Systems, Man, and Cybernetics—Part C" Applications and Reviews, vol. 30, No. 4, Nov. 2000; 427-441 (15 pages).
Bhat, et al., "A Perceptually-Motivated Optimization-Framework for Image and Video Processing", 2008 (10 pages).
Bhat, et al., "Fourier Analysis of the 2D Screened Poisson Equation for Gradient Domain Problems", ECCV 2008 (14 pages).
Bhat, et al., "GradientShop: A Gradient-Domain Optimization Framework for Image and Video Filtering", 2010 (14 pages).
Bhat, et al., "Piecewise Image Registration in the Presence of Multiple Large Motions", Jun. 2006 (7 pages).
Bhat, et al., "Using Photographs to Enhance Videos of a Static Scene", Eurographics Symposium on Rendering, 2007 (12 pages).
Bignone, et al., "Automatic Extraction of Generic House Roofs from High Resolution Aerial Imagery", 1996 (12 pages).
Brofferio, et al., "Interactive Detection of 3D Models of Building's Roofing for the Estimation of the Solar Energy Potential," Sep. 4-8, 2006 (5 pages).
Burrough, et al., "Principles of Geographical Information Systems", Spatial Information Systems and Geostatistics, 1998 (14 pages).
Capell, et al., "A Multiresolution Framework for Dynamic Deformations", SIGGRAPH 2002 (8 pages).
Census Transform—<https://en.wikipedia.org/wiki/Census_transform>—webpage last edited on Oct. 24, 2019 (2 pages).
Chen, et al., "Building Reconstruction from LIDAR Data and Aerial Imagery", IEEE 2005 (4 pages).
Chen, et al., "Fusion of LIDAR Data and Optical Imagery for Building Modeling", 2004 (6 pages).
Chen, et al., "Reconstruction of Building Models with Curvilinear Boundaries from Laser Scanner and Aerial Imagery", 2006 (10 pages).
Chevrier, et al., "Interactive 3D Reconstruction for Urban Areas: An image based tool", 2001 (13 pages).
Chikomo, et al., "An Integrated Approach to Level-of-Detail Building Extraction and Modelling Using Airborne LIDAR and Optical Imagery", Sep. 19-21, 2007 (6 pages).
Choi, et al. "Vehicle Detection from Aerial Images Using Local Shape Information" PSIVT 2009, LNCS 5414; Springer-Verlag Berlin Heidelberg; 2009; pp. 227-236 (10 pages).
Chuang, et al., "A Bayesian Approach to Digital Matting", IEEE 2001 (8 pages).
Chuang, et al., "Animating Pictures with Stochastic Motion Textures", SIGGRAPH, 2005 (8 pages).
Chuang, et al., "Animating Pictures with Stochastic Motion Textures", Technical Report UW-CSE-04-04-02, 2005 (7 pages).
Chuang, et al., "Environment Matting Extensions: Towards Higher Accuracy and Real-Time Capture", SIGGRAPH 2000 (10 pages).
Chuang, et al., "Shadow Matting and Compositing", SIGGRAPH 2003 (7 pages).
Clarke, "Getting Started with Geographic Information Systems," Geographic Information Science, 2nd Ed., 1999 (7 pages).
Colburn, et al., "Image-Based Remodeling", IEEE Transactions on Visualization and Computer Graphics, vol. 19, No. 1, 2012 (13 pages).
Collins, et al., "Automatic Extraction of Buildings and Terrain from Aerial Images", Department of Computer Science, University of Massachusetts, 1995 (10 pages).
Collins, et al., "Site Model Acquisition and Extension from Aerial Images" ICCV '95 Proc. 5th Int. Conf. Computer Vision; 1995; pp. 1-6 (6 pages).
Collins, et al., "UMass Progress in 3D Building Model Acquisition", 1996 (11 pages).
Notice of Allowance dated Nov. 14, 2016, issued in connection with U.S. Appl. No. 14/450,861 (11 pages).
Notice of Allowance dated Jul. 25, 2016, issued in connection with U.S. Appl. No. 14/450,861 (12 pages).
Notice of Allowance dated Apr. 6, 2021, issued in connection with U.S. Appl. No. 16/703,644 (9 pages).

(56) References Cited

OTHER PUBLICATIONS

Notice of Allowance dated Aug. 19, 2021, issued in connection with U.S. Appl. No. 16/709,112 (5 pages).
Notice of Allowance dated Aug. 4, 2021, issued in connection with U.S. Appl. No. 16/748,174 (8 pages).
Notice of Allowance dated Jan. 14, 2016, issued in connection with U.S. Appl. No. 13/397,325 (5 pages).
Notice of Allowance dated Jul. 23, 2019, issued in connection with U.S. Appl. No. 15/358,870 (8 pages).
Notice of Allowance dated May 20, 2016, issued in connection with U.S. Appl. No. 13/397,325 (7 pages).
Notice of Allowance dated Sep. 20, 2016, issued in connection with U.S. Appl. No. 13/397,325 (5 pages).
Notice of Allowance dated Sep. 23, 2019, issued in connection with U.S. Appl. No. 15/621,458 (10 pages).
Notice of Allowance dated Sep. 9, 2020, issued in connection with U.S. Appl. No. 16/365,847 (13 pages).
Office Action dated Apr. 16, 2021, issued by the Canadian Patent Office in connection with Canadian Patent Application No. 2,864,831 (7 pages).
Office Action dated Jul. 6, 2021, issued by the Canadian Patent Office in connection with Canadian Patent Application No. 2,920,251 (3 pages).
Office Action dated Mar. 4, 2019, issued in connection with U.S. Appl. No. 15/358,870 (7 pages).
Office Action dated Oct. 9, 2018, issued by the Canadian Intellectual Property Office issued in connection with Canadian Patent Application No. 2,864,831 (6 pages).
Office Action dated Sep. 15, 2020, issued by the Canadian Patent Office in connection with Canadian Patent Application No. 2,920,251 (4 pages).
Gonzalez, et al., "Digital Image Processing", Addison-Wesley Publishing Company, Inc., 1993 (735 pages).
Gulch, et al., "On the Performance of Semi-Automatic Building Extraction", In the International Archives of Photogrammetry and Remote Sensing, vol. 23, 1998 (8 pages).
Gulch, et al., "On the Performance of Semi-Automatic Building Extraction," Commission III, Working Group 4, 1998 (8 pages).
Hartley, "In Defense of the Eight-Point Algorithm", IEEE Transactions on Pattern Analysis and Machine Intelligence, vol. 19, No. 6, Jun. 6, 1997 (14 pages).
Hartley, et al., "Invariant and Calibration-Free Methods in Scene Reconstruction and Object Recognition", Final Technical Report, Feb. 28, 1997 (266 pages).
Hartley, et al., "Multiple View Geometry in Computer Vision", Second Edition, Cambridge University Press, 2003 (672 pages).
Hartley, et al., "Multiple View Geometry in Computer Vision: 2.4 A Hierarchy of Transformations", Cambridge University Press, 2003 (9 pages).
Hartley, et al., "Multiple View Geometry in computer vision: Appendix 6—Iterative Estimation Methods", Cambridge University Press, Second Edition, 2003 (34 pages).
Henricsson, et al., "3-D Building Reconstruction with Aruba: A Qualitative and Quantitative Evaluation", Institute of Geodesy and Photogrammetry, 2001 (12 pages).
Higgins, "A Computer Algorithm for Reconstructing a Scene from Two Projections", Macmillan Journals Ltd article, vol. 293, Sep. 10, 1981 (3 pages).
Hill, "Pictometry: Aerial Photography on Steroids", www.law-enforcement.com, Jul. 2002 (3 pages).
Hirschmuller, "Stereo Processing by Semi-Global Matching and Mutual Information," IEEE transactions on Pattern Analysis and Machine Intelligence, vol. 30, 2, Dec. 2007 (14 pages).
Hsieh, "Design and Evaluation of a Semi-Automated Site Modeling System", Carnegie Mellon, Nov. 1995 (83 pages).
Hsieh, "SiteCity: A Semi-Automated Site Modelling System", IEEE, 1996 (8 pages).
Hu, et al., "Building Modeling From LIDAR and Aerial Imagery", 2004 (8 pages).
Hudson, "Appendix D: Merging VRML Models Extending the Use of Photomodeller", University of Virginia, Mar. 23, 1998 (23 pages).
International Search Report of the International Searching Authority dated Apr. 26, 2013, issued in connection with International Application No. PCT/US2013/26385 (2 pages).
International Search Report of the International Searching Authority dated Jan. 29, 2021, issued in connection with International Application No. PCT/US2020/063004 (3 pages).
International Search Report of the International Searching Authority dated Nov. 17, 2014, issued in connection with International Application No. PCT/US14/49605 (3 pages).
Jaw, et al., "Building Roof Reconstruction by Fusing Laser Range data and Aerial Images", The International Archives of the Photogrammetry, Remote Sensing and Spatial Information Sciences. vol. XXXVII. Part B3b. 2008 (6 pages).
Jaynes, et al., "Recognition and Reconstruction of Buildings from Multiple Aerial Images," Oct. 18, 2001 (37 pages).
Johnson, et al., Surface Matching for Object Recognition in Complex 3-D Scenes, 1998 (31 pages).
Kaufhold, et al., "Recognition and Segmentation of Scene Content Using Region-Based Classification" Proceedings of the 18th International Converence on Pattern Recognition (ICPR'06); 2006; pp. 1-6 (6 pages).
Khoshelham, et al., "A Model-Based Approach to Semi-Automated Reconstruction of Buildings from Aerial Images", The Photogrammetric Record, Dec. 2004 (18 pages).
Kolbl, et al., "Chapter 2: Scanning and State-of-the-Art Scanners". Digital Photogrammetry: An Addendum to the Manual of Photogrammetry, 1996 (37 pages).
Kolman, "Elementary Linear Algebra: Chapter 4, Linear Transformations and Matrices", Second Edition, Macmillan Publishing Co., 1997 (12 pages).
Korte, "The GIS Book: Understanding the Value and Implementation of Geographic Information Systems", 4th Ed., 1997 (14 pages).
Krainin, et al., "Autonomous Generation of Complete 3D Object Models Using Next Best View Manipulation Planning", CRA 2011 (7 pages).
Kushal, et al., "Photo Tours", 3DimPVT, Oct. 2012 (8 pages).
Labe, et al., "Robust Techniques for Estimating Parameters of 3D Building Primitives", International Society for Photogrammetry and Remote Sensing, vol. XXXII, Part 2, Commission II, Proceedings of the Commission II Symposium, Data Integration: Systems and Techniques, Jul. 13-17, 1998 (11 pages).
Lee, et al., "Fusion of Lidar and Imagery for Reliable Building Extraction", Photogrammetric Engineering and Remote Sensing, Feb. 2008 (11 pages).
Levoy, "The Digital Michelangelo Project", retrieved from http://www-graphics.stanford.edu/projects/mich/ on Oct. 25, 2013 (10 pages).
Levoy, et al., "The Digital Michelangelo Project: 3D Scanning of Large Statues", 2000 (14 pages).
LexisNexis, "Software; New Products", Roofing Contractor, Jan. 3, 2006 (1 page).
Li, et al., "Automated Generation of Interactive 3D Exploded View Diagrams" SIGGRAPH 2007 (7 pages).
Li, et al., "Interactive Cutaway Illustrations of Complex 3D Models", ACM Transactions on Graphics 26(3), SIGGRAPHY, 2007 (11 pages).
Liu, et al., "Building Extraction from High Resolution Satellite Imagery Based on Multi-scale Image Segmentation and Model Matching", IEEE 2008 (7 pages).
Lu, et al., "Automatic Building Detection Using the Dempster-Shafer Algorithm," Photogrammetric Engineering & Remote Sensing, vol. 72, No. 4, Apr. 2006 (9 pages).
Lu, et al., "Stereo Image Matching Using Robust Estimation and Image Analysis Techniques for Dem Generation," International Archives of Photogrammetry and Remote Sensing, vol. XXXIII, Part B3, Amsterdam 2000 (8 pages).
Lueders, "Infringement Allegations by Eagleview Technologies", Feb. 10, 2009 (3 pages).
Mahajan, et al., "A Theory of Frequency Domain Invariants: Spherical Harmonic Identities for BRDF/Lighting Transfer and

(56) References Cited

OTHER PUBLICATIONS

Image Consistency", IEEE Transactions on Pattern Analysis and Machine Intelligence, vol. 30, No. 2, Feb. 2008 (14 pages).
Mahajan, et al., "A Theory of Spherical Harmonic Identities for BRDF/Lighting Transfer and Image Consistency", ECCV 2006 (15 pages).
Maini, et al., "Study and Comparison of Various Image Edge Detection Techniques", International Journal of Image Processing, vol. 3: Issue 1, 2009 (12 pages).
Mann, "Roof with a view", Contract Journal, Nov. 23, 2005 (2 pages).
Maune, Chapter 6: DEM Extraction, Editing, Matching and Quality Control Techniques. Digital Photogrammetry: An Addendum to the Manual of Photogrammetry, 1996 (27 pages).
McGlone, "Chapter 5: Aerial Triangulation Adjustment and Image Registration," Digital Photogrammetry: An Addendum to the Manual of Photogrammetry, 1996 (25 pages).
McGlone, "Sensor Modeling in Image Registration, Chapter 5:Aerial Triangulation Adjustment and Image Registration", 1996 (9 pages).
McGlone, et al., "Projective and Object Space Geometry for Monocular Building Extraction," School of Computer Science, Carnegie Mellon University, Jun. 20-23, 1994 (31 pages).
McKeown, Jr., et al., "Chapter 9: Feature Extraction and Object Recognition, Automatic Cartographic Feature Extraction Using Photogrammetric Principles". Digital Photogrammetry: An Addendum to the Manual of Photogrammetry, 1996 (19 pages).
Meixner, et al., 3-Dimensional Building Details from Aerial Photography for Internet Maps, Institute for Computer Graphics and Vision, Apr. 8, 2011 (27 pages).
Office Action dated Nov. 5, 2015, issued in connection with U.S. Appl. No. 14/450,861 (14 pages).
Office Action dated Feb. 8, 2021, issued in connection with U.S. Appl. No. 16/709,112 (16 pages).
Office Action dated Jun. 16, 2015, issued in connection with U.S. Appl. No. 13/397,325 (16 pages).
Office Action dated Mar. 12, 2014, issued in connection with U.S. Appl. No. 13/397,325 (31 pages).
Office Action dated Mar. 19, 2019, issued in connection with U.S. Appl. No. 15/621,458 (10 pages).
Office Action dated Nov. 10, 2020, issued in connection with U.S. Appl. No. 16/748,174 (8 pages).
Office Action dated Oct. 21, 2014, issued in connection with U.S. Appl. No. 13/397,325 (36 pages).
Office Action dated Sep. 15, 2020, issued in connection with U.S. Appl. No. 16/703,644 (19 pages).
Cord, et al., "Bayesian Model Identification: Application to Building Reconstruction in Aerial Imagery", IEEE 1999 (5 pages).
Croitoru, et al., "Right-Angle Reooftop Polygon Extraction in Regularised Urban Areas: Cutting the Corners," Technion-Israel Institute of Technology, Dec. 2004 (31 pages).
Curless et al., "New Methods for Surface Reconstruction from Range Images", Dissertation, submitted to the Department of Electrical Engineering and the Committee of Graduate Studies of Stanford University, Jun. 1997 (209 pages).
Curless, "From Range Scans to 3D Models" SIGGRAPH Computer Graphics, 1999 (8 pages).
Curless, et al., "A Volumetric Method for Building Complex Models from Range Images", 1996 (10 pages).
Curless, et al., "Better Optical Triangulation through Spacetime Analysis", 1995 (8 pages).
Curless, et al., "Computer model and 3D fax of Happy Buddha", retrieved Oct. 25, 2013 (4 pages).
Debevec, et al., "Modeling and Rendering Architecture from Photographs: A hybrid geometry- and image-based approach," University of California at Berkeley, 1996 (10 pages).
Delaney, "Searching for Clients from Above—More Small Businesspeople Use Aerial mapping Services to Scout Potential Customers", The Wall Street Journal, Jul. 31, 2007 (4 pages).
Delaunay Triangulation—<https://en.wikipedia.org/wiki/Delaunay_triangulation>—webpage last edited on Feb. 13, 2020 (8 pages).

Directions Magazine, "Microsoft MSN Virtual Earth: The Map is the Search Platform", 2009 (10 pages).
Dynamic Programming—<https://en.wikipedia.org/wiki/Dynamic_programming>—webpage last edited on Feb. 24, 2020 (17 pages).
*Eagle View Tech* v. *Aerialogics LLC,* "Prior Art Presentation", Case No. 2:12-cv-00618-RAJ, Aug. 17, 2012 (61 pages).
Eagle View Technologies and Applicad Software, "AppliCad Software and EagleView Technologies Partner for Metal Roofing Contractors", EagleView Blog, Feb. 4, 2011 (2 pages).
ECE 390 Introduction to Optimization, Spring 2004, retrieved Oct. 25, 2013 (1 page).
Elaksher, et al., "Roof Boundary Extraction Using Multiple Images", Photogrammetric Record, Mar. 2003 (14 pages).
Elbernick, et al., "Adding the Third Dimension to A Topographic Database Using Airborne Laser Scanner Data", 2006 (6 pages).
European Search Report dated Aug. 9, 2019, issued by the European Patent Office in connection with European Patent Application No. 19171426.0 (9 pages).
European Search Report dated Mar. 14, 2017, issued by the European Patent Office in connection with European Patent Application No. 14832467.6 (6 pages).
Examination Report dated Apr. 4, 2022, issued by the Australian Patent Office in connection with Australian Patent Application No. 2021201579 (4 pages).
Examination Report dated Mar. 17, 2020, issued by the Australian Patent Office in connection with Australian Patent Application No. 2019200259 (4 pages).
Falkner, et al., "Aerial Mapping: Methods and Applications—Chapter 11: Aerotriangulation" Second Edition, 2002 (23 pages).
Faugeras, "What Can Be Seen in Three Dimensions with an Uncalibrated Stereo Rig?", 1992 (16 pages).
Faugeras, et al., "3-D Reconstruction of Urban Scenes from Sequences of Images", Institut National De Recherche En Informatique Et En Automatique, 1995 (26 pages).
Federal Register, "Notices", Geological Survey, vol. 64, No. 18, Jan. 28, 1999 (1 page).
Fisher, et al., "Dictionary of Computer Vision and Image Processing", John Wiley&Sons, 2005 (337 pages).
Flamanc, et al., "3D City Models: An Operational Approach Using Aerial Images and Cadastral Maps", Sep. 17-19, 2003 (6 pages).
Fritsch, "Introduction into Digital Aerotriangulation" Photogrammetric Week, Wichmann Verlag, Heidelberg, 1995 (7 pages).
Fritsch, et al., "Oblique Image Data Processing—Potential, Experiences and Recommendations", Photogrammetric Week, Wichmann/VDE Verlag, Berlin and Offenbach, 2013 (16 pages).
Furukawa, et al., "Manhattan-world Stereo", 2009 (8 pages).
Furukawa, et al., "Reconstructing Building Interiors from Images", 2009 (8 pages).
Furukawa, et al., "Towards Internet-scale Multi-view Stereo", 2010 (8 pages).
Gehrke, et al., "Semi-Global Matching: An Alternative to Lidar for DSM Generation?" published 2010 (6 pages).
Georgeiv, et al., "Spatio-Angular Resolution Tradeoff in Integral Photography" Eurographics Symposium on Rendering, 2006 (10 pages).
Geospan Corporation, "Digital Geo-Referenced Oblique Aerial Imagery Solution EPP-RFP No. 8444 5/13", 2007 (28 pages).
Getting to Know ArcView GIS: the geographic information sstem (GIS) for everyone, "Discover the world of desktop mapping and GIS," 1996-1998 (4 pages).
Gleicher, et al., "Image Snapping", Advanced Technology Group, Apple Computer, Inc., 1995 (8 pages).
Goesele, et al., "Multi-View Stereo for Community Photo Collections", Proceedings of ICCV, 2007 (8 pages).
Goesele, et al., "Multi-View Stereo Revisited", 2006 (8 pages).
Goldman, et al., "Interactive Video Object Annotation", Technical Report UW-CSE-2007-04-01, 2007 (7 pages).
Gomes, et al., "A Photogrammetric Project in Brazil: the Use of the PhotoModeler Software," 1999 (8 pages).
Gong, et al., "3D Model-Based Tree Measurement from High-Resolution Aerial Imagery", Photogrammetric Engineering and Remote Sensing, Nov. 2002 (10 pages).

(56) References Cited

OTHER PUBLICATIONS

Office Action dated Nov. 7, 2023, issued by the Canaddian Patent Office in connection with Canadian Patent Application No. 2,864,831 (5 pages).
Office Action dated Nov. 17, 2023, issued in connection with U.S. Appl. No. 17/499,308 (11 pages).
Extended European Search Report dated Dec. 8, 2023, issued by the European Patent Office in connection with European Patent Application No. 20895943.7 (11 pages).
Gong, et al., "Point Cloud and Digitial Surface Model Generation from High Resolution Multiple View Stereo Satellite Imagery," The International Archives of the Photogrammetry, Remote Sensing and Spatial Information Sciences, Jun. 2018 (8 pages).
Rothermel, et al., "Sure: Photogrammetric Surface Reconstruction from Imagery," Proceedings LC3D Workshop, Dec. 4, 2012 (9 pages).

* cited by examiner

SYSTEMS AND METHODS FOR MODELING STRUCTURES USING POINT CLOUDS DERIVED FROM STEREOSCOPIC IMAGE PAIRS

CROSS-REFERENCE TO RELATED APPLICATIONS

This application is a continuation of, and claims priority to U.S. patent application Ser. No. 16/703,644 filed on Dec. 4, 2019, the entire disclosure of which is expressly incorporated herein by reference.

BACKGROUND

Technical Field

The present disclosure relates generally to the field of computer modeling of structures. More specifically, the present disclosure relates to systems and methods for modeling structures using point clouds derived from stereoscopic image pairs.

Related Art

Accurate and rapid identification and depiction of objects from digital images (e.g., aerial images, satellite images, etc.) is increasingly important for a variety of applications. For example, information related to various features of buildings, such as roofs, walls, doors, etc., is often used by construction professionals to specify materials and associated costs for both newly-constructed buildings, as well as for replacing and upgrading existing structures. Further, in the insurance industry, accurate information about structures may be used to determine the proper costs for insuring buildings/structures. Still further, government entities can use information about the known objects in a specified area for planning projects such as zoning, construction, parks and recreation, housing projects, etc.

Various software systems have been implemented to process aerial images to generate 3D models of structures present in the aerial images. However, these systems have drawbacks, such as an inability to accurately depict elevation, detect internal line segments, or to segment the models sufficiently for cost-accurate cost estimation. This may result in an inaccurate or an incomplete 3D model of the structure. As such, the ability to generate an accurate and complete 3D model from 2D images is a powerful tool.

Thus, in view of existing technology in this field, what would be desirable is a system that automatically and efficiently processes digital images, regardless of the source, to automatically generate a model of a 3D structure present in the digital images. Accordingly, the computer vision systems and methods disclosed herein solve these and other needs.

SUMMARY

This present disclosure relates to systems and methods for generating three dimensional models of structures using point clouds derived from stereoscopic image pairs. The disclosed system can retrieve a pair of stereoscopic images and related metadata based on a user-specified geospatial region of interest. The system can then compute disparity values for each pixel of a target image of the stereoscopic image pair. Next, the system can compute a 3D point cloud using the target image and a reference image of the stereoscopic image pair. Optionally, the system can texture map the computed point cloud. The system can compute additional 3D point clouds using additional stereoscopic image pairs, and can fuse the computed 3D point clouds to create a final point cloud model of a structure. The point cloud can be used for further modeling purposes, such as delineating lines on top of the point cloud corresponding to features of structures (e.g., roofs, walls, doors, windows, etc.) and generating a three-dimensional wireframe model of the structures.

BRIEF DESCRIPTION OF THE DRAWINGS

The foregoing features of the invention will be apparent from the following Detailed Description of the Invention, taken in connection with the accompanying drawings, in which:

FIGS. 16-19A and 19B are diagrams illustrating the processing steps of FIG. 15;

DETAILED DESCRIPTION

The present disclosure relates to systems and methods for generating three dimensional geometric models of structures using point clouds derived from stereoscopic image pairs, as described in detail below in connection with FIGS. 1-30. The embodiments described below are related to constructing a 3D structure geometry and modeling various features of such structures, including, but not limited to, roofs, walls, doors, windows, buildings, awnings, houses, decks, pools, temporary structures such as tents, motor vehicles, foundations, etc.

Figure 1:
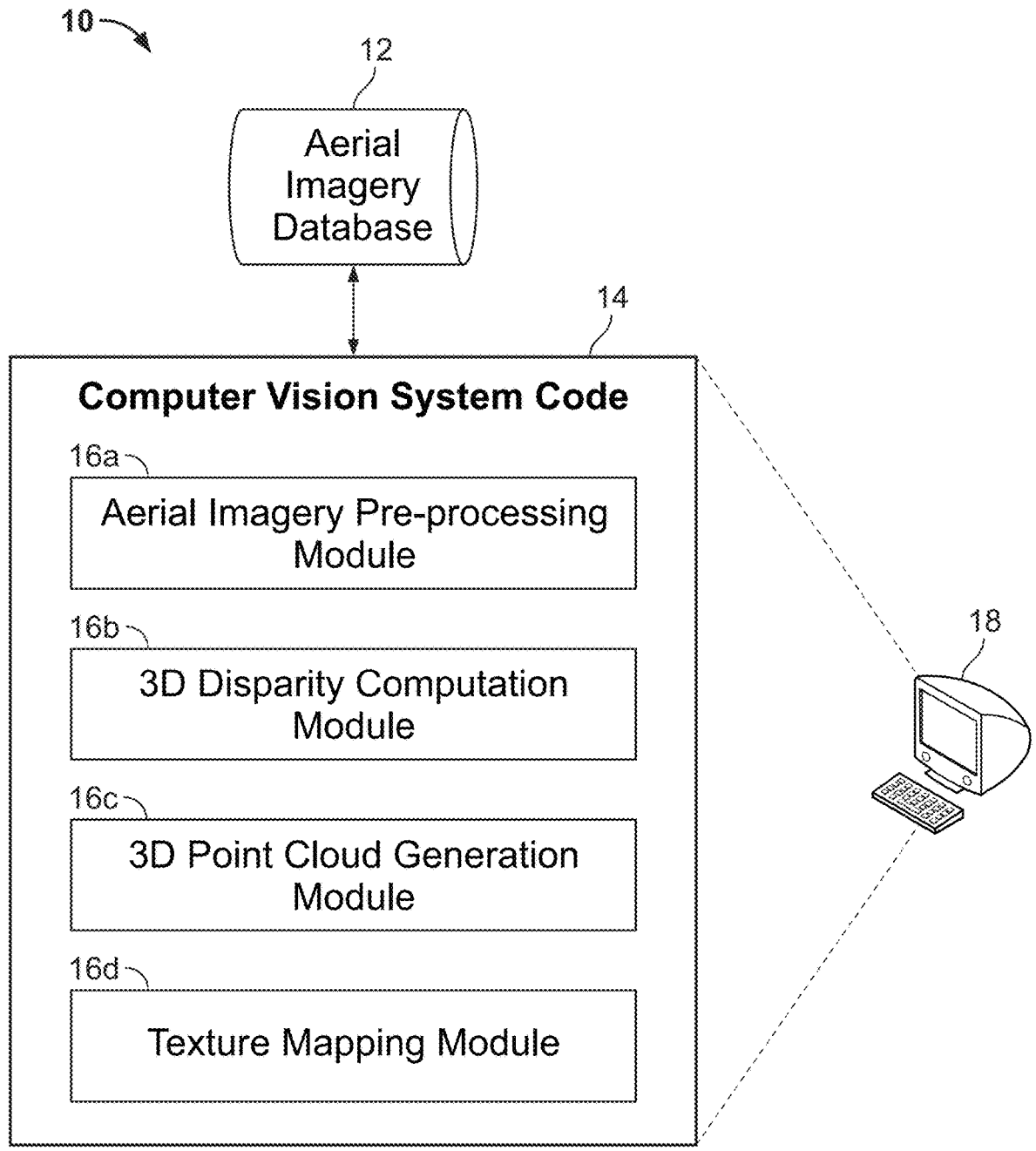
FIG. 1 is a diagram illustrating hardware and software components capable of being utilized to implement the system of the present disclosure.

FIG. 1 is a diagram illustrating hardware and software components capable of being utilized to implement the system 10 of the present disclosure. The system 10 could be embodied as a central processing unit 18 (e.g., a hardware processor) coupled to an aerial imagery database 12. The hardware processor executes system code which generates a 3D model of a roof structure based on a disparity map computed from a stereoscopic image pair and a 3D point cloud generated from the computed disparity map. The hardware processor could include, but is not limited to, a personal computer, a laptop computer, a tablet computer, a smart telephone, a server, and/or a cloud-based computing platform.

The system 10 includes computer vision system code 14 (i.e., non-transitory, computer-readable instructions) stored on a computer-readable medium and executable by the hardware processor or one or more computer systems. The code 14 could include various custom-written software modules that carry out the steps/processes discussed herein, and could include, but is not limited to, an aerial imagery pre-processing software module 16a, a 3D disparity computation software module 16b, a 3D point cloud generation software module 16c, and an optional texture mapping software module 16d. The code 14 could be programmed using any suitable programming languages including, but not limited to, C, C++, C#, Java, Python or any other suitable language. Additionally, the code could be distributed across multiple computer systems in communication with each other over a communications network, and/or stored and executed on a cloud computing platform and remotely accessed by a computer system in communication with the cloud platform. The code could communicate with the aerial imagery database 12, which could be stored on the same computer system as the code 14, or on one or more other computer systems in communication with the code 14.

Still further, the system 10 could be embodied as a customized hardware component such as a field-programmable gate array ("FPGA"), application-specific integrated circuit ("ASIC"), embedded system, or other customized hardware component without departing from the spirit or scope of the present disclosure. It should be understood that FIG. 1 is only one potential configuration, and the system 10 of the present disclosure can be implemented using a number of different configurations.

Figure 2:
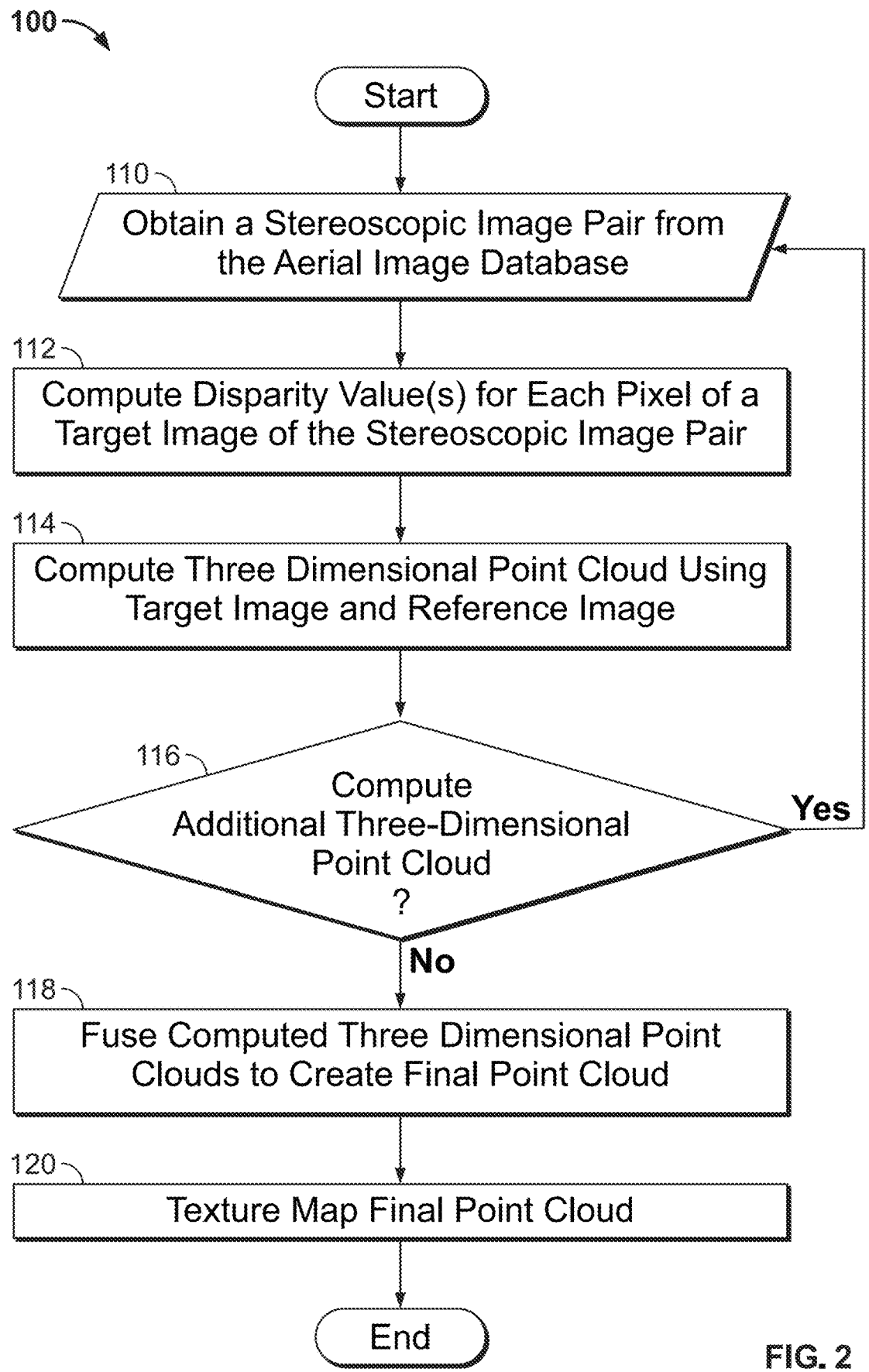
FIG. 2 is a flowchart illustrating overall process steps carried out by the system of the present disclosure.

FIG. 2 is a flowchart illustrating the overall process steps 100 carried out by the system 10 of the present disclosure. In step 110, the system 10 obtains a stereoscopic image pair from the aerial image database 12. In particular, the system 10 obtains two stereoscopic images and metadata thereof based on a geospatial region of interest ("ROI") specified by a user. For example, a user can input latitude and longitude coordinates of an ROI. Alternatively, a user can input an address or a world point of an ROI. The geospatial ROI can be represented by a generic polygon enclosing a geocoding point indicative of the address or the world point. The region can be of interest to the user because of one or more structures present in the region. A property parcel included within the ROI can be selected based on the geocoding point and a deep learning neural network can be applied over the area of the parcel to detect a structure or a plurality of structures situated thereon.

The geospatial ROI can also be represented as a polygon bounded by latitude and longitude coordinates. In a first example, the bound can be a rectangle or any other shape centered on a postal address. In a second example, the bound can be determined from survey data of property parcel boundaries. In a third example, the bound can be determined from a selection of the user (e.g., in a geospatial mapping interface). Those skilled in the art would understand that other methods can be used to determine the bound of the polygon.

The ROI may be represented in any computer format, such as, for example, well-known text ("WKT") data, TeX data, HTML data, XML data, etc. For example, a WKT polygon can comprise one or more computed independent world areas based on the detected structure in the parcel. After the user inputs the geospatial ROI, a stereoscopic image pair associated with the geospatial ROI is obtained from the aerial image database 12. As mentioned above, the images can be digital images such as aerial images, satellite images, etc. However, those skilled in the art would understand that any type of image captured by any type of image capture source can be used. For example, the aerial images can be captured by image capture sources including, but not limited to, a plane, a helicopter, a paraglider, or an unmanned aerial vehicle (UAV). In addition, the images can be ground images captured by image capture sources including, but not limited to, a smartphone, a tablet or a digital camera. It should be understood that multiple images can overlap all or a portion of the geospatial ROI.

In step 112, the system 10 computes at least one disparity value for each pixel of a target image of the obtained stereoscopic image pair. Then, in step 114, the system 10 computes a 3D point cloud using the target image and a reference image of the obtained stereoscopic image pair. Next, in step 116, the system determines whether to compute an additional 3D point cloud. If so, then the process returns to step 110 so that another 3D point cloud can be computed from another pair of stereoscopic images; otherwise, then the process proceeds to step 118. It is noted that each computed 3D point cloud corresponds to a particular viewing angle (orientation). In addition, the system 10 can register each computed 3D point cloud.

In step 118, the system 10 fuses one or more of the computed 3D point clouds to create a final point cloud.

Alternatively (or additionally), a user can manually align or fuse the one more of the computed 3D point clouds to create a final point cloud. The system 10 can also register the final point cloud. It is noted that the system 10 need not fuse multiple point clouds. Instead (or additionally), the system 10 can generate a plurality of point clouds (each generated by a pair of stereoscopic images), and can automatically select the best point cloud for the viewing angle to be displayed to the user. Alternatively, the system 10 can automatically select one or more views of the final point cloud or one or more views of a point cloud among the plurality of point clouds to be displayed to the user.

In step 120, the system 10 can optionally texture map the final point cloud to generate a 3D model of a roof structure present in the stereoscopic image pair. It is noted that the system need not texture map the final point cloud. Alternatively, the system could apply desired colors or patterns to various elements of the point cloud as desired. For example, a colorization process could be applied, wherein the system applies desired colors to elements of the cloud, such as a standard color (e.g., white, gray, yellow) for each point in the cloud, colors for each point of the cloud based on the point's normal, colors for each point based on point elevations, etc.

Figure 3:
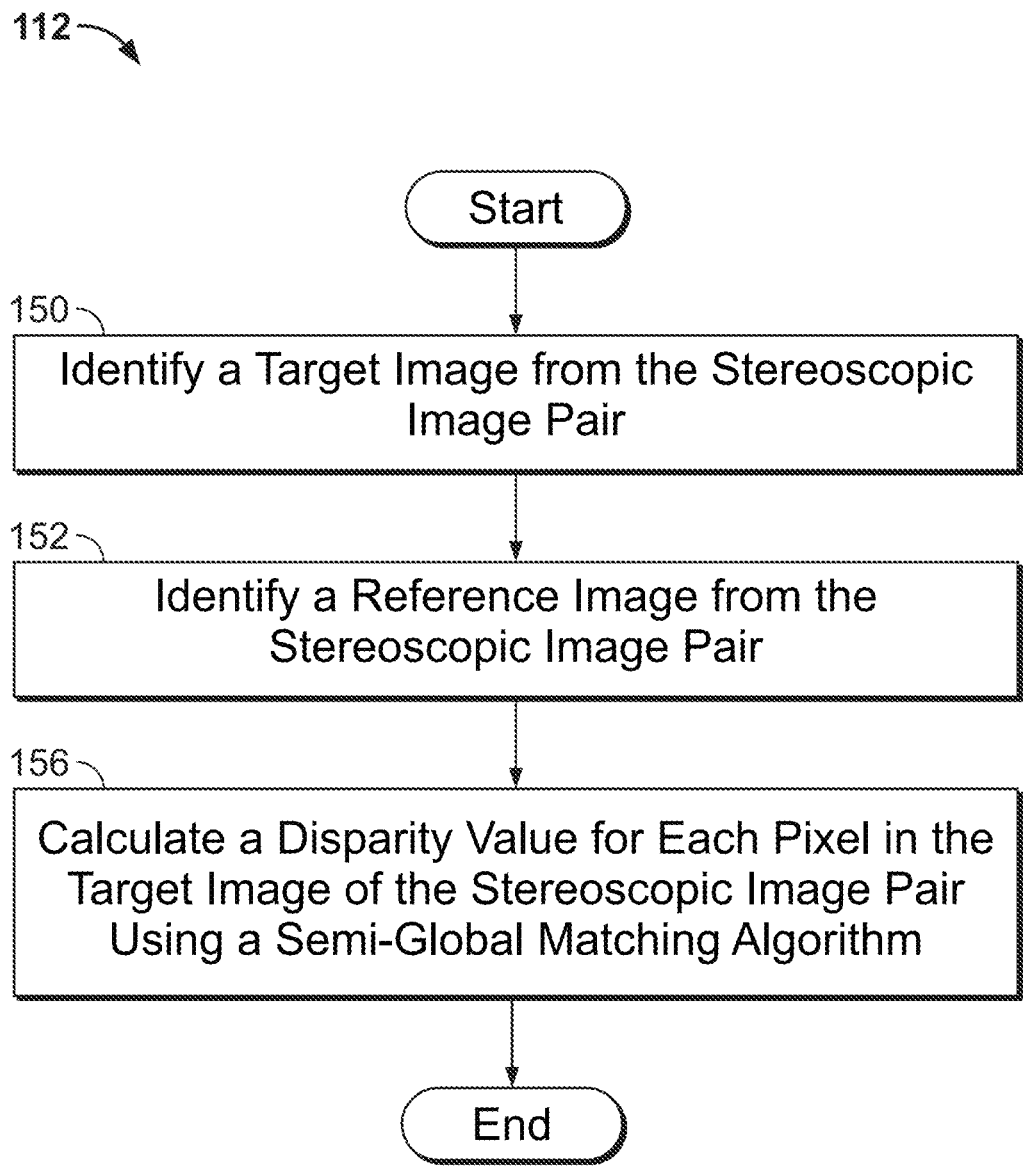
FIG. 3 is a flowchart illustrating step 112 of FIG. 2 in greater detail.

FIG. 3 is a flowchart illustrating step 112 of FIG. 2 in greater detail. In steps 150 and 152, the system identifies a target image from the stereoscopic image pair and a reference image from the stereoscopic image pair. Then, in step 156, the system 10 calculates a disparity value for each pixel in the identified target image of the stereoscopic image pair using a semi-global matching algorithm. The calculation of the disparity value will be discussed in greater detail below with reference to FIGS. 4 and 5.

Figure 4:
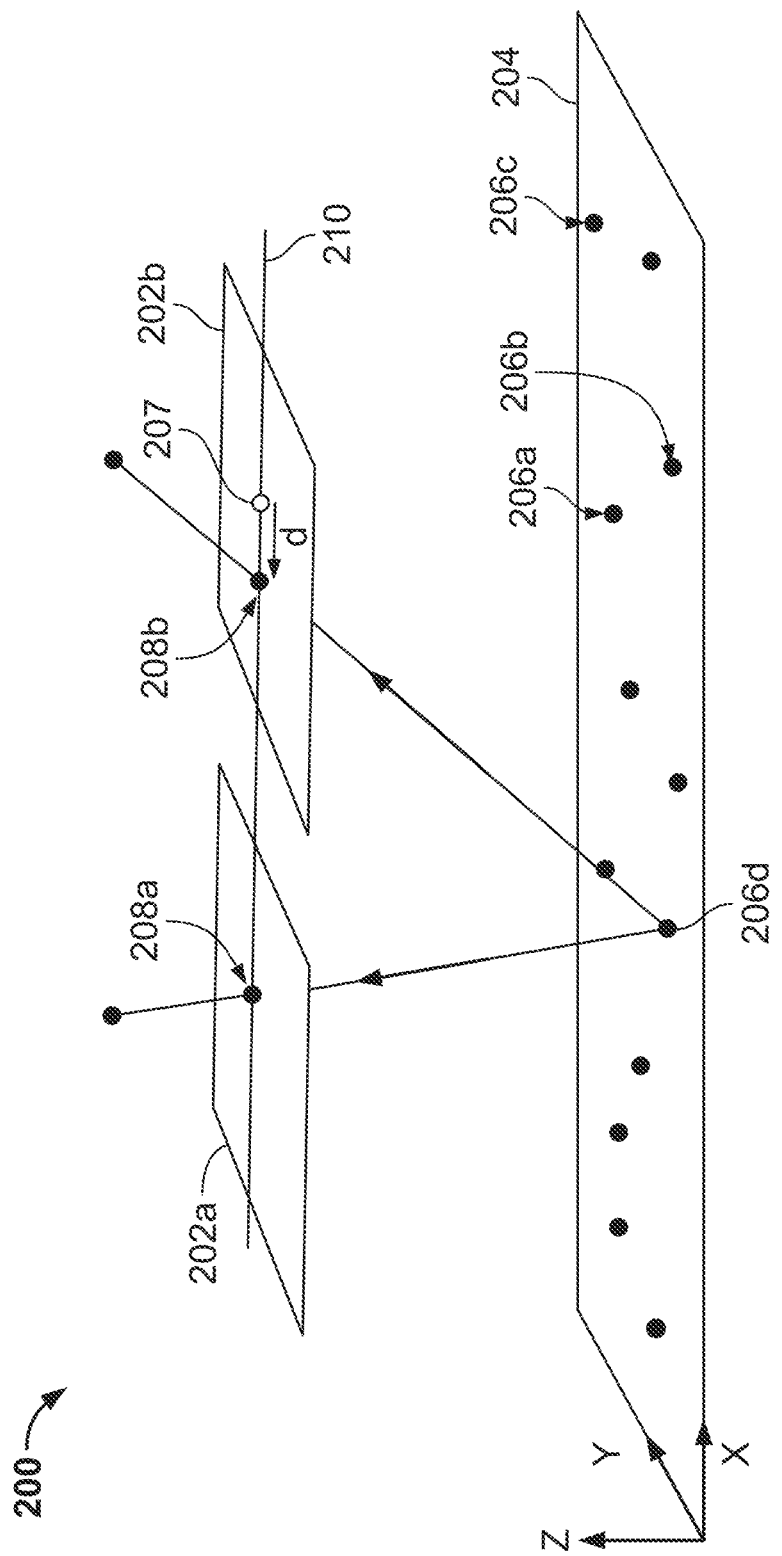
FIG. 4 is a diagram illustrating correspondences required between a target image and a reference image of the stereoscopic image pair to compute scale transformations.

FIG. 4 is a diagram 200 illustrating correspondences between a target image 202a and a reference image 202b of the stereoscopic image pair utilized to compute scale transformations. The system 10 can utilize scale transformations to adjust a vertical scale of an image to align the rows thereof and a horizontal scale to minimize a shift in horizontal pixel location to align corresponding 2D image points 208a and 208b. This shift is known as a disparity. For example, 2D image point 207 denotes a pixel location of an image point in the reference image 202b and disparity value d indicates a negative translation along the image row 210 in the reference image 202b to reach the corresponding image point 208b.

The computation of these respective transformations requires corresponding image location points in the target image 202a and the reference image 202b. The correspondences are found by specifying a horizontal plane in the world referred to as the zero-disparity plane 204. The vertical position of the zero-disparity plane 204 can be a local ground plane. A plurality of 3D points 206a, 206b, 206c, 206d are randomly selected from the zero-disparity plane 204 and are each projected into each of the target image 202a and the reference image 202b using cameras having rectified rotations applied. For example, as seen in FIG. 4, 3D point 206d is projected into the target image 202a as 2D point 208a and is projected into the reference image 202b as 2D point 208b. Since the same 3D point 206D is mapped to each of the target image 202a and the reference image 202b, the resulting 2D image points 208a and 208b are in correspondence. A 2D affine scale transformation is applied to calibrate each camera to align the rows of the target image 202a and the reference image 202b and minimize the disparity shift along the rows.

Figure 5:
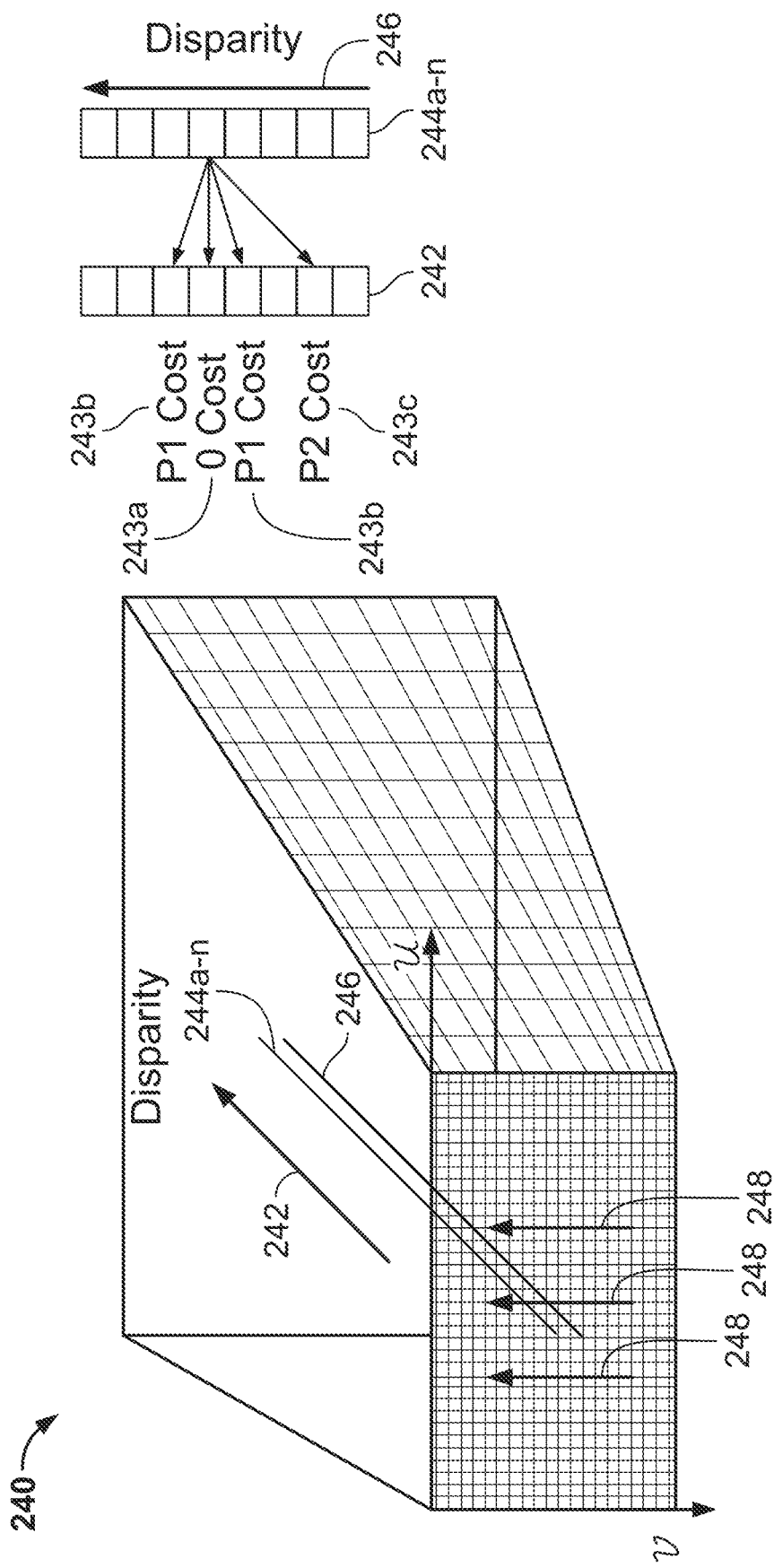
FIG. 5 is a diagram illustrating the calculation of a disparity value for each pixel in the target image of the stereoscopic image pair using a semi-global matching algorithm.

FIG. 5 is a diagram 240 illustrating calculation by the system of a disparity value for each pixel in the target image 202a of the stereoscopic image pair using a semi-global matching algorithm. The semi-global matching algorithm by Hirschmuller is a known stereo reconstruction algorithm that could be utilized to carry out this process. To reconstruct 3D points from a stereoscopic image pair, it is necessary to compute a disparity shift for each pixel in the target image 202a to locate the corresponding pixel in the reference image 202b. Referring to FIGS. 4 and 5, given the disparity value d and a pixel location $(u_t, v_t)$ in the target image 202a, the location of the corresponding pixel 208b in the reference image 202b is given by $(u_t+d, v_t)$ (i.e., a shifted location along the row $v_r$). As shown in FIG. 3, the disparity value d is negative.

The objective of the semi-global matching algorithm is to determine an optimum assignment of disparity values for each pixel in the target image 202a. In this case, an optimum assignment minimizes a cost measure of a similarity in image appearance at corresponding pixel locations between the target image 202a and the reference image 202b. The cost measure is defined such that the more similar the image neighborhoods are at the corresponding pixel locations, the lower the cost value. For example, a cost measure can be the absolute difference in intensities between the target image 202a and the reference image 202b. However, this cost measure is not a strong indicator of variations in image appearance that arise due to viewpoint-dependent reflectivity functions. Cost measures that can be stronger indicators of variations in image appearance include, but are not limited to, the derivative of the intensity in the u direction and the census transform. It is noted that cost measures can be combined to account for different image appearance conditions.

The semi-global matching algorithm also applies a form of conditioning to the cost measure to maintain planar surfaces flat even though there may be little difference in appearance on such featureless planar regions. That is, a conditioned cost measure includes penalties for gaps in disparity that can be overcome if the appearance match is well-localized (i.e., very low cost). For example, FIG. 4 illustrates that for every pixel 244a-n in the target image 202a, a search is made along the disparity direction 246 in the cost volume 242. The cost volume 242 is defined by discrete, one-pixel disparity steps along each target image 202a (u, v) column.

An effective disparity is a location where the cost is the least along that column of the cost volume 242. However, if a strong indicator for appearance localization is not apparent then the disparity value at the previous pixel location in the target image 202a can be utilized. For example, as shown in FIG. 5, a sweep 248 is executed in the vertical image direction and therefore the previous pixel location is the adjacent pixel in the previous row of the target image 202a. The semi-global matching algorithm carries out sweeps 248 in eight different directions in the target image 202a and sums the resulting costs at each pixel. These multiple sweep directions are applied to produce a smooth disparity surface. In contrast, earlier algorithms only executed a sweep in the horizontal image direction resulting in discontinuities in the disparity surface between rows.

The sweeps 248 implement a dynamic program to optimize the disparity assignments. For example, if the minimum appearance cost disparity value is not the same as the previous pixel, then an additional 0 cost 243a is imposed. If the minimum cost disparity position is either +1 or −1, an additional $P_1$ cost 243b is added. If the disparity shift is greater than ±1, a $P_2$ penalty 243c is added to the minimum appearance costs. The $P_1$ cost 243b is typically significantly less than the $P_2$ cost 243c to allow some disparity shifts between adjacent pixels in the sweep to account for sloped surfaces. The resulting disparity is located at the disparity with minimum total cost after all of the conditioned costs have been computed.

Figure 6:
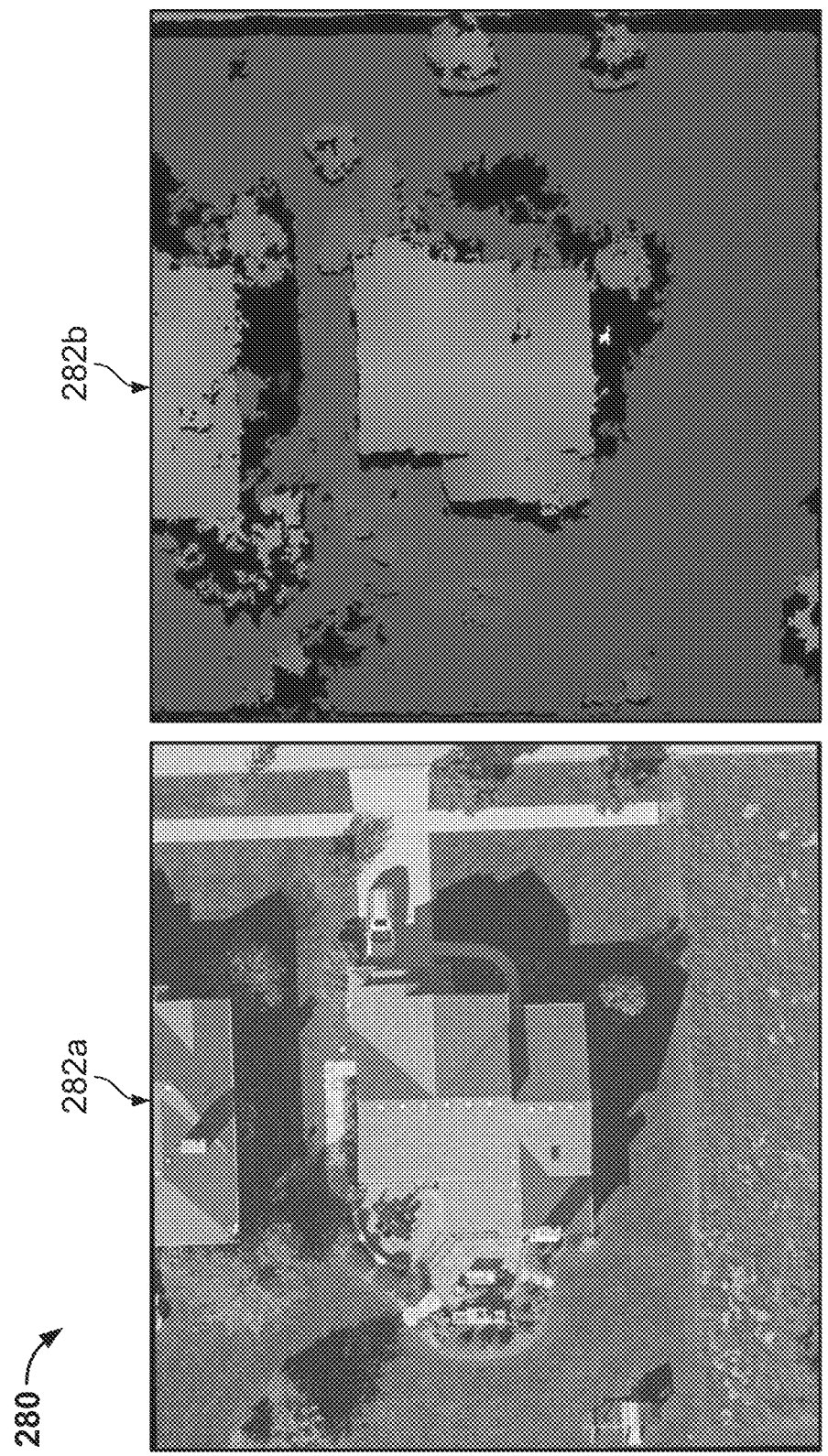
FIG. 6 is a diagram illustrating a rectified target image of the stereoscopic image pair and the minimum cost disparities calculated by the semi-global matching algorithm.

FIG. 6 is a diagram 280 illustrating a rectified target image 282a of the stereoscopic image pair and the minimum cost disparities 282b calculated by the semi-global matching algorithm. As shown in FIG. 6, negative values of disparities are indicative of higher elevation surfaces and are associated with darker points. It is noted that flat surfaces exhibit consistent disparity and a few isolated white points within some surfaces exhibit the presence of occlusion. Advantageously, the processing time of a stereoscopic image pair of approximately 2000×2000 pixels by the system of the present disclosure only requires approximately twenty seconds on a laptop computer. The processing time is directly proportional to the area of the image. For example, the time to rectify and compute a disparity is approximately four seconds for a stereoscopic image pair of approximately 900×900 pixels. The systems of the present disclosure thus provide a significant advantage in terms of a reduction in computational complexity and an increase in processing speed.

Figure 7:
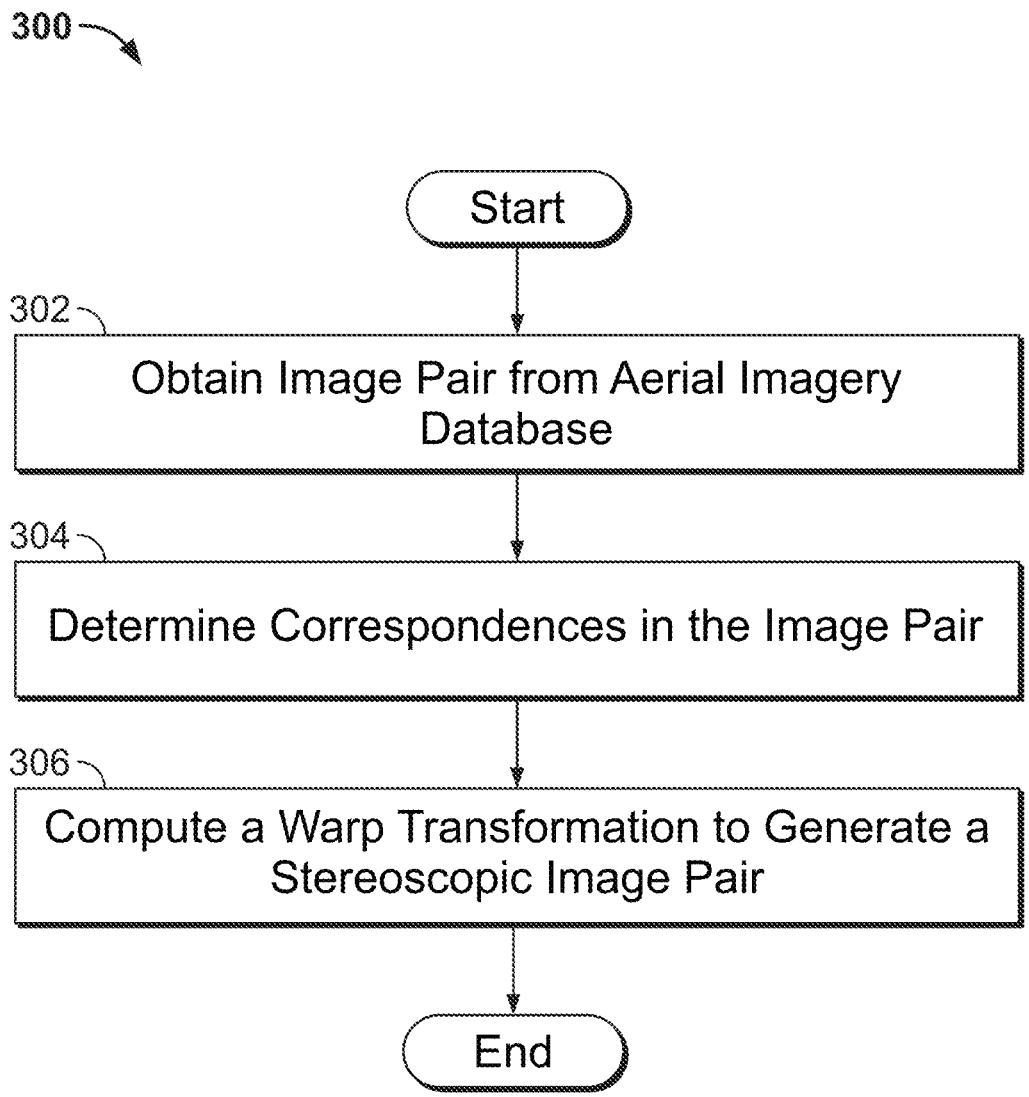
FIG. 7 is a flowchart illustrating process steps carried out by the system to rectify an arbitrary image pair.

FIG. 7 is a flowchart illustrating process steps 300 carried out by the system 10 to optionally rectify an arbitrary image pair. It is noted that the system 10 obtains a stereoscopic image pair from the aerial imagery database 12. However, the system 10 can also rectify an arbitrary image pair to obtain a stereoscopic image pair. Beginning in step 302, the system 10 obtains an arbitrary image pair from the aerial imagery database 12. Then, in step 304, the system 10 determines correspondences between a first image and a second image of the arbitrary image pair. These correspondences could be determined by projecting randomly-selected 3D points on the zero-disparity plane, and thus do not require correlation of points in the images. Lastly, in step 306, the system 10 computes a warp transformation based on the correspondences between the first image and the second image to generate a rectified stereoscopic image pair.

Figure 8:
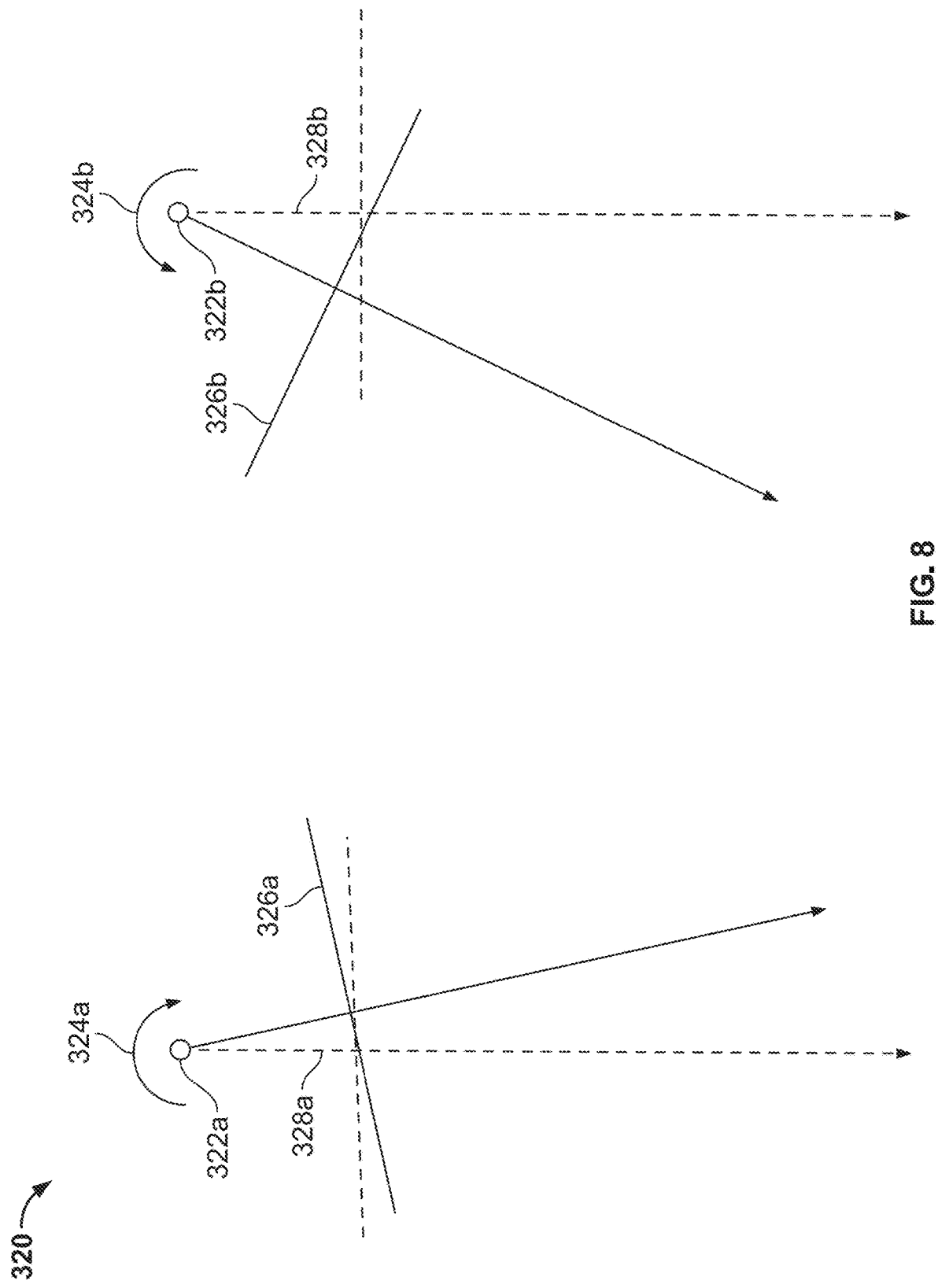
FIG. 8 is a diagram illustrating a camera geometric rectification transformation to obtain a rectified stereoscopic image pair.

FIG. 8 is a diagram 320 illustrating a camera geometric rectification transformation to obtain a rectified stereoscopic image pair. As shown in FIG. 8, an image transformation would occur if cameras 322a and 322b, respectively associated with the first image and the second image, were each respectively rotated along a corresponding central rotational axis 324a and 324b such that camera 322a shifts from an orientation 326a to 328a and camera 322b shifts from an orientation 326b to 328b. The effect on the first image and the second image is a 2D projective warp transformation. In particular, consider a general perspective camera projection matrix, $$C = K[R|t]$$

where K is a 3×3 calibration matrix, representing camera focal length and other internal parameters. R and t are the 3D rotation and translation that shifts the camera center with respect to the world origin. R is a 3×3 matrix and $t$ is a 3×1 matrix. For simplicity, consider that the camera 322a, 322b center is at the world origin. Then the cameras 322a, 322b take the form:

$$C = K[R|0]$$

A rotation matrix $\mathcal{R}$ can then be applied about the camera 322a, 322b center by post multiplying the camera matrix by a 4×4 matrix containing a 3×3 sub-matrix corresponding to the rotation $$C' = K[R|0]\begin{bmatrix} \mathcal{R} & 0 \\ 0^t & 1 \end{bmatrix} = K[R\mathcal{R}|0]$$

The warp transformation of the original image to one as seen by the rotated camera is found as follows:

$$KR\mathcal{R}R^tK^{-1}C = KR\mathcal{R}R^tK^{-1}K[R|0] =$$
$$KR\mathcal{R}R^t[R|0] = K[R\mathcal{R}|0]$$

The 2D projective warp transformation matrix is given by P=KR$\mathcal{R}$R$^t$K$^{-1}$, which is a 3×3 matrix. As such, the view directions of the first image and the second image can be made the same by a warp transformation.

Figure 9:
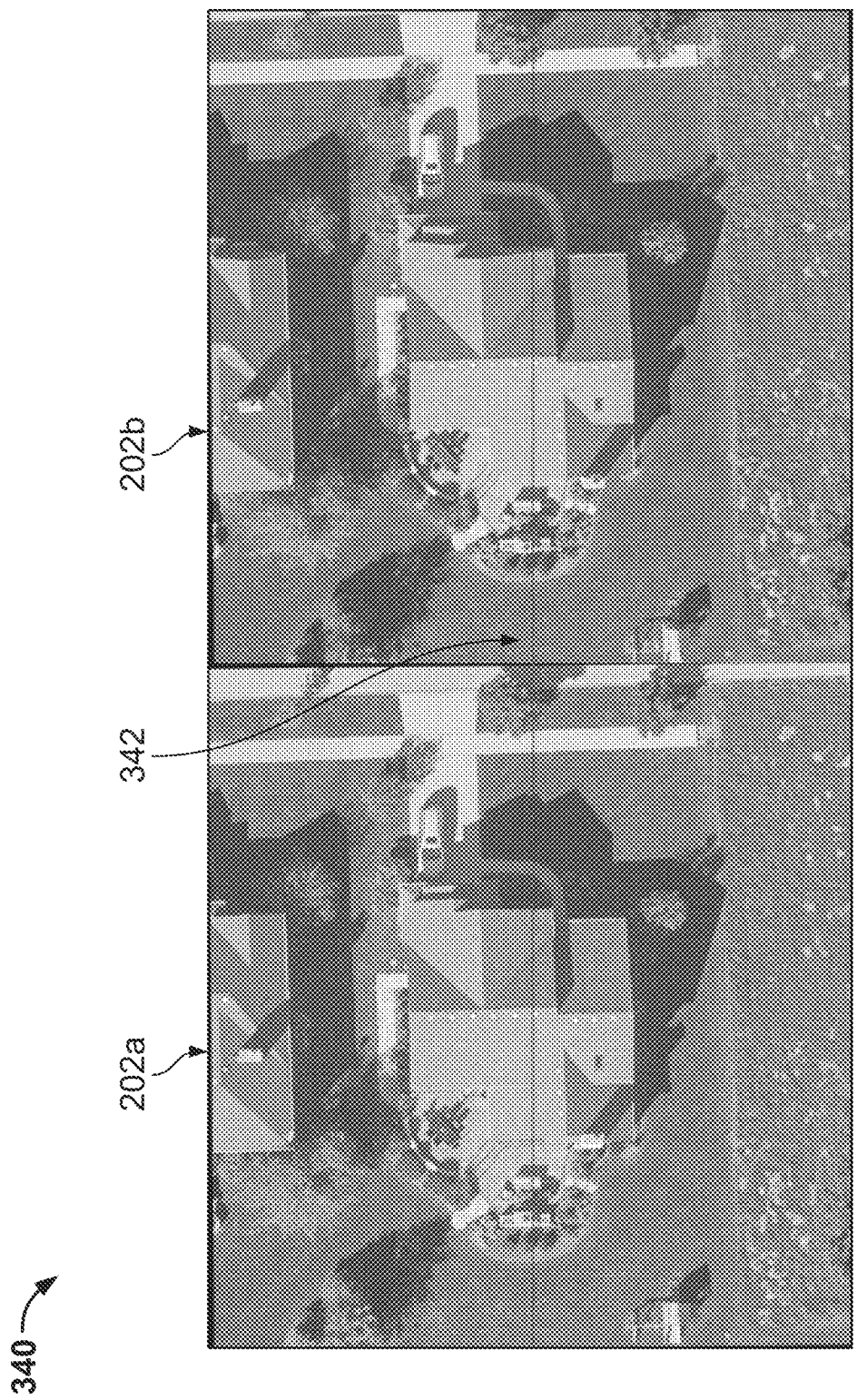
FIG. 9 is a diagram illustrating a rectified stereoscopic image pair.

FIG. 9 is a diagram 340 illustrating a rectified stereoscopic image pair including a target image 202a and a reference image 202b. The images 202a and 202b have aligned rows such that corresponding points lie on the same row in each image. This relationship is illustrated by the line 342 which crosses corresponding points in each image.

Figure 10:
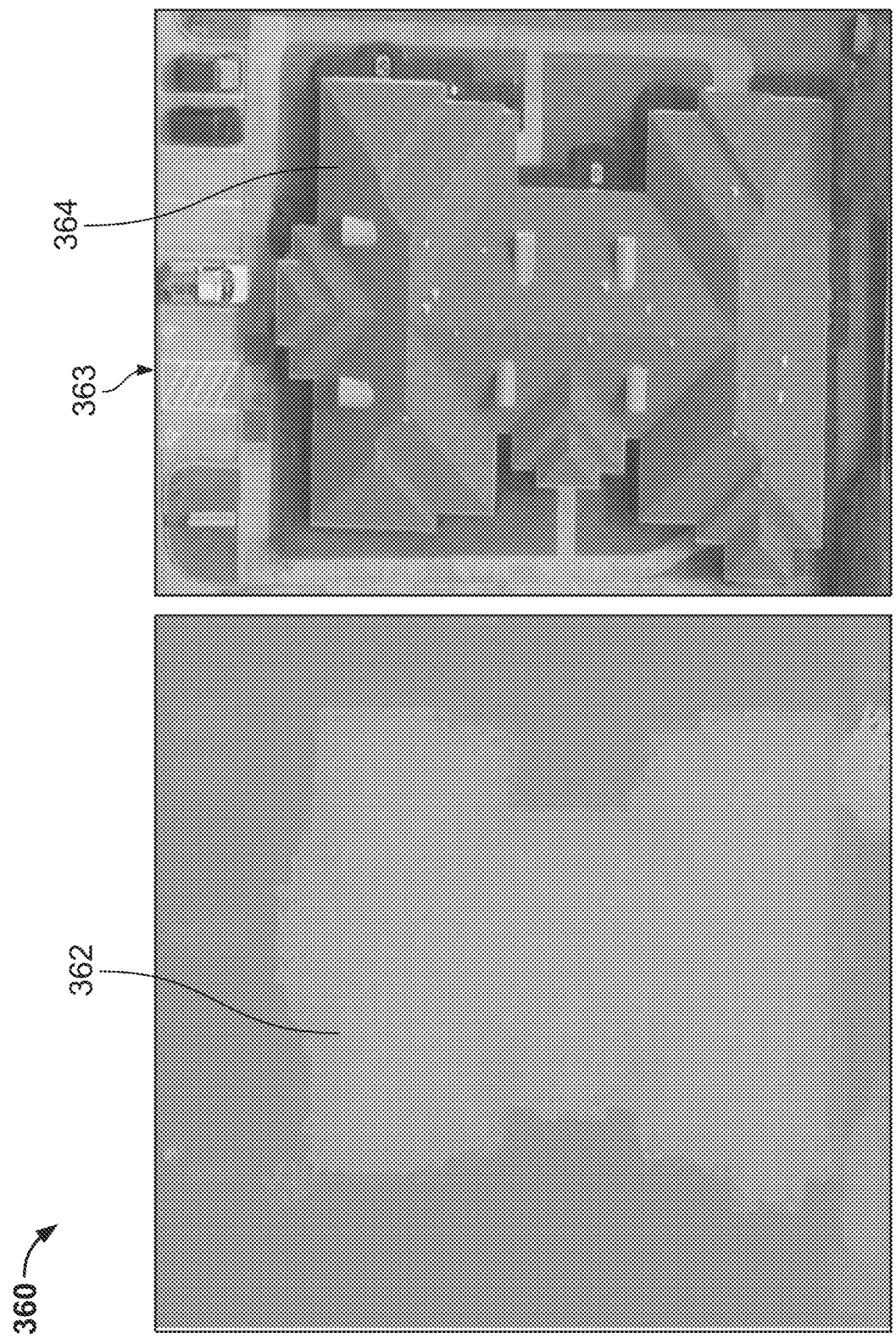
FIG. 10 is a diagram illustrating a fused point cloud corresponding to a 3D structure present in an aerial image.

FIG. 10 is a diagram 360 illustrating a fused point cloud 362 corresponding to a 3D roof structure 364 present in image 363. Once the disparity values are determined, the 3D coordinates of each target pixel can be computed. The rectified cameras support the computation of back-projected camera rays. In particular, a 3D target ray emanating from a pixel of the target image is intersected in 3D space with a corresponding ray emanating from a pixel of the reference image. Ray intersection is a linear operation and therefore ray intersection processing is computationally efficient. For example, the duration of ray intersection processing to generate the 2000×2000 pixel disparity image 282b in FIG. 5 is approximately ten seconds.

The fused point cloud 362 is indicative of the complex gabled roof 364 shown in image 363. The fused point cloud 362 was obtained from satellite images with ground resolution of approximately 50 cm. As shown in FIG. 6, the planar surfaces are resolved to approximately this degree of accuracy. It is noted that with higher image resolution, the resolution of the point cloud 362 will increase correspondingly. Additionally, satellite imagery indicates that 3D point cloud resolution is on the order of the image ground resolution depending on image quality (e.g., contrast).

It may be difficult to produce a point cloud with near perfect disparity values at every pixel based on one stereoscopic image pair. The most problematic areas during point cloud processing are occlusion and a lack of surface illumination due to shadows. However, if a plurality of stereoscopic image pairs are available at different times of the data and from different viewpoints, then the missing data values can be filled in by fusing multiple point clouds. It is noted that the stereoscopic image pairs could be obtained from the same flight path to obviate a large scale difference between the images. In particular, given a number of stereoscopic images, multiple stereoscopic image pairs can be formed as unique combinations. In general with N stereoscopic images, N(N−1)/2 unique stereoscopic image pairs can be produced. For example, ten stereoscopic images yield 45 unique stereoscopic image pairs. It is noted that the data of the respective 45 unique stereoscopic pairs may be redundant and therefore the stereoscopic pairs to be utilized to generate a fused point cloud should be selected carefully.

Selecting a particular stereoscopic pair to be utilized among a plurality of stereoscopic pairs to generate a fused point cloud depends on the relative orientation angle of the two image view directions. Competing factors that drive an optimum choice of relative image pair orientation angle include, but are not limited to, a small orientation angle difference that facilitates matching pixel locations across the two views and a large orientation angle difference that yields more accurate ray intersection for determining 3D point locations. It is noted that the relative orientation angle is dependent on scene content. However, scene experimentation indicates that a range of approximately 20° is acceptable. The resulting fused point cloud is reasonably dense and manifests an accuracy on the order of the image ground resolution.

Selecting a particular number of stereoscopic image pairs to be utilized among the plurality of stereoscopic image pairs to generate the fused point cloud can improve the geometric accuracy thereof by filling in missing data points. For example, the standard deviation of point coordinates is reduced by fusion with a factor of approximately 1/Ain, where n is a number of points being averaged. A practical number of stereoscopic image pairs to be utilized to generate the fused point cloud ranges between 10 and 100 and depends on several factors such as a degree of occlusion. The fusion process itself is not computationally intensive and its computational cost is insignificant compared to computing the respective point clouds of the particular number of stereoscopic image pairs. The computation of respective point clouds can be executed in parallel without data congestion bottle necks. As such, the actual elapsed time is strictly dependent on the number of cores available on the computing system.

Figure 11:
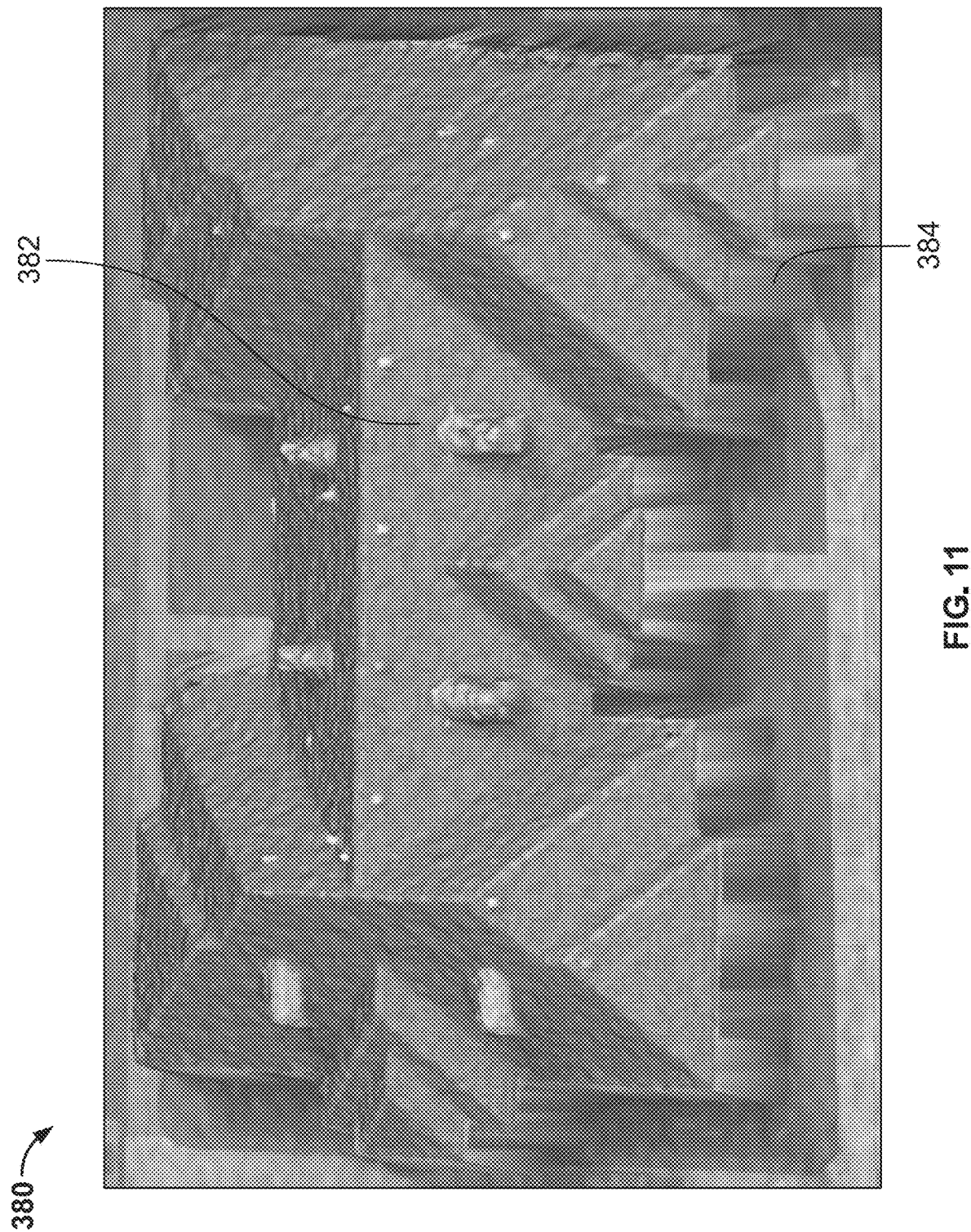
FIG. 11 is a diagram illustrating a texture mapped model of a 3D structure present in an aerial image.

FIG. 11 is a diagram 380 illustrating a texture mapped model 382 of a 3D structure 384 present in an aerial image. Based on the generated final point cloud, it is possible to create a 3D triangulated surface with image data projected onto the surface to form a texture mapped model 382 of the structure. The texture mapped model 382 can allow for manually or automatically drawing a three-dimensional architectural polygonal model of the structure (e.g., by drawing roof polygons on top of the 3D geometry of the texture mapped model 382, and/or generating a wireframe therefrom). The continuous surface can be formed automatically from a point cloud utilizing Delaunay triangulation. The display of a texture mapped model 382 is supported by a wide variety of 3D tools. As shown in FIG. 11, the texture mapped model 382 utilizes grey scale texture but color images can also be utilized. It is noted that the vertical walls of the texture mapped model 382 lack resolution because the satellite imagery is close to overhead in orientation.

Figure 12:
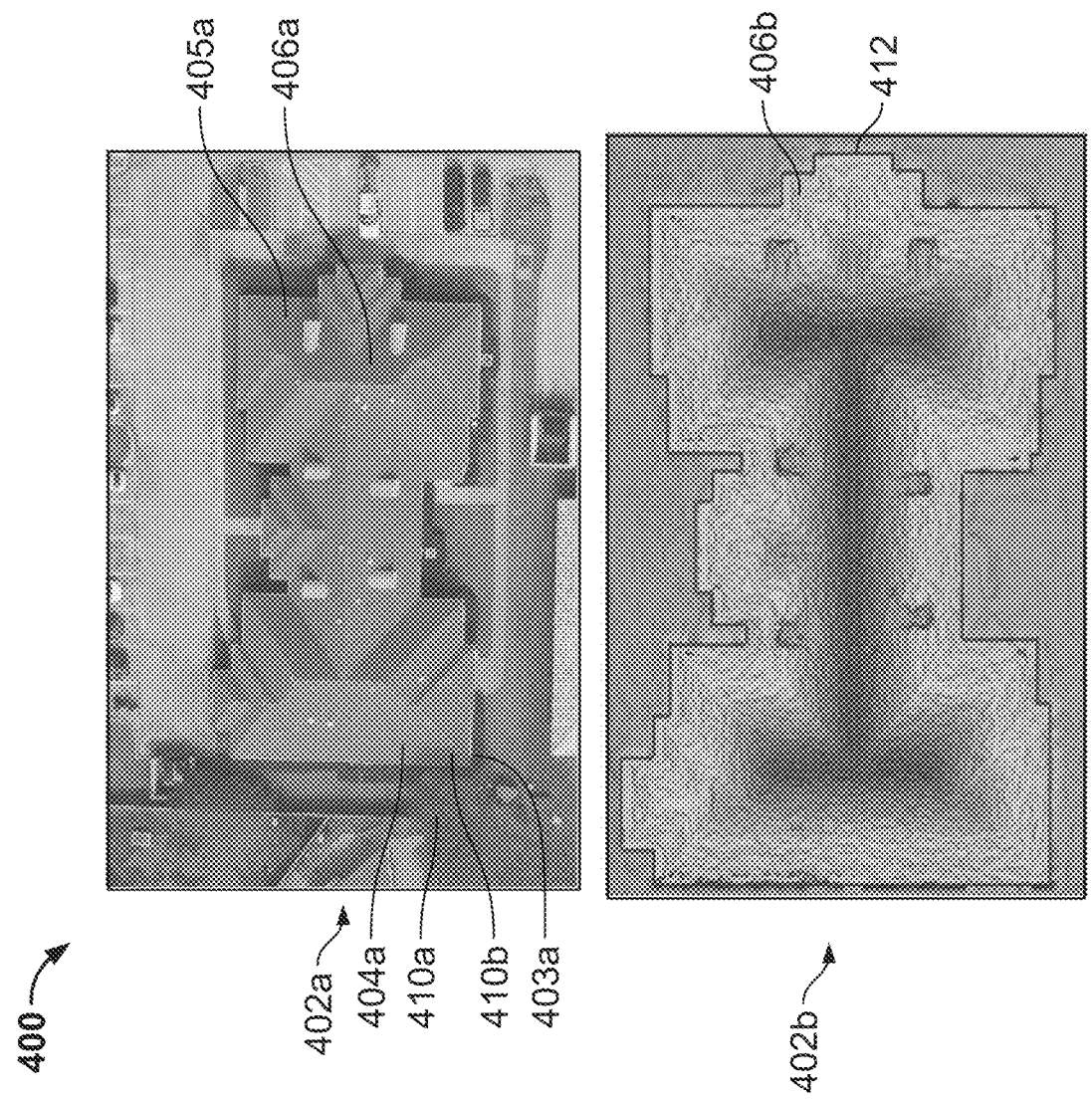
FIG. 12 is a diagram illustrating respective point clouds corresponding to 3D structures present in an aerial image.

FIG. 12 is a diagram 400 illustrating point clouds of roof structures of 3D structures present in aerial image 402a. Aerial image 402a illustrates a 3D structure 403a having a roof structure 404a and a 3D structure 405a having a roof structure 406a, wherein trees 410a near and/or overhanging a periphery of the roof structure 406a cast shadows 410b onto a surface of the roof structure 406a. As such, in aerial image 402b, the roof boundary of the point cloud 406b is corrupted by each of the trees 410a and shadows 410b casted therefrom. However, a user can delineate the roof boundary of the point cloud 406b via a manually input boundary 412.

Figure 13:
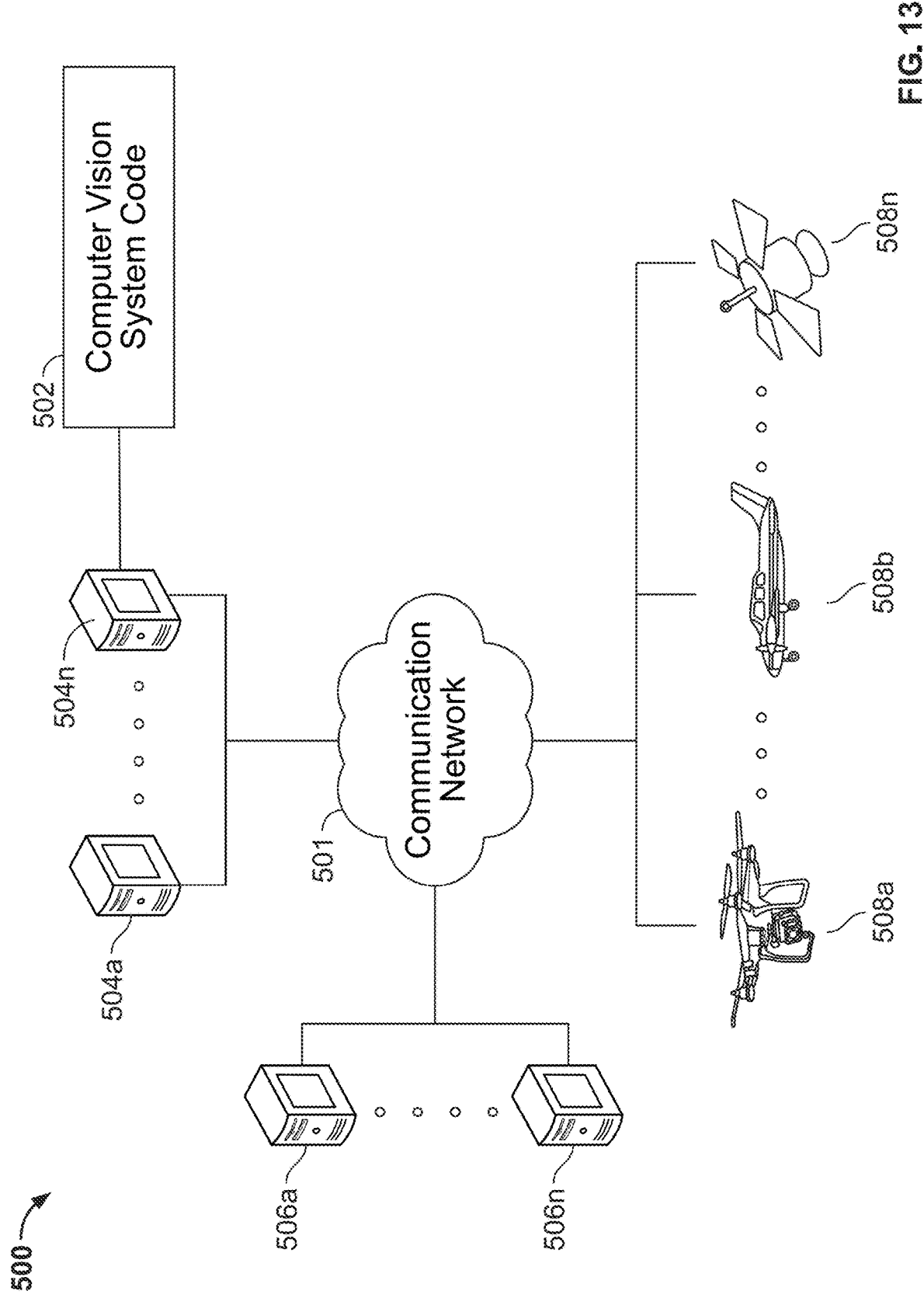
FIG. 13 is a diagram illustrating the system of the present disclosure.

FIG. 13 is a diagram illustrating an embodiment of the system 500 of the present disclosure. In particular, FIG. 13 illustrates computer hardware and network components on which the system 500 could be implemented. The system 500 can include a plurality of internal servers 504a-504n having at least one processor and memory for executing the computer instructions and methods described above (which could be embodied as computer vision system code 502). The system 500 can also include a plurality of storage servers 506a-506n for receiving stereoscopic image data and/or video data. The system 500 can also include a plurality of camera devices 508a-508n for capturing stereoscopic image data and/or video data. For example, the camera devices can include, but are not limited to, a unmanned aerial vehicle 508a, an airplane 508b, and a satellite 508n. The internal servers 504a-504n, the storage servers 506a-506n, and the camera devices 508a-508n can communicate over a communication network 501. Of course, the system 500 need not be implemented on multiple devices, and indeed, the system 500 could be implemented on a single computer system (e.g., a personal computer, server, mobile computer, smart phone, etc.) without departing from the spirit or scope of the present disclosure.

Figure 14:
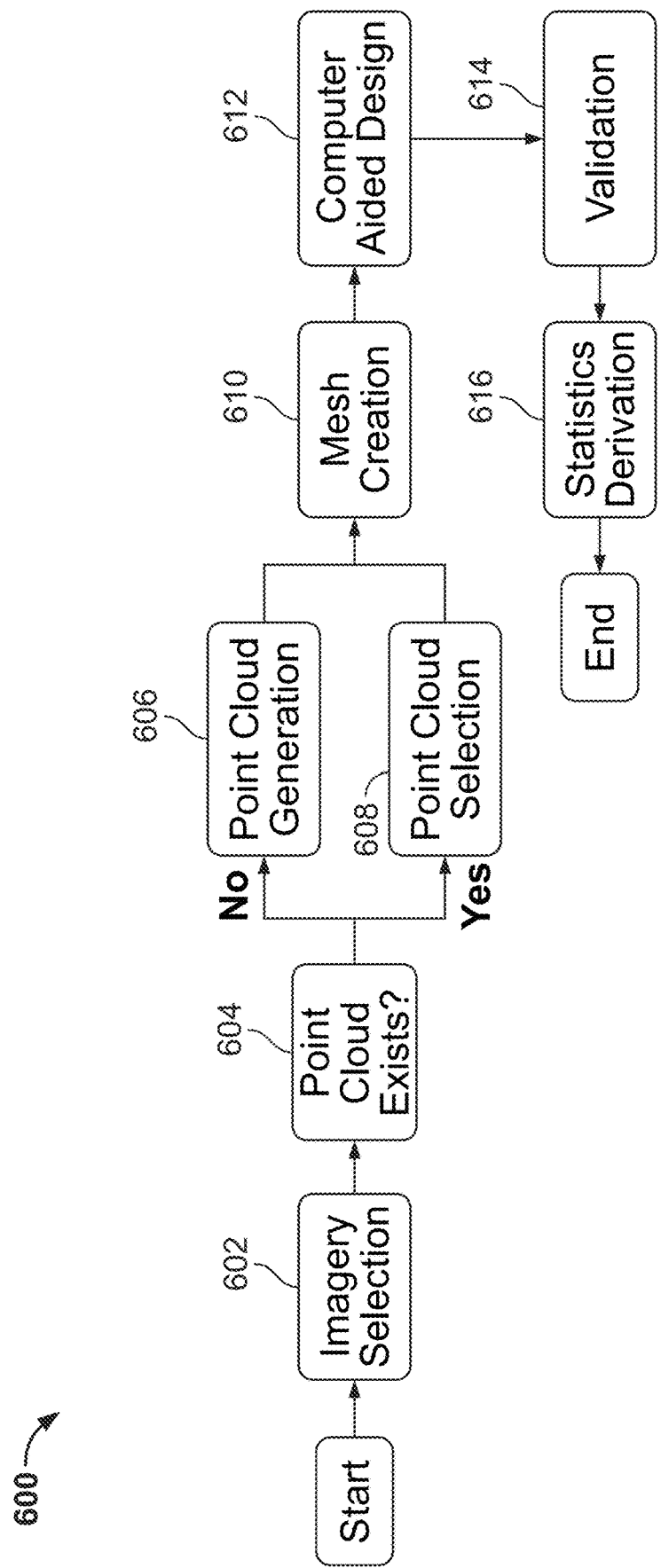
FIGS. 14-15 are flowcharts illustrating overall process steps carried out by another embodiment of the system of the present disclosure.

FIG. 14 is a flowchart illustrating overall process steps 600 carried by the system 10 according to another embodiment of the present disclosure. In step 602, the system 10 receives a geospatial region of interest and selects and retrieves stereo pair images and their metadata. In step 604, the system 10 determines if one or more point clouds already exist for the region of interest. If a negative determination is made in step 604, the system 10 proceeds to step 606, where a point cloud is generated from the one or more stereo pairs using disparity maps. If a positive determination is made in step 604, the system 10 proceeds to step 608, where a preexisting point cloud is selected (e.g., when corresponding LiDAR point cloud data is available). Optionally, the system 10 can then proceed to step 610, where a polygon mesh is generated from the point cloud, which can be used to refine and reduce the point cloud and apply texture mapping. In step 612, the system 10 presents a CAD interface to a human operator, which is used to generate a models of a roof shown in the point cloud. Multiple point clouds from multiple views can be used to allow the user to see a more complete picture of the roof being modeled. After the roof model is generated, the system 10 proceeds to step 614, where model validation is performed to ensure that the three dimensional geometries produced do not contain modeling errors. Once validation is complete, the system 10 proceeds to step 616, where measurements and statistics related to various features of the region of interest are extracted from the model. Specific examples of process steps 602-616 are discussed in greater detail below, in connection with FIGS. 15-19A and 19B.

Figure 15:
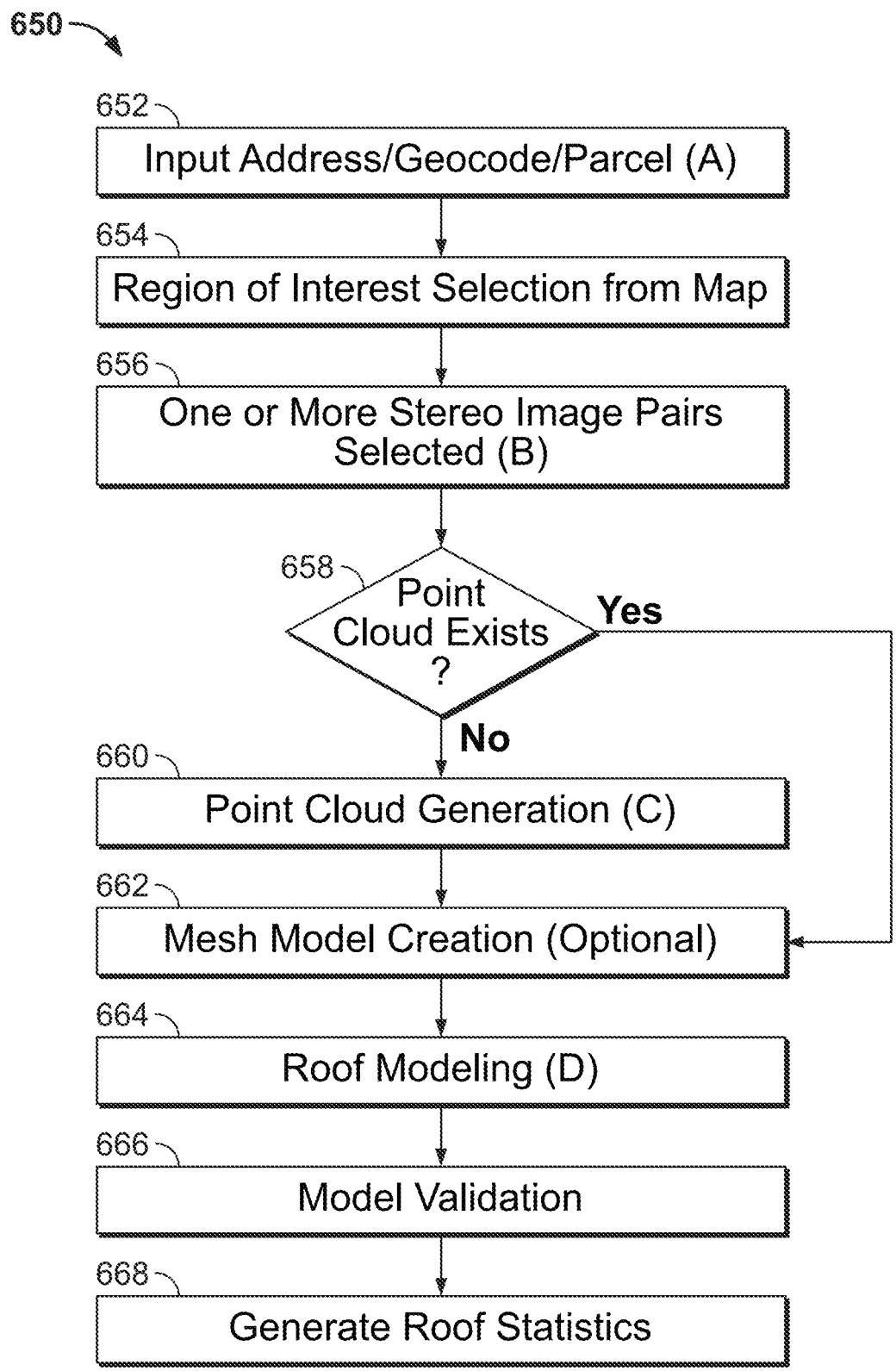

FIG. 15 is a flowchart illustrating processing steps 650 carried out by the system 10 of the present disclosure, in accordance with the overall process steps 600 described in connection with FIG. 14. In step 652, a user inputs an address, geocode, parcel, or the like for a region of interest. In step 654, a region of interest is selected from a map. Once a region of interest is selected, the system 10 proceeds to step 656, where one or more stereo image pairs are selected and retrieved. In step 658, the system 10 determines if point cloud data exists for the region of interest. If a negative determination is made in step 658, the system 10 proceeds to step 660, wherein a point cloud is generated. If a positive determination is made in step 658 and point cloud data already exists for the region of interest, the system 10 can retrieve the point cloud data. Once the system 10 has point cloud data for the region of interest, the system can optionally proceed to step 662, where a mesh model of the region of interest is created. The system 10 then proceeds to step 664, where the roof is modeled. In step 666, the system 10 conducts model validation and in step 668, the system 10 generates roof statistics based on the validated model.

Figure 16:
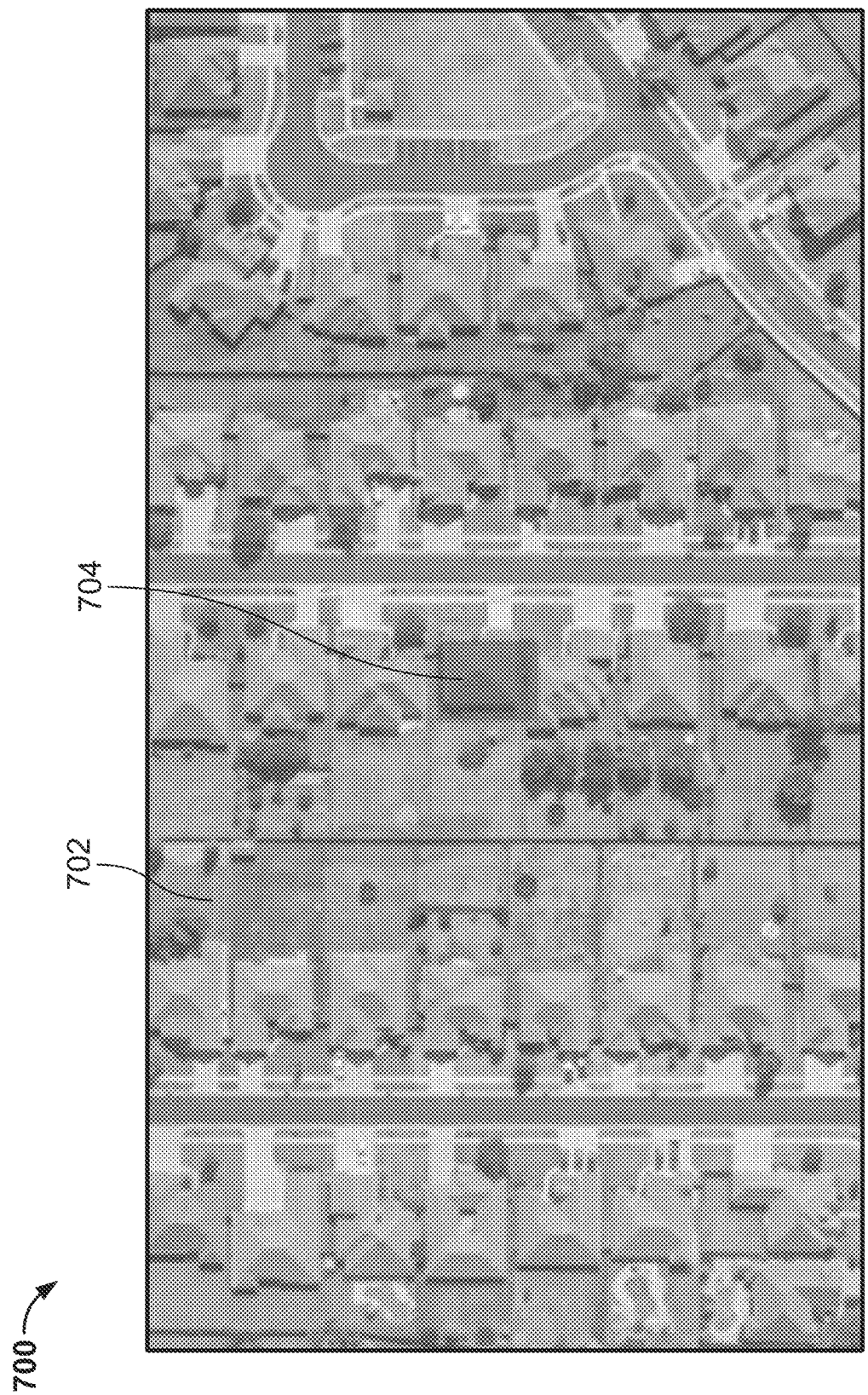
Figure 17:
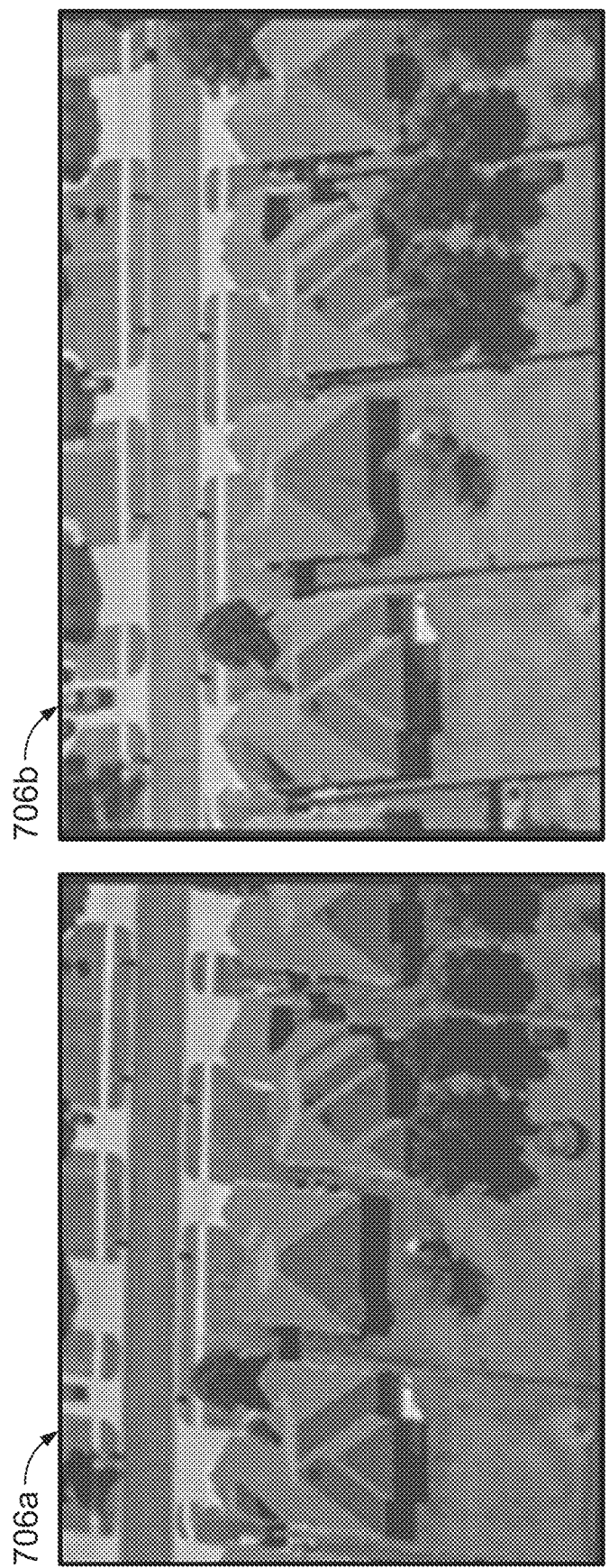
Figure 18:
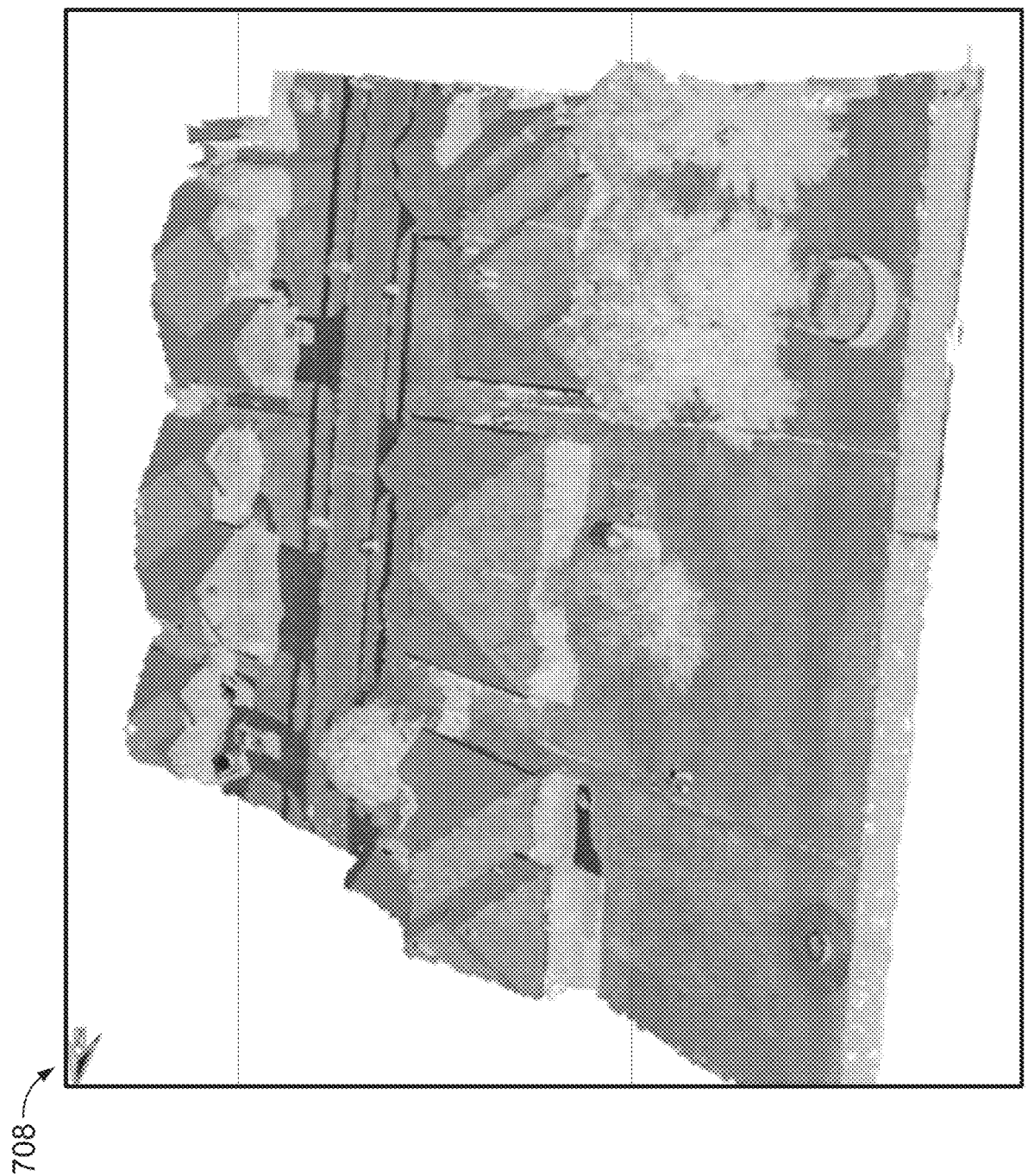
Figure 19A:
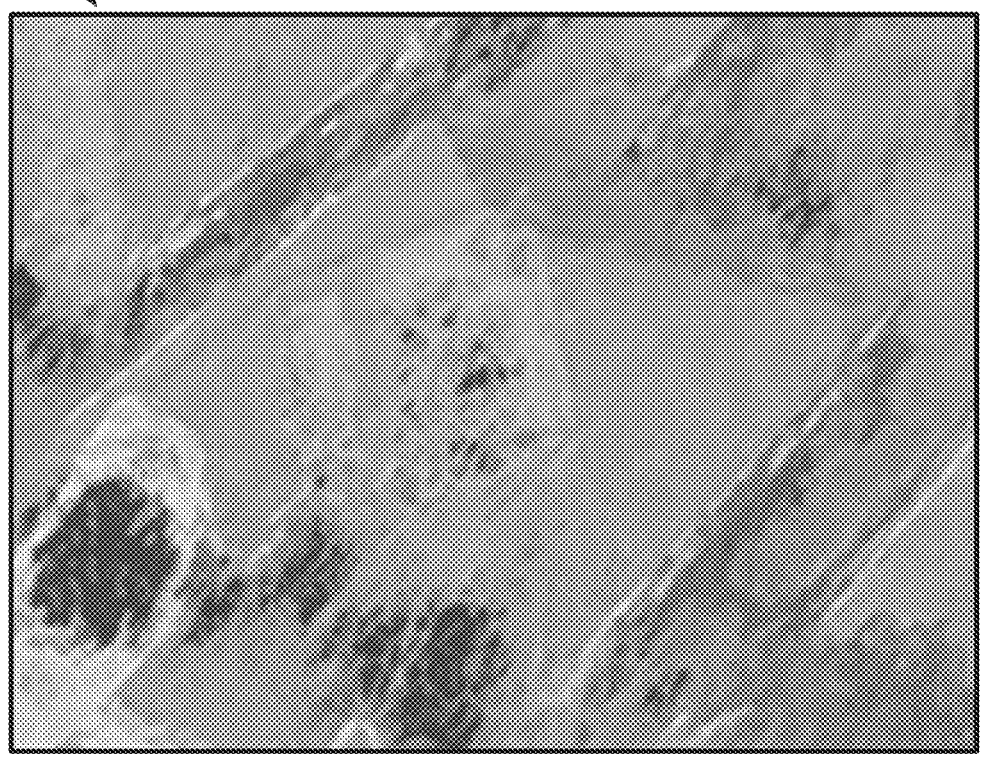
Figure 19B:
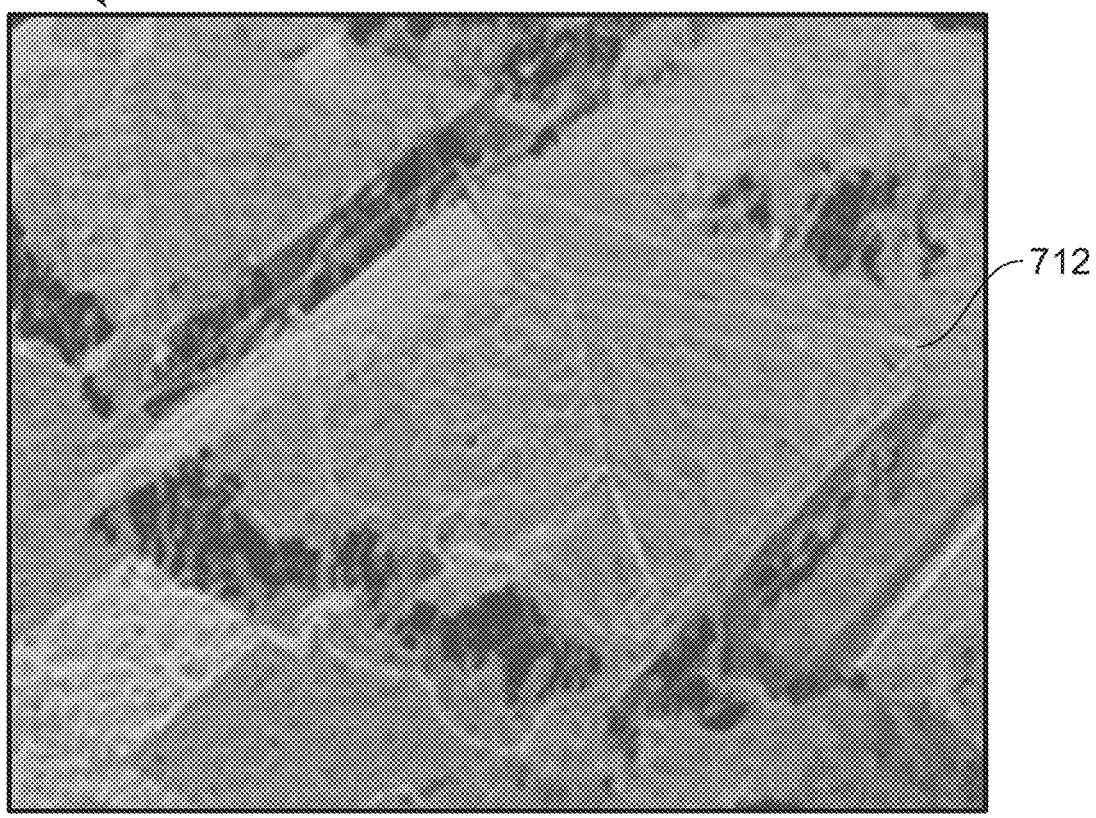

FIGS. 16-19A and 19B illustrate the processing steps described in connection with FIG. 15. Specifically, FIG. 16 is a diagram illustrating a graphical user interface 700 generated by the system 10, displaying a map 702 and having a region of interest 704 selected by the user, as described in connection with steps 652 and 654 of FIG. 15. FIG. 17 shows a pair of stereo images 706*a* and 706*b* corresponding to the region of interest 704 of FIG. 16, as described in connection with step 656 of FIG. 15. FIG. 18 shows a point cloud 708 that is already available for the region of interest 704 (see FIG. 16) and ready for download from a database, as described in connection with step 658 of FIG. 15. FIG. 19A shows a point cloud 710*a* that is generated by the system 10, as described in connection with step 660 of FIG. 15, and FIG. 19B shows a mesh model 710*b* that is optionally created by the system 10, based on the point cloud 710*a* of FIG. 19A. Additionally, as shown in FIG. 19B, a 3D CAD or wireframe model 712 could be generated on top of the point cloud 710*a* or mesh 710*b*, as described in connection with steps 662 and 664 of FIG. 15, respectively. Instead (or additionally), a user may utilize a variety of 3D tools in CAD software to manually generate the wireframe model 712 on top of the point cloud 710*a* or mesh 710*b*. It is noted that the system can generate and display one or more views of a wireframe model on a point cloud. In addition, the system can generate and display the one or more views of the wireframe model as a 3D model, a 2D model or a textured model. As an aid for modeling the wireframe model 712 on top of the point cloud 710*a* or mesh 710*b*, a reference horizontal plane is defined either automatically by the system or manually by a user, and either by shifting the horizontal plane or indicating it by selecting a point of the point cloud.

As described above in connection with FIGS. 14 and 15, the process begins when the system 10 receives a geospatial region of interest from a user. The geospatial region of interest can be represented as a polygon in latitude and longitude coordinates. The bounds can be derived in a variety of ways, including: (1) from a geocode; (2) as a rectangle or other shape centered on a postal address; (3) from survey data of property parcel boundaries; or (4) from a human user's selection in a geospatial mapping interface. It is noted that images of the area of interest are not required for the generation of a point cloud, if the system 10 determines that a point cloud already exists. However, the system 10 can utilize images of the area of interest to create texture mapping, as described herein.

If the system 10 determines that a point cloud needs to be generated, imagery must be obtained, and the system 10 selects and retrieves one or more sets of stereo pair imagery, including metadata, from an imagery data store. For purposes of generating a point cloud, oblique stereo imagery—where the camera is at an angle relative to the objects of interest—can be desirable for modeling purposes. For example, oblique stereo pairs are useful for determining wall material, window and door placement, and other non-roof features that are not clearly visible from a substantially overhead viewpoint.

As discussed above, the system 10 includes logic to determine if a point cloud is available for a given region of interest. A database query can be performed to lookup the availability of LiDAR or other 3D sensing data. If available, the point cloud is downloaded and the system 10 can proceed directly to mesh creation and/or CAD modeling. If the query comes back with no data, the system 10 generates the point cloud using the stereo pair imagery. Once obtained, the stereo pair images are used to generate a disparity map and back projecting of the pixels is used to create the point cloud.

Figure 20:
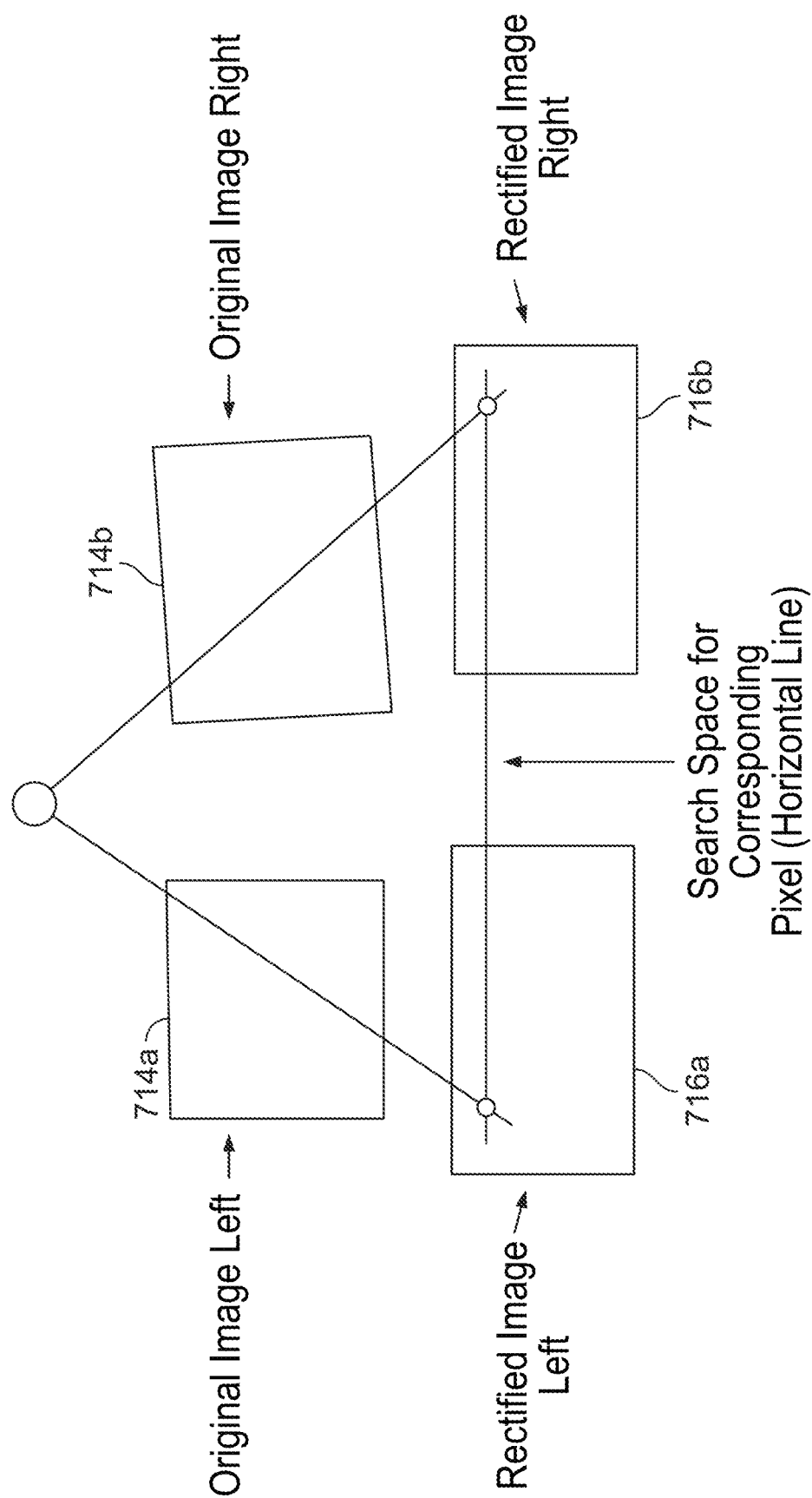
FIG. 20 is a diagram illustrating rectification of stereo images by the system of the present disclosure.

FIG. 20 is a diagram illustrating a camera geometric rectification transformation to obtain a rectified stereoscopic pair of images 716*a* and 716*b* from original images 714*a* and 714*b*. Camera metadata and a hypothetical plane with 3D points are utilized to iteratively refine a transformation matrix, that when applied to the original images 714*a* and 714*b*, transforms the cameras' principal rays to be parallel and originate on the same plane. This matrix is also applied to the images 714*a* and 714*b* to create a rectified stereo pair of images 716*a* and 716*b*. As shown in FIG. 20, the rectified left and right images 716*a* and 716*b* represent cameras that now have parallel principal rays. The rectified left and right images 716*a* and 716*b* can then be used by the system 10 to generate a disparity map.

The system 10 can use any suitable disparity map algorithm, such as the semi-global matching algorithm by Hirschmüller, which uses rectified left and right images as an input. The algorithm uses dynamic programming to optimize a function which maps pixels in the left image to their corresponding pixels in the right image with a shift in the horizontal direction (see, e.g., FIG. 4, discussed above). This shift measures disparity, which indirectly measures the depth of an object. As such, the closer an object is to the camera the greater the disparity. The resulting disparity map is used by the system 10 to create a point cloud.

The system 10 generates the point cloud by calculating the 3D intersection of a ray that passes through a pixel in the left image with a ray that passes through the corresponding pixel in the right image. Each pixel in the disparity map is included in the final point cloud. Furthermore, when multiple stereo pairs are available, e.g. two west facing cameras, two east facing cameras, two nadir cameras, etc., multiple point clouds can be generated and then combined using point cloud registration to form a more complete cloud. A benefit of creating multiple point clouds from multiple stereo pairs is that during the modeling phase, the system 10 can provide the user with the ability to turn a virtual camera and the system 10 can select and display a point cloud that was generated from a stereo pair camera that most closely matches the current position of the virtual camera.

Figure 21A:
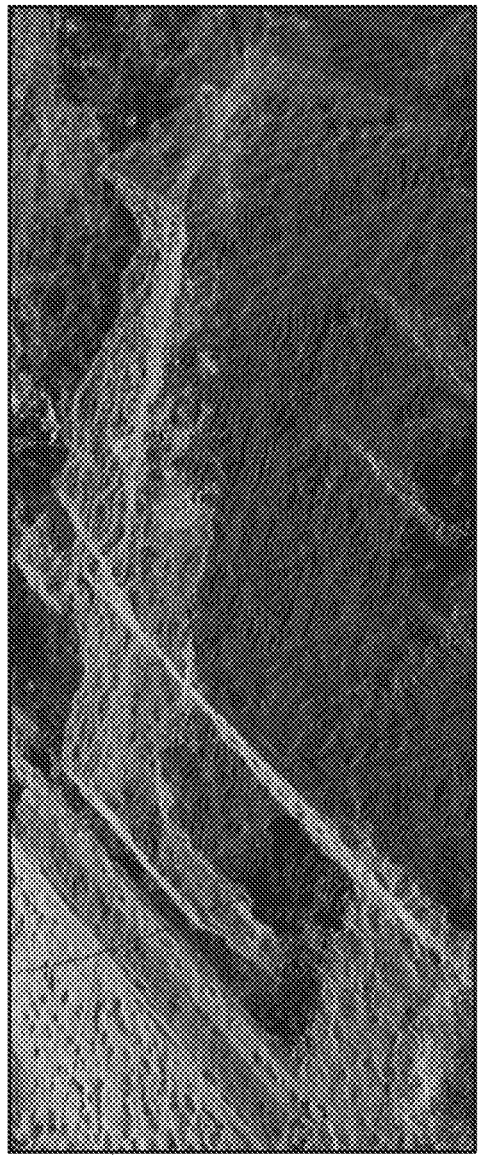
FIGS. 21A-B are diagrams illustrating generation of a mesh model by the system of the present disclosure.
Figure 21B:
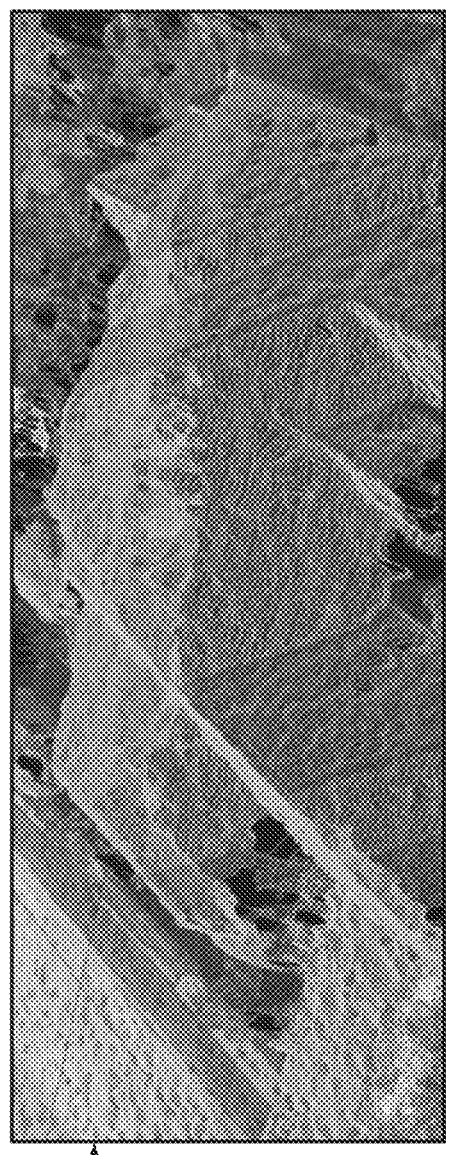

FIGS. 21A and 21B are diagrams respectively illustrating a point cloud 720*a* and a mesh model 720*b* that is optionally created based on the point cloud. The purpose of mesh model creation is twofold: (1) it refines and reduces noise in the point cloud which has the benefit of reducing computational load; and (2) it provides a better visualization for the human modeling effort. Using Delaunay triangulation, or other well-known surface reconstruction algorithm, the point cloud 720*a* shown in FIG. 21A is turned into the polygon mesh 720*b* shown in FIG. 21B. Due to constraints of surface reconstruction algorithms, some of the points in the cloud 720*a* cannot be polygonised. These points are considered noise and are removed.

The point cloud 720*a* shown in FIG. 21A and the mesh model 720*b* shown in FIG. 21B have had texture applied thereto. According to some aspects of the present disclosure, the system 10 can map textures from the original images to the point cloud for a human interpretable visualization that allows an operator to more easily generate a CAD or wireframe model on the point cloud, due to the presence of visual cues for features such as color changes near the edges of features, darker colors for shaded areas, and the like. Additional texture mapping can be applied as the model is being created to further aid in modeling. It is noted that system need not automatically generate the CAD or wireframe model. Instead (or additionally), a user can manually generate the CAD or wireframe model.

Figure 22:
FIG. 22 is a diagram illustrating the generation of a wireframe model for a roof structure by the system of the present disclosure.

FIG. 22 is a diagram illustrating a graphical user interface screen 730, displaying a point cloud 722 with a 3D wireframe roof structure model 724 thereon, generated using one or more 3D tools. It is noted that the system can generate and display one or more views of a wireframe roof structure model on a point cloud. In addition, the system can generate and display the one or more views of the wireframe roof structure model as a 3D model, a 2D model or a textured model. As described above, a point cloud or mesh model is imported into the 3D modeling interface component of the system 10. The system 10 can provide a plurality of tools for modeling roof-specific features such, for example, as a hip roof tool, a gable roof tool, turret tools, chimney tools, dormer tools, cricket tools, pergola tools, rain gutter tools, and the like. Of course, the system 10 can provide additional tools for modeling other features of an object or area of interest. For example, the system 10 can utilize tools for identifying the properties of the structure being modeled through inspection of the point cloud, such as but not limited to, the pitch of a roof in a profile of the point cloud. Once the roof model is created, the system 10 can approximate the walls and other vertical surfaces of the structure, enabling the human operator to easily add features to the wall model that can be seen in the texture mapping, namely placement of windows, doors, AC units, garage doors, and other building features that exist on the walls. The system 10 can also provide a tool for pushing in or pulling out walls that need to be modified, in order to better fit a point cloud representation of a structure. Additionally, the system 10 can also provide tools for modeling other features that are included in the point cloud, but that are not part of a building, such as sidewalks, driveways, pools, trees, porches, and the like. The modeling tools discussed herein can be implemented to produce 3D model geometries using, for example, a static or moveable virtual camera (view of the point cloud) and human operator input. The system is not limited in the types of features that could be modeled, and indeed, such features could include, but are not limited to, roof features, walls, doors, windows, chimneys, vents, gutters, downspouts, satellite dishes, air conditioning ("AC") units, driveways, patios, porches, decks, gazebos, pools, hot tubs, sheds, greenhouses, pool enclosures, etc.

The system 10 can perform computational solid geometry ("CSG") to merge polyhedrons and keep the model consistent with real world roof geometries. The system 10 can also perform a series of mathematical validations on the 3D model which include, but are not limited to, coplanarity checks, checking for gaps between solids that CSG cannot detect, making sure all polyhedrons are closed, checking that all roof slopes are snapped to standard roofing pitches, and assuring all roof face polygons are wound with the plane normal facing outward. These validations ensure that statistics generated from the 3D model are sound and closely reflect real-world measurements of a roof, or object, in question. If there are validation failures, the system 10 can move the model back into the 3D modeling interface and notify the operator that corrections to the 3D model are required. It is noted that system need not perform the validations automatically. Instead (or additionally), a user can manually perform the validations.

In addition to generating a 3D model of an object or area of interest, the system 10 can generate a set of serializable data about the roof. The serializable data can include, but is not limited to, roof area, length of flashing and step flashing, length of valley, eave, hip and ridge roof lines, roof drip edge length, number of squares, predominant pitch, length of cornice strips, overhang length, rain gutter location and length, and per face statistics that include face area, pitch, and line type lengths. This data is produced by the system 10 by deriving the relative statistic from the 3D geometry of the model. Of course, the data can be serialized into JSON, XML, CSV or other machine and human readable formats. Even further, the system 10 could generate one or more reports that provide measurements of the modeled structure, with indicia indicated on the report (e.g., lengths, widths, areas, slopes, pitches, volumes, etc.). Further, summarized information in the form of XML files, JSON files, TXT files, WKT files, PDF files, etc. could be produced by the system. Still further, the system could provide pricing information in such reports, including labor, materials, equipment, supporting events, etc. for some or all of the modeled elements.

In addition to the foregoing, the systems and methods of the present disclosure could also include the following additional features. For example, the system could allow a user to select a desired real property or structure to be modeled by selecting such a property/structure within a computer-aided design (CAD) program. Additionally, the models/wireframes generated by the system could be printed or presented in a 2-dimensional (2D) format, such as a blueprint.

Figure 23:
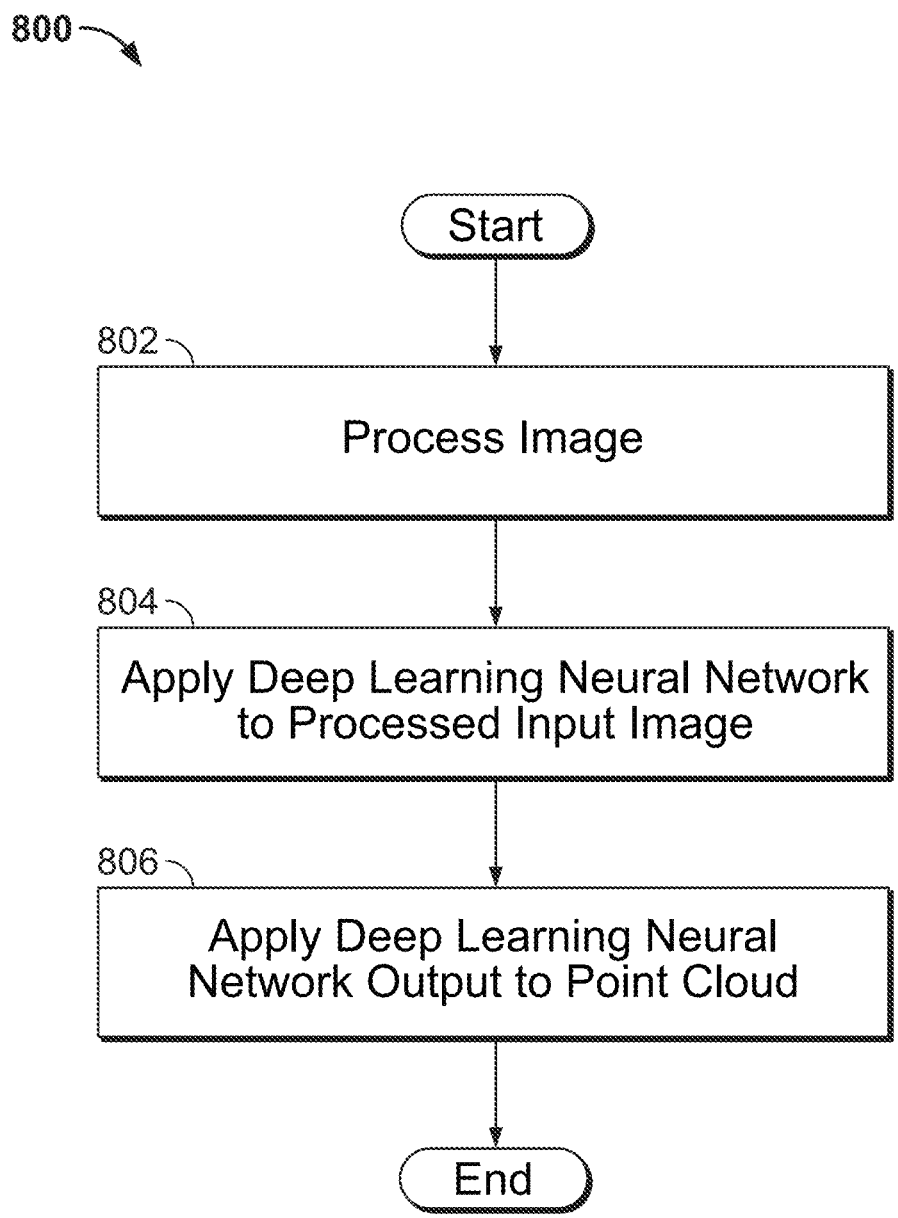
FIG. 23 is a flowchart illustrating overall process steps carried out by another embodiment of the system of the present disclosure.

FIG. 23 is a flow chart illustrating overall process steps 800 carried out by another embodiment of the system of the present disclosure to classify features of a point cloud via a colorization process. In step 802, the system 10 processes an image indicative of a geospatial ROI having one or more structures of interest situated therein. Then, in step 804, the system 10 applies a deep learning neural network to the processed image. The deep learning neural network can be, but is not limited to, a convolution neural network (CNN). The deep learning neural network classifies features of the structures (e.g., roof features) present in the image. For example, the deep learning neural network can classify different roof structure features through a colorization process such that respective different roof structure features are uniquely colorized. Lastly, in step 806, the system 10, applies the colorized classification labels corresponding to the different roof structure features to a point cloud, so that specific roof structure features are indicated using specific colors (e.g., roof planes could be one color, chimneys could be another color, etc.).

Figure 24A:
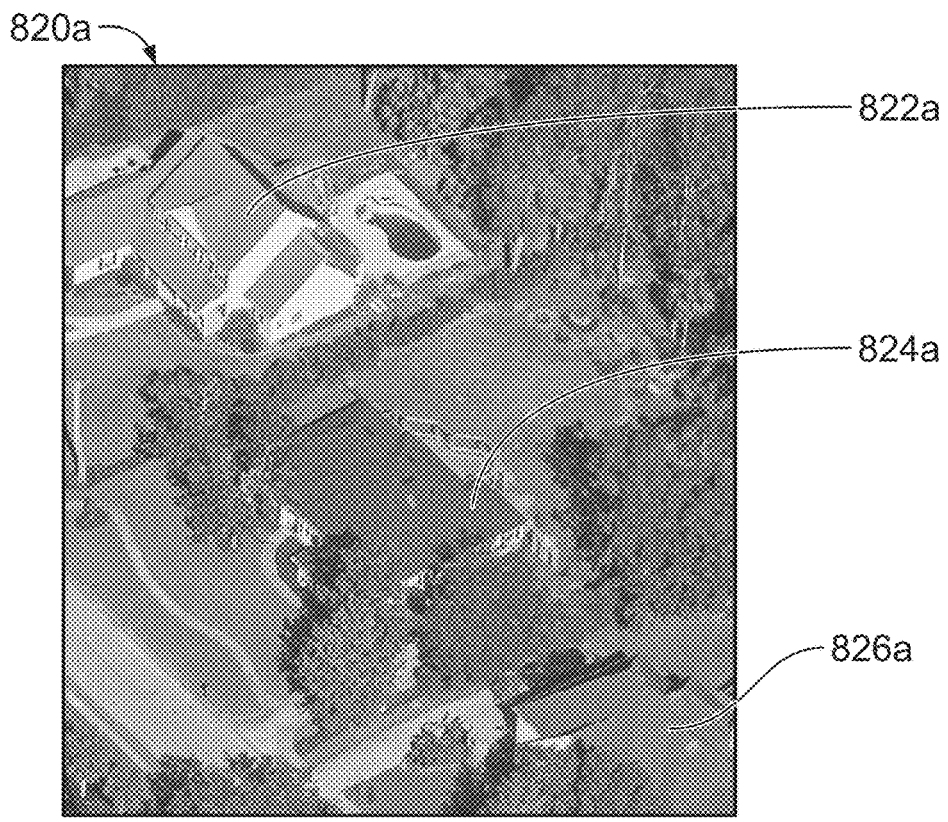
FIG. 24A is an input image illustrating structures positioned within a geospatial region of interest.
Figure 24B:
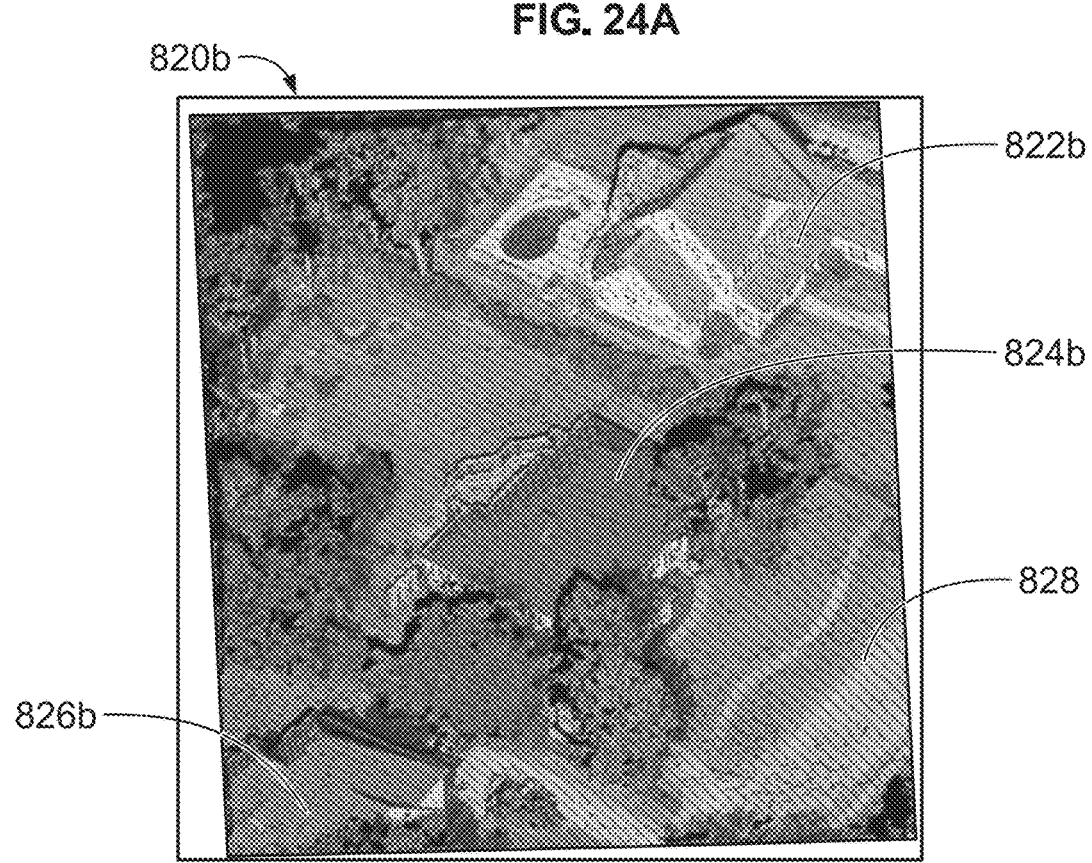
FIG. 24B is an output synthetic image of the input image of FIG. 24A.
Figure 25:
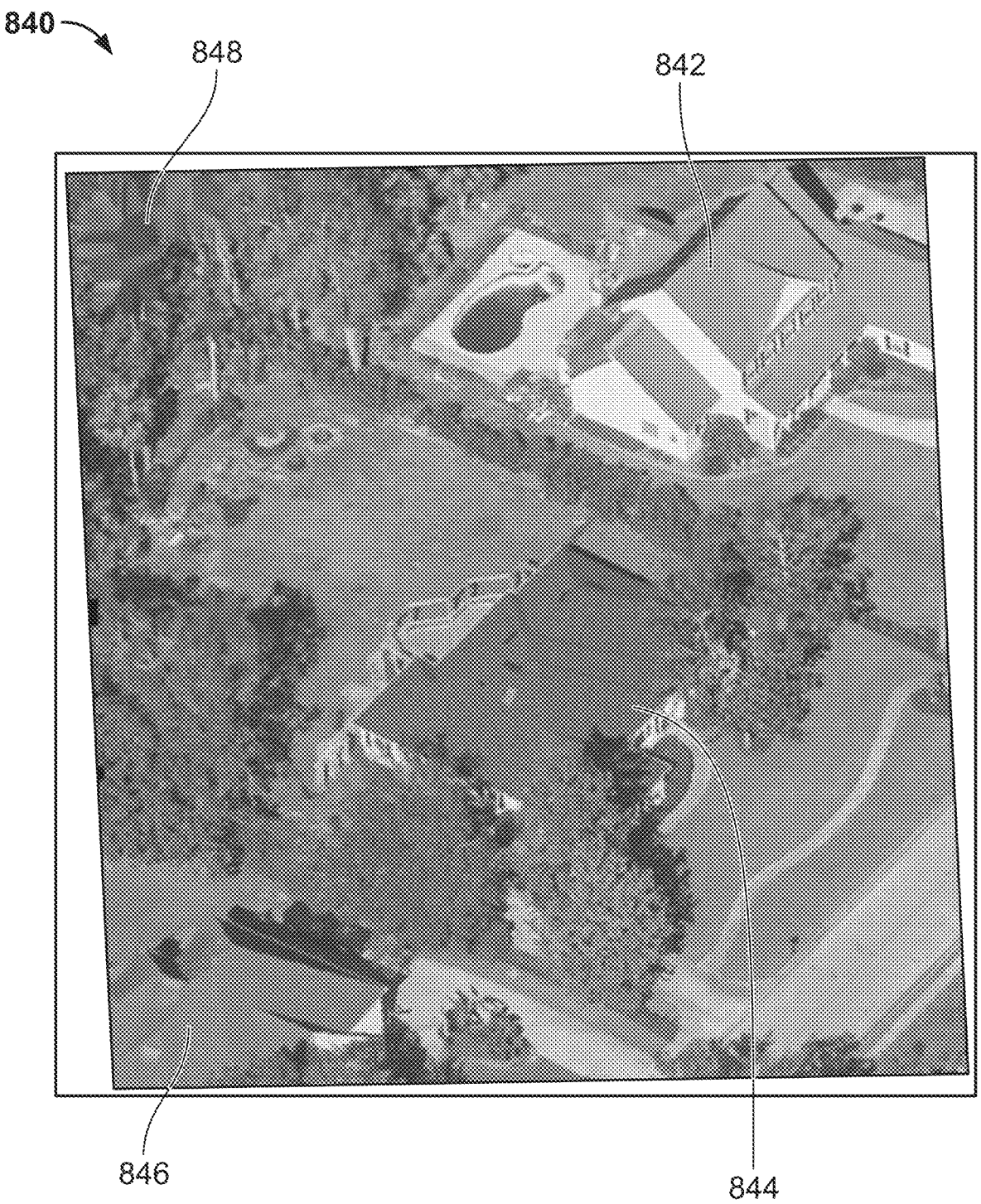
FIG. 25 is a post-processed image of the output synthetic image of FIG. 24B.
Figure 26:
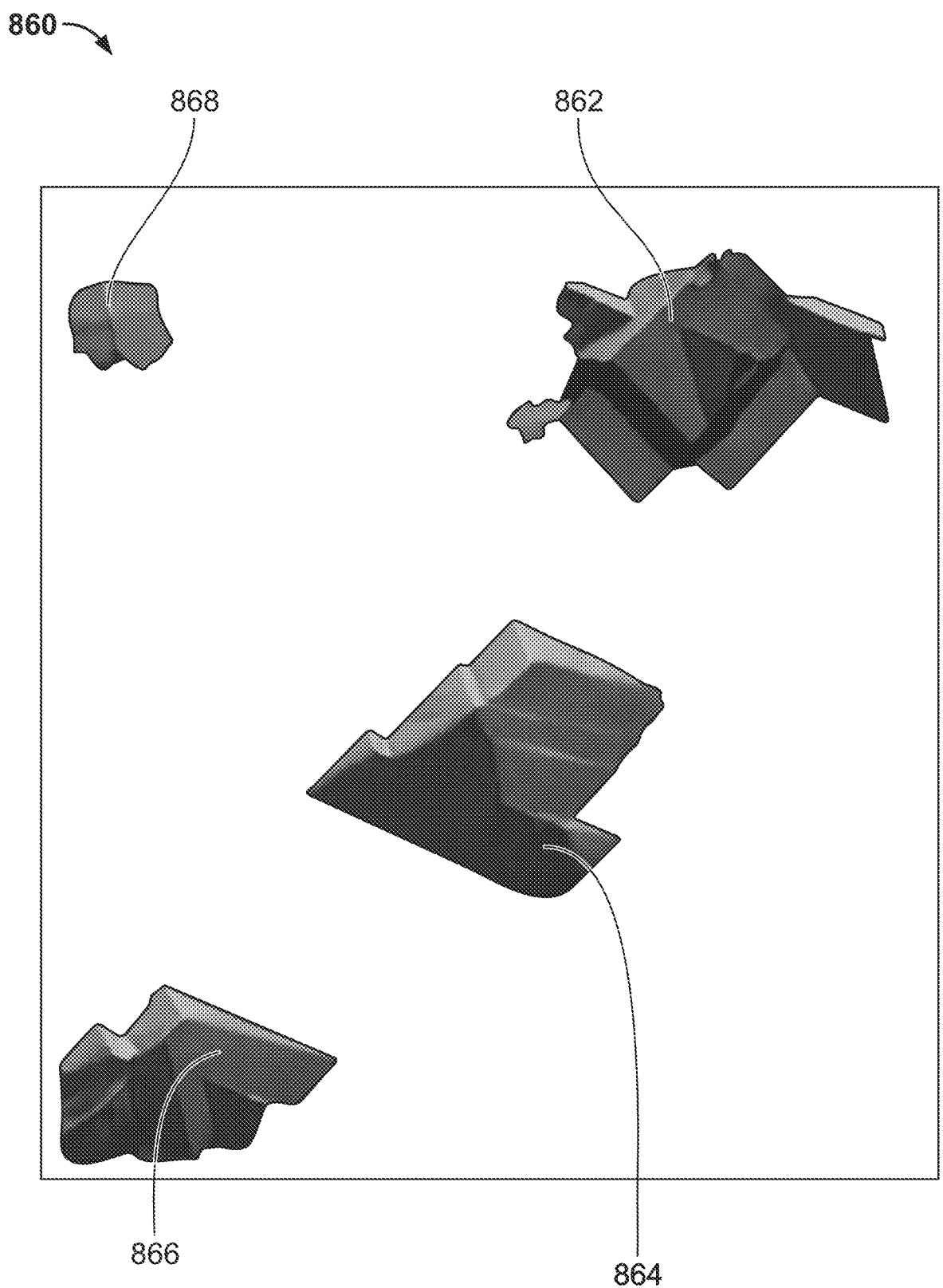
FIG. 26 is an inference image of the post-processed image of FIG. 25
Figure 27:
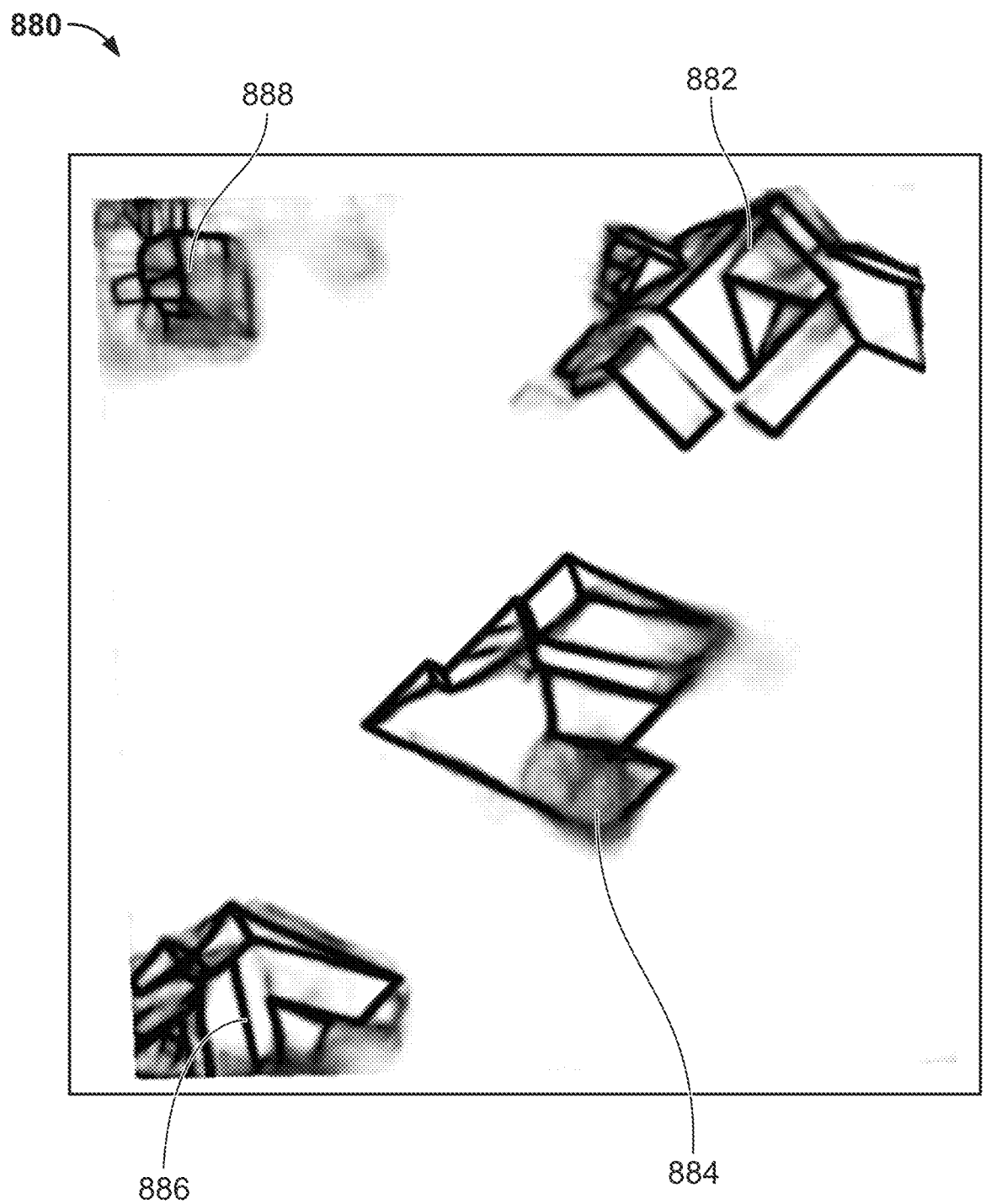
FIG. 27 is a diagram illustrating generation of respective wireframe models for roof structures detected in the inference image of FIG. 26.
Figure 28:
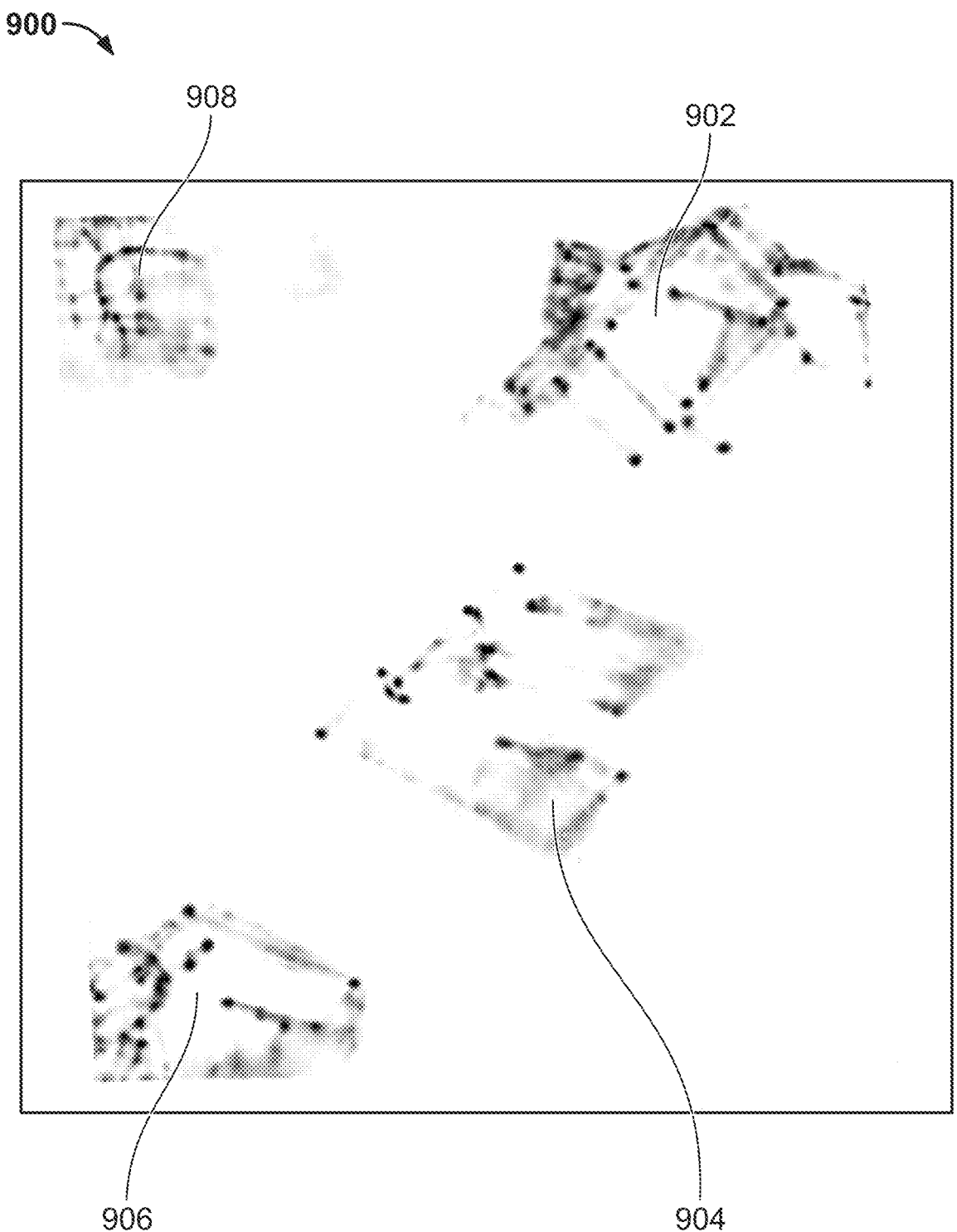
FIG. 28 is a diagram illustrating data points of the wireframe models for the roof structures detected in FIG. 27.

FIGS. 24A, 24B and 25 illustrate the processing steps described in connection with step 802 of FIG. 23. Specifically, FIG. 24A is an input image 820a illustrating structures 822a, 824a and 826a positioned within the geospatial region of interest. In addition, FIG. 24B is a synthetic image 820b of the input image 820a of FIG. 24A and illustrates structures 822b, 824b and 826b corresponding to structures 822a, 824a and 826a of the input image 820a. To apply the deep learning neural network from a stereoscopic point cloud, the point cloud is projected into a synthetic view and an inference is executed on a post-processed image corresponding to the synthetic view (e.g., synthetic image 820b). In particular, the position of a new camera is composed as a mean position of the n-closest cameras from a reference view of a stereoscopic image pair. An omega, phi and kappa of the reference view are selected and the orientation is fixed by $\pi/4$ steps such that the synthetic camera may have eight fixed orientations by each axis. The new camera position is utilized to project the points of the point cloud into each image plane and create the synthetic image 820b. As shown in FIG. 24B, the synthetic image 820*b* includes several black areas due to missing data points and information. An InPaint algorithm can be utilized to compensate for the missing data points and information. For example, FIG. 25 illustrates a post-processed image 840 of the synthetic image 820*b* of FIG. 24B. As shown in FIG. 25, the post-processed image 840 illustrates structures 842, 844, 846 and 848 wherein structure 848 was previously undetectable in the synthetic image 820*b* due to missing data points and FIG. 26 illustrates the processing step described in connection with step 804 of FIG. 23. In particular, FIG. 26 illustrates an inference image 860 of the post processed image 840 of FIG. 25. The inference image 860 is generated by applying the deep neural network to the post processed image 840. As shown in FIG. 26, the application of the deep neural network to the post-processed image 840 classifies different features of the roof structures 862, 864, 866 and 868 corresponding to the structures 842, 844, 846 and 848 of post processed image 840. FIG. 27 is a diagram 880 illustrating the generation of wireframe models 882, 884, 886 and 888 corresponding to the roof structures 862, 864, 866 and 868 detected in the inference image 860 of FIG. 26. FIG. 28 is a diagram 900 illustrating data points 902, 904, 906 and 908 corresponding to the wireframe models 882, 884, 886 and 888 of diagram 880 of FIG. 27.

Figure 29:
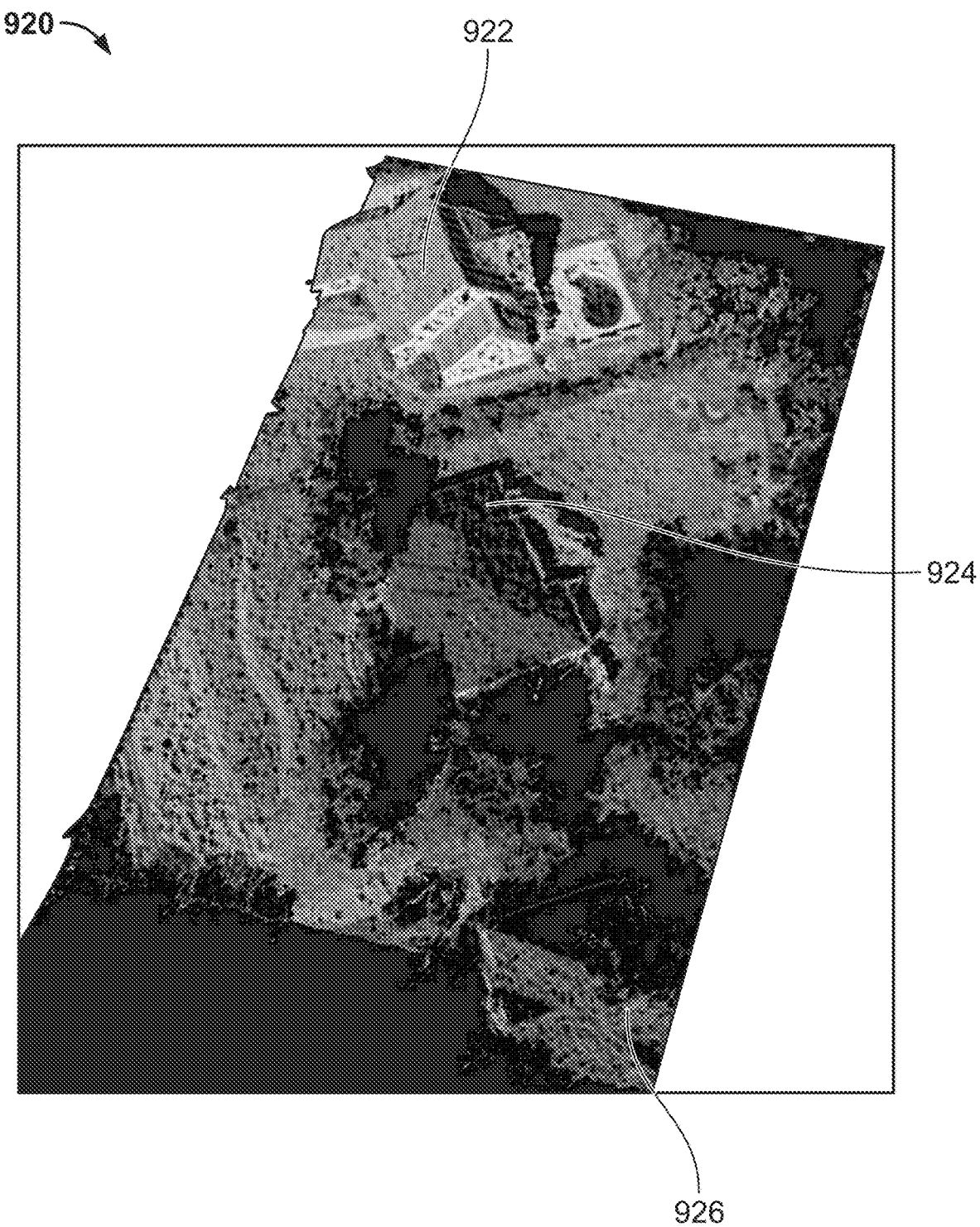
FIG. 29 is a diagram illustrating the respective point clouds for the structures positioned within the geospatial region of interest of FIG. 24A.
Figure 30:
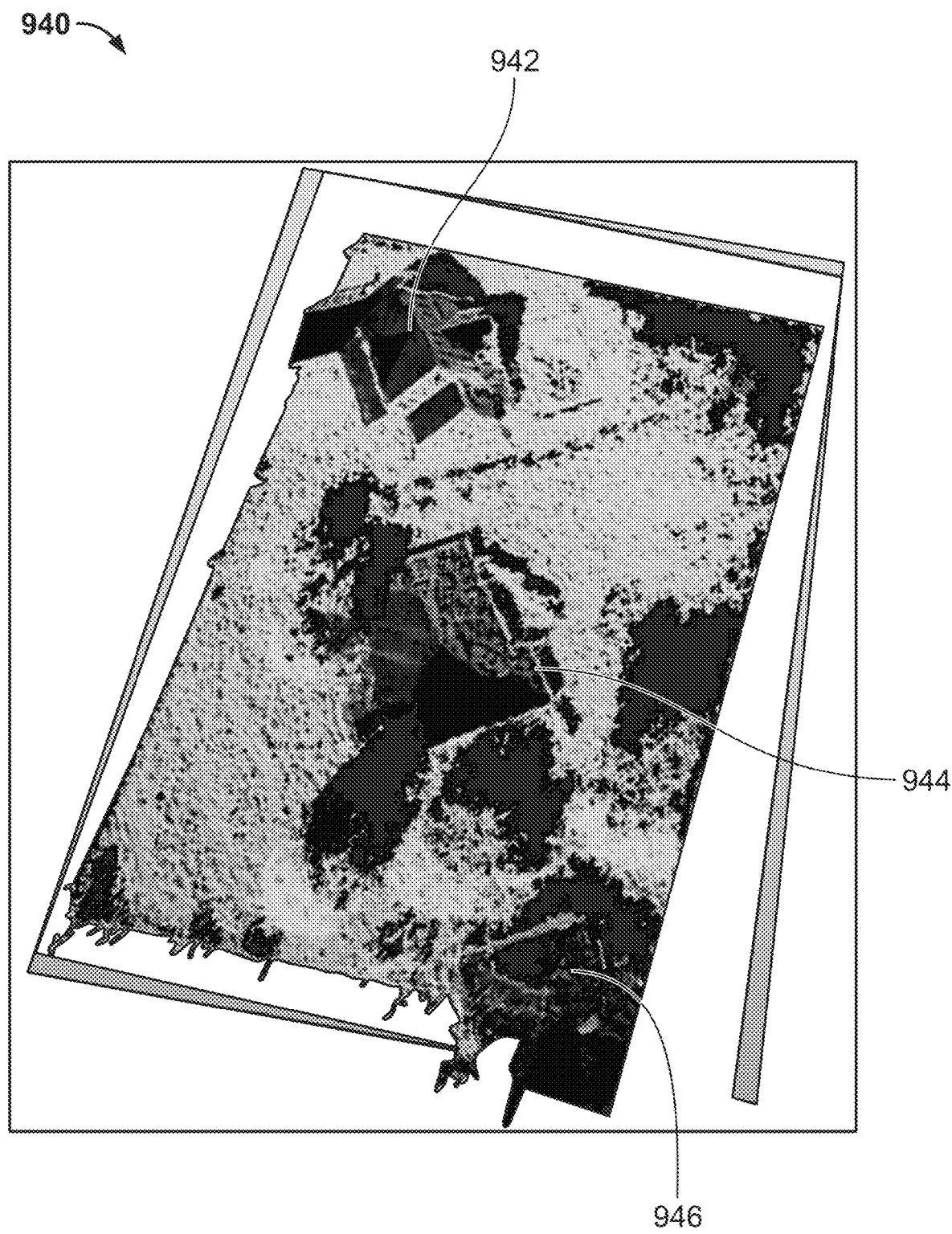
FIG. 30 is a diagram illustrating colored point clouds corresponding to the point clouds of FIG. 29.

FIG. 29 is a diagram 920 illustrating the respective point clouds for the structures positioned within the geospatial region of interest of FIG. 24A. FIG. 30 is a diagram 940 illustrating the generation of respective colored point clouds 942, 944 and 946 corresponding to the point clouds 922, 924 and 926 of FIG. 29 as indicated by step 806 of FIG. 23. As shown in FIG. 30, the colored point clouds 942, 944 and 946 classify features of the roof structures by coloring the different roof structure features with different colors. It is noted that the system 10 could apply desired colors or patterns to various elements of the point cloud as desired. For example, a colorization process could be applied, wherein the system 10 applies desired colors to elements of the cloud, such as a standard color (e.g., white, gray, yellow) for each point in the cloud, colors for each point of the cloud based on the point's normal, colors for each point based on point elevations, etc.

Having thus described the system and method in detail, it is to be understood that the foregoing description is not intended to limit the spirit or scope thereof. It will be understood that the embodiments of the present disclosure described herein are merely exemplary and that a person skilled in the art can make any variations and modification without departing from the spirit and scope of the disclosure. All such variations and modifications, including those discussed above, are intended to be included within the scope of the disclosure. What is desired to be protected by Letters Patent is set forth in the appended claims.

What is claimed is:

1. A system for modeling a structure, comprising:
an aerial imagery database; and
a processor in communication with the aerial imagery database, the processor:
retrieving at least one stereoscopic image pair from the aerial imagery database;
identifying a target image from the at least one stereoscopic image pair;
identifying a reference image from the at least one stereoscopic image pair;
rectifying the target image and the reference image so that principal camera rays of the target image and the reference image are parallel and originate on the same plane;
calculating an optimized disparity value for each pixel of the identified target image by applying a semi-global matching algorithm to minimize a cost measure at corresponding pixel locations between the target image and the reference image;
generating a disparity map based on the optimized disparity values for each pixel of the identified target image;
generating a three dimensional point cloud based on the disparity map; and
generating a three dimensional model of the structure using the three-dimensional point cloud.

2. The system of claim 1, wherein the at least one stereoscopic image pair is identified using a geospatial region of interest.

3. The system of claim 1, wherein the at least one stereoscopic image pair includes data relating to intrinsic and extrinsic camera parameters.

4. The system of claim 1, wherein the processor generates the three dimensional point cloud based on the disparity map and ray intersection between the identified target image and the identified reference image, the processor calculating a plurality of three dimensional intersections between respective rays passing through respective pixels in the identified target image and respective rays passing through respective corresponding pixels in the identified reference image.

5. The system of claim 1, wherein the processor generates at least one three dimensional tool for modeling a feature over the three-dimensional point cloud.

6. The system of claim 1, wherein the processor:
retrieves a second stereoscopic image pair from the aerial imagery database;
identifies a second target image from the second stereoscopic image pair;
identifies a second reference image from the second stereoscopic pair;
calculates a disparity value for each pixel of the identified second target image;
generates a second disparity map based on the respective calculated disparity values for each pixel of the identified second target image;
generates a second three dimensional point cloud based on the second disparity map, the identified second target image and the identified second reference image; and
generates a fused three dimensional point cloud by fusing the generated first three dimensional point cloud and the generated second three dimensional point cloud.

7. The system of claim 1, wherein the system generates a first point cloud from a first pair of stereoscopic images, generates a second point cloud from a second pair of stereoscopic images, and automatically selects one of the first point cloud or the second point cloud for display to a user.

8. The system of claim 1, wherein the processor executes a surface reconstruction algorithm on the three dimensional point cloud to generate a three dimensional mesh model based on the three dimensional point cloud.

9. The system of claim 1, wherein the processor causes a graphical user interface to be displayed to an operator, the graphical user interface including the three dimensional point cloud and a user interface tool for creating a three dimensional wireframe model of a feature on top of the three-dimensional point cloud.

10. The system of claim 9, wherein the processor receives input from the operator via the user interface tool, generates the three dimensional wireframe model of the feature based on the input from the operator, and causes the three dimensional wireframe model of the feature to be displayed on top of the three dimensional point cloud.

11. The system of claim 9, wherein the processor applies texture from an image to at least one surface of the three dimensional wireframe model.

12. The system of claim 9, wherein the processor generates serializable data based on the three dimensional wireframe model of the roof.

13. The system of claim 1, wherein the processor generates a report including measurements of a real-world structure corresponding to the three-dimensional model.

14. The system of claim 13, wherein the report is in the form of a digital file.

15. The system of claim 14, wherein the report includes information relating to one or more of pricing information, materials, equipment, or supporting events corresponding to at least part of the three-dimensional model.

16. The system of claim 1, wherein the processor applies a texture map to at least one surface of the three dimensional point cloud.

17. The system of claim 1, wherein the processor colorizes points of the three dimensional point cloud.

18. A method for modeling a structure, comprising the steps of:
receiving at least one stereoscopic image pair;
identifying a target image from the at least one stereoscopic image pair;
identifying a reference image from the at least one stereoscopic image pair;
rectifying the target image and the reference image so that principal camera rays of the target image and the reference image are parallel and originate on the same plane;
calculating an optimized disparity value for each pixel of the identified target image by applying a semi-global matching algorithm to minimize a cost measure at corresponding pixel locations between the target image and the reference image;
generating a disparity map based on the optimized disparity values for each pixel of the identified target image;
generating a three dimensional point cloud based on the disparity map; and
generating a three dimensional model of the structure based on the three dimensional point cloud.

19. The method of claim 18, further comprising identifying the at least one stereoscopic image pair using a geospatial region of interest.

20. The method of claim 18, further comprising generating the three dimensional point cloud based on the disparity map and ray intersection between the identified target image and the identified reference image, and calculating a plurality of three dimensional intersections between respective rays passing through respective pixels in the identified target image and respective rays passing through respective corresponding pixels in the identified reference image.

21. The method of claim 18, further comprising:
receiving a second stereoscopic image pair from the aerial imagery database;
identifying a second target image from the second stereoscopic image pair;
identifying a second reference image from the second stereoscopic pair;
calculating a disparity value for each pixel of the identified second target image;
generating a second disparity map based on the respective calculated disparity values for each pixel of the identified second target image;
generating a second three dimensional point cloud based on the second disparity map, the identified second target image and the identified second reference image; and
generating a fused three dimensional point cloud by fusing the generated first three dimensional point cloud and the generated second three dimensional point cloud.

22. The method of claim 18, further comprising executing a surface reconstruction algorithm on the three dimensional point cloud to generate a three dimensional mesh model based on the three dimensional point cloud.

23. The method of claim 18, further comprising displaying a graphical user interface to an operator, the graphical user interface including the three dimensional point cloud and a user interface tool for creating a three dimensional wireframe model of a feature on top of the three-dimensional point cloud.

24. The method of claim 23, further comprising receiving input from the operator via the user interface tool, generating the three dimensional wireframe model of the feature based on the input from the operator, and causing the three dimensional wireframe model of the feature to be displayed on top of the three dimensional point cloud.

25. The method of claim 23, further comprising applying texture from an image to a surface of the three dimensional wireframe model.

26. The method of claim 23, further comprising generating serializable data based on the three dimensional wireframe model of the roof.

27. The method of claim 18, further comprising generating a report including measurements of a real-world structure corresponding to the three-dimensional model.

28. The method of claim 27, wherein the report is in the form of a digital file.

29. The method of claim 27, wherein the report includes information relating to one or more of pricing information, materials, equipment, or supporting events corresponding to at least part of the three-dimensional model.

30. The method of claim 18, further comprising applying a texture map to at least one surface of the three dimensional point cloud.

31. The method of claim 18, further comprising colorizing points of the three dimensional point cloud.

* * * * *